United States Patent
Kirani et al.

(10) Patent No.: US 7,103,357 B2
(45) Date of Patent: Sep. 5, 2006

(54) MEDIA SPOOLER SYSTEM AND METHODOLOGY PROVIDING EFFICIENT TRANSMISSION OF MEDIA CONTENT FROM WIRELESS DEVICES

(75) Inventors: Shekhar Kirani, Capitola, CA (US); Matthew H. Gerlach, Santa Cruz, CA (US); Timothy W. Genske, Aptos, CA (US); David Vogel, Santa Cruz, CA (US); William G. Swinton, Santa Cruz, CA (US); Venkat V. Easwar, Cupertino, CA (US); Eric O. Bodnar, Santa Cruz, CA (US)

(73) Assignee: LightSurf Technologies, Inc., Santa Cruz, CA (US)

( * ) Notice: Subject to any disclaimer, the term of this patent is extended or adjusted under 35 U.S.C. 154(b) by 1064 days.

(21) Appl. No.: 09/759,108

(22) Filed: Jan. 11, 2001

(65) Prior Publication Data

US 2002/0032027 A1    Mar. 14, 2002

Related U.S. Application Data

(63) Continuation-in-part of application No. 09/537,001, filed on Mar. 28, 2000, which is a continuation-in-part of application No. 09/434,703, filed on Nov. 5, 1999.

(51) Int. Cl.
*H04Q 7/20* (2006.01)
(52) U.S. Cl. .............. 455/426.1; 455/426.2; 455/414.1; 455/414.3; 455/420; 455/425; 455/412.1; 348/207.99; 348/222.1; 348/333.05; 348/302; 348/273
(58) Field of Classification Search .......... 455/426.1, 455/426.2, 414.1, 414.3, 420, 425, 412.1; 348/202.99, 222.1, 333.05, 302, 283
See application file for complete search history.

(56) References Cited

U.S. PATENT DOCUMENTS

| | | |
|---|---|---|
| 4,992,887 A | 2/1991 | Aragaki |
| 5,067,029 A | 11/1991 | Takahashi |
| 5,172,227 A | 12/1992 | Tsai et al. |
| 5,249,053 A | 9/1993 | Jain |
| 5,412,427 A | 5/1995 | Rabbani et al. |
| 5,526,047 A | 6/1996 | Sawanobori |
| 5,552,824 A | 9/1996 | DeAngelis et al. |
| 5,652,621 A | 7/1997 | Adams, Jr. et al. |
| 5,657,077 A | 8/1997 | DeAngelis et al. |
| 5,682,152 A | 10/1997 | Wang et al. |
| 5,734,831 A | 3/1998 | Sanders |
| 5,737,491 A | 4/1998 | Allen et al. |
| 5,754,227 A | 5/1998 | Fukuoka |
| 5,761,655 A | 6/1998 | Hoffman |
| 5,798,794 A | 8/1998 | Takahashi |
| 5,818,525 A | 10/1998 | Elabd |
| 5,835,580 A | 11/1998 | Fraser |
| 5,848,193 A | 12/1998 | Garcia |
| 5,870,383 A | 2/1999 | Eslambolchi et al. |
| 5,880,856 A | 3/1999 | Ferriere |
| 5,913,088 A | 6/1999 | Moghadam et al. |
| 5,917,542 A | 6/1999 | Moghadam et al. |
| 6,008,847 A | 12/1999 | Bauchspies |
| 6,009,201 A | 12/1999 | Acharya |
| 6,028,807 A | 2/2000 | Awsienko |
| 6,031,964 A | 2/2000 | Anderson |
| 6,043,837 A | 3/2000 | Driscoll, Jr. et al. |
| 6,064,437 A | 5/2000 | Phan et al. |
| 6,067,383 A | 5/2000 | Taniguchi et al. |
| 6,091,777 A | 7/2000 | Guetz et al. |
| 6,125,201 A | 9/2000 | Zador |
| 6,154,493 A | 11/2000 | Acharya et al. |
| 6,163,604 A | 12/2000 | Baulier et al. |
| 6,202,060 B1 | 3/2001 | Tran |
| 6,243,420 B1 | 6/2001 | Michell et al. |
| 6,285,775 B1 | 9/2001 | Wu et al. |
| 6,348,929 B1 | 2/2002 | Acharya et al. |
| 6,385,177 B1 * | 5/2002 | Suda et al. ................. 370/310 |
| 6,392,699 B1 | 5/2002 | Acharya |
| 6,417,882 B1 | 7/2002 | Mahant-Shetti |
| 6,424,739 B1 | 7/2002 | Ukita et al. |
| 6,445,412 B1 | 9/2002 | Shiohara |
| 6,459,816 B1 | 10/2002 | Matsuura et al. |

| | | | |
|---|---|---|---|
| 6,539,169 B1 | 3/2003 | Tsubaki et al. | |
| 6,546,143 B1 | 4/2003 | Taubman | |
| 6,577,338 B1 | 6/2003 | Tanaka et al. | |
| 6,600,930 B1* | 7/2003 | Sakurai et al. | 455/414.3 |
| 6,615,224 B1 | 9/2003 | Davis | |
| 2001/0007107 A1 | 7/2001 | Yamaguchi | |
| 2001/0019359 A1* | 9/2001 | Parulski et al. | 348/207 |
| 2001/0049693 A1 | 12/2001 | Pratt | |

FOREIGN PATENT DOCUMENTS

| | | |
|---|---|---|
| EP | 0763943 A2 | 3/1997 |
| WO | WO 9960793 A1 | 11/1999 |
| WO | WO 0075859 A1 | 12/2000 |

OTHER PUBLICATIONS

Mann, Steve, The Wireless Application Protocol, Dr. Dobb's Journal, Oct. 1999, pp. 56-66.
Pigeon, Steven, Image Compression with Wavelets, Dr. Dobb's Journal, Aug. 1999, pp. 111-115.
Corcoran, Peter M. et al., Internet Enabled Digital Photography, International Conference on Consumer Electronics, Jne 22, 1999, pp. 84-85.
Li, Jin et al., Coding artifact removal with multiscale processing, Proceedings—IEEE International Conference on Image Processing '97, Santa Barbara, CA, Oct. 27-29, 1997.
Haskell, B. G. et al., Digital Video: An introduction to MPEG-2, Chapman and Hall, pp. 80-109, 1997.
Nelson, M. et al., The Data Compression Book, Second Edition, Chapters 4 & 5, pp. 75-152, M&T Books, 1996.
Nelson, M. et al., The Data Compression Book, Second Edition, Chapter 11: Lossy Graphics Compression (portion at pp. 326-330), M&T Books, 1996.
Parker, T. et al., TCP/IP Unleashed, Chapter 2: Overview of TCP/IP, Sams Publishing, 1996.
Lindley, Craig A., JPEG-Like Image Compression, Part 2, Dr. Dobb's Journal, Aug. 1995.
Lindley, Craig A., JPEG-Like Image Compression, Part 1, Dr. Dobb's Journal, Jul. 1995.
Pennebaker, William B. et al., JPEG—Still Image Compression Standard, Chapter 16, pp. 261-266, 1993.
Foley, James D. et al., Computer Graphics: Principles and Practice, 2nd Edition, Chapter 13, pp. 563-604, Addison-Wesley Publishing Company, Reading, MA, 1990.
Zigon, Robert, Run Length Encoding, Dr. Dobb's Journal, Feb. 1989.

* cited by examiner

*Primary Examiner*—Joseph Feild
*Assistant Examiner*—David Q. Nguyen
(74) *Attorney, Agent, or Firm*—Blakely, Sokoloff, Taylor & Zafman LLP; Judith A. Szepesi

(57) ABSTRACT

A media spooler system is described that provides a methodology for efficient transmission of media content from client devices, such transmission of digital images from wireless digital cameras. The media spooler or gateway addresses wireless transmission problems by acting as a protocol gateway between a thin-client device and a target host or server (supported by a server infrastructure). More particularly, the media spooler of the present invention acts as a protocol gateway between thin-client devices (e.g., "mobile visual communicator" in the form of a wireless digital camera) and server infrastructure (e.g., server-based computer systems or "Web servers" of a photographic service provider). This task entails accepting multiple, simultaneous connections from various client devices (e.g., wireless digital cameras), extracting information from those devices (e.g., digital photographs or other media content), and then uploading that information to the target server infrastructure. In basic operation, the media spooler queries each client device for the information (e.g., media, such as pictures) the client device thinks should uploaded, and then the media spooler queries the server infrastructure for the subset of pictures that have not been already uploaded. This improved coordination or synchronization of information between a device and target host allows for efficient recovery of dropped cellular data calls by essentially allowing the media spooler to "pick up where it left off."

46 Claims, 23 Drawing Sheets

*JPEG COMPRESSION (48:1)*

*WAVELET TRANSFORM COMPRESSION (48:1)*

JPEG COMPRESSION (32:1)

WAVELET TRANSFORM COMPRESSION (32:1)

*JPEG COMPRESSION (16:1)*

*WAVELET TRANSFORM COMPRESSION (16:1)*

MEDIA SPOOLER SYSTEM AND METHODOLOGY PROVIDING EFFICIENT TRANSMISSION OF MEDIA CONTENT FROM WIRELESS DEVICES

RELATED APPLICATIONS

The present application claims the benefit of priority from, and is a continuation-in-part application of, commonly-owned U.S. application Ser. No. 09/537,001, filed Mar. 28, 2000, which in turn is a continuation-in-part application of commonly-owned U.S. application Ser. No. 09/434,703, filed Nov. 5, 1999. Additionally, the present application is related to commonly-owned U.S. application Ser. No. 09/489,511, filed Jan. 21, 2000. The disclosures of each of the foregoing applications are hereby incorporated by reference in their entirety, including any appendices or attachments thereof, for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates to the field of media processing and, more particularly, to system and methodology for efficient transmission of media content (e.g., digital images, sound, and/or video) from wireless devices (e.g., digital cameras with wireless capability or connectivity to cellular phone devices).

Today, digital imaging, particularly in the form of digital cameras, is a prevalent reality that affords a new way to capture photos using a solid-state image sensor instead of traditional film. A digital camera functions by recording incoming light on some sort of sensing mechanisms and then processes that information (basically, through analog-to-digital conversion) to create a memory image of the target picture. A digital camera's biggest advantage is that it creates images digitally thus making it easy to transfer images between all kinds of devices and applications. For instance, one can easily insert digital images into word processing documents, send them by e-mail to friends, or post them on a Web site where anyone in the world can see them. Additionally, one can use photo-editing software to manipulate digital images to improve or alter them. For example, one can crop them, remove red-eye, change colors or contrast, and even add and delete elements. Digital cameras also provide immediate access to one's images, thus avoiding the hassle and delay of film processing. All told, digital photography is becoming increasingly popular because of the flexibility it gives the user when he or she wants to use or distribute an image.

The defining difference between digital cameras and those of the film variety is the medium used to record the image. While a conventional camera uses film, digital cameras use an array of digital image sensors. When the shutter opens, rather than exposing film, the digital camera collects light on an image sensor, a solid state electronic device. The image sensor contains a grid of tiny photosites that convert light shining on them to electrical charges. The image sensor may be of the charged-coupled device (CCD) or complementary metal-oxide semiconductor (CMOS) varieties. Most digital cameras employ charge-coupled device (CCD) image sensors, but newer cameras are using image sensors of the complimentary metal-oxide semiconductor (CMOS) variety. Also referred to by the acronym CIS (for CMOS image sensors), this newer type of sensor is less expensive than its CCD counterpart and requires less power.

During camera operation, an image is focused through the camera lens so that it will fall on the image sensor. Depending on a given image, varying amounts of light hit each photosite, resulting in varying amounts of electrical charge at the photosites. These charges can then be measured and converted into digital information that indicates how much light hit each site which, in turn, can be used to recreate the image. When the exposure is completed, the sensor is much like a checkerboard, with different numbers of checkers (electrons) piled on each square (photosite). When the image is read off of the sensor, the stored electrons are converted to a series of analog charges which are then converted to digital values by an Analog-to-Digital (A to D) converter, which indicates how much light hit each site which, in turn, can be used to recreate the image.

In order to generate an image of quality that is roughly comparable to a conventional photograph, a substantial amount of information must be capture and processed. For example, a low-resolution 640×480 image has 307,200 pixels. If each pixel uses 24 bits (3 bytes) for true color, a single image takes up about a megabyte of storage space. As the resolution increases, so does the image's file size. At a resolution of 1024×768, each 24-bit picture takes up 2.5 megabytes. Because of the large size of this information, digital cameras usually do not store a picture in its raw digital format but, instead, apply compression technique to the image so that it can be stored in a standard-compressed image format, such as JPEG (Joint Photographic Experts Group). Compressing images allows the user to save more images on the camera's "digital film," such as flash memory (available in a variety of specific formats) or other facsimile of film. It also allows the user to download and display those images more quickly.

During compression, data that is duplicated or which have no value is eliminated or saved in a shorter form, greatly reducing a file's size. When the image is then edited or displayed, the compression process is reversed. In digital photography, two forms of compression are used: lossless and lossy. In lossless compression (also called reversible compression), reversing the compression process produces an image having a quality that matches the original source. Although lossless compression sounds ideal, it does not provide much compression. Generally, compressed files are still a third the size of the original file, not small enough to make much difference in most situations. For this reason, lossless compression is used mainly where detail is extremely important as in x-rays and satellite imagery. A leading lossless compression scheme is LZW (Lempel-Ziv-Welch). This is used in GIF and TIFF files and achieves compression ratios of 50 to 90%.

As shown in FIG. 1A, the system 100 includes a Sensor 101, a Shutter Actuator 103, an Image Processor 102, an Image (DRAM) Memory 104, a (Central) Processor 106, a Keypad and Controls 108, a Program Code Flash Memory 107, a (System) Memory 105, a Direct View Display or Viewfinder 109, a Hot Shoe Interface 110, and a "Digital Film" Flash Memory 111. As illustrated, these various components communicate with one another using a bus architecture including, for instance, an Address Bus, a Data Bus, and an I/O (Input/Output) Bus.

The system 100 employs the Sensor 101 for basic image capture. The Sensor 101 operates, in essence, by capturing light and transforming that into electrical voltage levels. A suitable sensor is available from a variety of vendors, including VLSI Vision, Motorola, and Toshiba. In a preferred embodiment, the Sensor 101 includes, for example, a 1280×1024 color CMOS sensor, such as a VLSI Vision VVL 6801 CMOS sensor. However, other sensor technology is suitable, including CCD sensors.

The Sensor 101 must, of course, be part of a larger assembly to operate. Specifically, the Sensor 101 operates in conjunction with a lens assembly (not shown), or other optics to focus an image onto the sensor. The optics themselves are controllable, for instance, using a conventional aperture, focus, and shutter control mechanisms. The currently-preferred embodiment uses an 18 mm fixed-focal length, fixed-aperture lens assembly to provide a broad depth of field. The lens assembly employs two manual slide controls, a macro lens control, and an exposure control. The macro lens control switches from normal to close-up mode by sliding a macro lens in and out of the lens assembly to provide normal or extreme close-up capability. The exposure control switches from normal to bright light by sliding a neutral gray filter in and out of the lens assembly. Aside from choosing normal or bright light, normal or close-up mode, the camera requires no manual focusing, shutter speed or aperture adjustment. Operation is as simple as point and shoot. The Sensor 101, on the other hand, operates under the control of the Image Processor 102, which will now be described.

The Image Processor 102, which basically operates as a state machine, provides overall control for the Sensor 101. In operation, the Image Processor 102 controls Although it is possible to compress images without losing some quality, it is not practical in many cases. Therefore, all popular digital cameras use a lossy compression. Although lossy compression does not uncompress images to the same quality as the original source, the image remains visually lossless and appears normal. In many situations, such as posting images on the Web, the image degradation is not obvious. The trick is to remove data that is not obvious to the viewer. For example, if large areas of the sky are the same shade of blue, only the value for one pixel needs to be saved along with the locations of where the other identical pixels appear in the image.

The leading lossy compression scheme is JPEG (Joint Photographic Experts Group) used in JFIF files (JPEG File Interchange Format). JPEG is a lossy compression algorithm that works by converting the spatial image representation into a frequency map. A Discrete Cosine Transform (DCT) separates the high- and low-frequency information present in the image. The high frequency information is then selectively discarded, depending on the quality setting. The greater the compression, the greater the degree of information loss. The scheme allows the user to select the degree of compression, with compression ratios between 10:1 and 40:1 being common. Because lossy compression affects the image, most cameras allow the user to choose between different levels of compression. This allows the user to choose between lower compression and higher image quality or greater compression and poorer image quality.

Today, all sorts of different types of information content may be captured digitally by various recording or capturing devices. In addition to digital photographic images, other examples of media include digital video and digital audio. Typically, once information content is captured, it is then transmitted or "uploaded"—either using wireless or wireline transmission means—to another host device, such as a server computer. Here, a problem exists as to how one transfers information content in a reliable, secure manner. For instance, in the case of a portable digital camera device, how can the user transmit captured digital images to a Web-based server computer in a reliable, secure manner, particularly if a wireless communication medium is employed. Or in the case of the digital audio, how does the user transmit dictation captured on a wireless handheld device to a remote host device. Of course the process is not merely limited to transmitting information content from a recording device to a host device. Instead, the process can be reversed such that information content is transmitted from a host device to a client device that is capable of displaying or rendering that information content. For example, a user may download e-mail information for displaying at a wireless handheld device. Regardless of whether information is uploaded or downloaded, the problem still remains, particularly when using wireless transmission means, as to how one can transmit information content in a reliable, secure manner.

A particular problem is encountered with today's wireless networks. Currently, wireless networks employ TCP/IP over communication networks supporting a transmission rate of only 9600 baud. This yields an effective throughput of only about 1 K (kilobytes) per minute. At such poor effective throughput rates, existing wireless networks pose a substantial bottleneck for the transmission of digital information content. For instance, a digital photographic image of 600 K may require several minutes to transmit. A relatively small MP3 audio file, say at 2 M (megabytes), would expectedly take much longer. A modest digital video file might even require several hours to transmit over such a low-bandwidth communication link.

However, the problem is even worse than the foregoing suggests. Because of limitations today in existing wireless systems, often a "call" (i.e., session) will be lost (i.e., prematurely terminated). Practically all cellular phone users have experienced firsthand the annoying experience of having a cellular phone call dropped. By the very nature that wireless systems are mobile, wireless calls are often dropped due to natural or physical obstructions, such as interference from mountains. At other times, however, a call may be dropped simply due to unreliability in the underlying cellular phone network.

Regardless of the cause of a user's call having been lost, the user is often forced to not only re-establish communication but also resend the entire contents of the information (e.g., entire digital photo) that was previously being transmitted, since most systems treat information content on a per-item basis. If a wireless call is lost during transmission of a digital image, for instance, those systems require retransmission of the entire digital image, as each image is treated as a single unit. There is no capability to benefit from the previous transmission of a portion of that digital image.

This retransmission problem is by no means limited to wireless systems. For example, when uploading a photographic image using a 56 K modem, any loss of the connection will result in the user having to completely retransmit the photo, despite the fact that the user may have previously uploaded a substantial portion of that very same photo. Moreover, the comparatively slower transmission rates available in wireless systems certainly can be expected to exacerbate the problem.

One attempt to address these problems, at least in the wireless arena, is to reinvent the communication protocols employed. Instead of using TCP/IP, this approach would employ, instead, a proprietary protocol that attempts to upload information content in pieces (i.e., not all-or-none). This would address, for instance, the above-mentioned problem of an aborted transmission, by allowing a system to resume transmission where transmission was left off at (i.e., without retransmitting pieces that have already been successfully transmitted). Additionally, this has the benefit of adopting a different packet format, thereby decreasing the high overhead incurred with using TCP/IP packet format.

However, apart from the attempt to address aborted transmissions, there has been little or no effort to date to provide a comprehensive solution to the problem of low effective throughput that is offered by existing wireless systems—a problem which results not only from the requirement of retransmission but also from the low baud rate and frequent interruptions in service. Thus, even though such an approach attempts to address the problem of retransmission, the more fundamental problem of losing connections remains wholly unaddressed. All told, even when employing alternative communication protocols, gains in wireless throughput are modest, at best. A better solution is sought.

SUMMARY OF THE INVENTION

A media spooler system of the present invention implements a methodology for efficient transmission of media content from client devices, such as transmission of digital images from wireless digital cameras. The present invention provides a media spooler, or gateway, to address wireless transmission problems by acting as a protocol gateway between a thin-client device and a target host or server (supported by a server infrastructure). More particularly, the media spooler of the present invention acts as a protocol gateway between thin-client devices (e.g., "mobile visual communicator" in the form of a wireless digital camera) and server infrastructure (e.g., server-based computer systems or "Web servers" of a photographic service provider). This task entails accepting multiple, simultaneous connections from various client devices (e.g., wireless digital cameras), extracting information from those devices (e.g., digital photographs or other media content), and then uploading that information to the target server infrastructure. In basic operation, the media spooler queries each client device for the information (e.g., media, such as pictures) the client device thinks should be uploaded, and then the media spooler queries the server infrastructure for the subset of pictures that have not been already uploaded. This improved coordination or synchronization of information between a device and target host allows for efficient recovery of dropped cellular data calls by essentially allowing the media spooler to "pick up where it left off."

In an environment employing the media spooler or gateway of the present invention, content or media enters the environment through a variety of devices. Examples include, for instance, a media capturing device (e.g., digital camera). Other examples include digital video and digital audio-capturing devices. In such an environment, the media-capturing device is typically attached (intermittently) to a cellular phone device, which in turn communicates through a wireless network to a modem pool. Instead of a cellular phone device, the device may comprise a Bluetooth-enabled communication device or a wireless modem attached to the capturing devices. A PC or laptop computer device may connect over wireline (e.g., regular phone line) to the same modem pool, as carriers may offer both wireless data and wired ISP connections. Regardless of how a particular device is connecting to the environment, ultimately a data call is placed by the device (or on behalf of the device) for establishing a connection with the modem pool. A variety of other devices may connect as well, either through wireless or wireline means. Whether the arriving connection is wireless or wireline, the media spooler may still operate to improve overall system operation.

The modem pool resides at the carrier (i.e., cellular phone provider) infrastructure, for receiving incoming connections from a variety of devices. Additionally, the media spooler is also located at the carrier infrastructure (in the currently-preferred embodiment), in effect juxtapositioned near the modem pool. Here, the media spooler is located near the modem pool, the two being connected together over a high-speed backbone data network or link. In the currently-preferred embodiment, communication between the two occurs via TCP/IP. The media spooler, in turn, connects to a back-end server infrastructure (which includes Web server support). The server infrastructure comprises media asset management ("vault") and media exchange. It may operate at a remote data center(s) and/or may operate at the carrier's data center (e.g., located within the carrier's infrastructure). Connection between the media spooler and the server infrastructure occurs through a high-speed backbone data network or link, either over the Internet (if the data center is remote) or within the carrier's infrastructure (if the data center is local).

Exemplary basic operation proceeds as follows. A media capturing device, which is connected to a data-capable cellular phone, captures information to media (e.g., digital photograph). The cellular phone places a data call, for instance, at 9600 baud, to its available modem pool at the appropriate carrier (i.e., subscribed to for this cellular phone). Once the data call is established, the capturing device transmits the data (media information) to the modem pool, using TCP/IP protocol. The modem pool collects the bits of information pertaining to the digital photograph being transmitted and, in turn, passes that information to the media spooler, which resides in close proximity to the modem pool. Once the media spooler receives enough bits of information to define the digital photograph (or useful portion thereof), the digital photograph is transmitted via a high-speed data network to the server infrastructure, also using a high-speed connection. The same basic data flow exists for other devices, including, for instance, when a digital photograph is uploaded from a laptop computer via a data call to the modem pool.

For incoming data that it is receiving, the media spooler itself is independent of any given file format. In particular, the media spooler may spool a variety of disparate media types, apart from Progressive Photograph Format (PPF) files (i.e., a format supported by the present invention). The media spooler applies a byte-level "smart-retry" approach to transmitting data, which ensures that transmission will resume at the point of the last successfully-received byte of data. This byte-level approach is applied regardless of whether the media type being transmitted supports compartment-level transmission. For instance, if a cellular call is dropped in the middle of a compartment, the spooler will resume subsequent transmission at the last byte received. In this manner, information may be transmitted in a manner which minimizes retransmission of data that has already been successfully received.

As the incoming client data is received, it is written to the media spooler's disk. When the spooler gathers a complete PPF compartment or complete file of another media type, it then uploads it to the Web server/server infrastructure. In the case of a broken connection to the spooler, the spooler will upload the portion received to the Web server. On a subsequent connection from the same device, the media spooler will resume downloading the PPF compartment or file of another media type at the point where the previous connection broke; thus guaranteeing that data is only going over the slow cellular link once. The media spooler is able to resume at the point of the last connection by always querying the client device for a complete list of compartments and their sizes ready for downloading. Before the media spooler actually commences downloading it queries the Web server for the subset of bytes of compartments that should actually be downloaded from the client.

The cumulative effect, at a given point in time, is that there will be a multitude of connections and, therefore, a multitude of media PPF compartments being simultaneously transmitted. During this operation, in conjunction with the Web server/server infrastructure and client device, the media spooler must decide whether to retrieve a particular compartment or piece. As multiple client connections are open at any given instance in time, this decision process is occurring for a multitude of client devices that are currently connected. If desired, the media spooler may be configured so that it only transmits media objects that have reached a prescribed amount of completion (e.g., 100% of compartments received for an object).

GLOSSARY

Bluetooth: Refers to a short-range radio technology aimed at simplifying communications among Net devices and between devices and the Internet. It also aims to simplify data synchronization between Net devices and other computers. Products with Bluetooth technology must be qualified and pass interoperability testing by the Bluetooth Special Interest Group prior to release. The Bluetooth 1.0 specification consists of two documents: the Foundation Core, which provides design specifications, and the Foundation Profile, which provides interoperability guidelines. Bluetooth's founding members include Ericsson, IBM, Intel, Nokia and Toshiba. The Bluetooth specification, which is available from the Bluetooth SIG (http://www.bluetooth.org), is hereby incorporated by reference.

Cell: Image sensors are overlaid with a color filter array that has a fixed repeating pattern. The pattern is typically 2 pixels wide and 2 pixels high, and has 2 green filters and 1 red and 1 blue filter. This repeating pattern is called a "cell". The above pattern is a particular example that is often referred to as a "Bayer" pattern.

Channel: Channels are the axes of a color space. For example the R, G, B color space has Red, Green, and Blue channels.

Color Space: This is typically a three-dimensional space that represents the color of image pixels. Image pixels are typically represented by the three triplet colors: red (R), green (G), and blue (B). R, G, and B can vary between 0.0 (minimum) and 1.0 (maximum). The image is represented by a primary channel comprising Green (G) and secondary channels comprising Red (R) and Blue (B). In addition to the RGB color space, other color spaces, like CMYK (Cyan, Magenta, Yellow), HSV (Hue, Saturation, Value), and YUV (Luminance Y, Chrominance U, and Chrominance V), are also used in the literature. Typically these color spaces are related by matrix transformations.

HTTP: Short for HyperText Transfer Protocol, the underlying protocol used by the World Wide Web. HTTP defines how messages are formatted and transmitted, and what actions Web servers and browsers should take in response to various commands. For example, when a user enters a URL in his or her browser, this actually sends an HTTP command to the Web server directing it to fetch and transmit the requested Web page. Further description of HTTP is available in *RFC 2616: Hypertext Transfer Protocol—HTTP/1.1*, the disclosure of which is hereby incorporated by reference. RFC 2616 is available from the World Wide Web Consortium (W3C), and is currently available via the Internet at http://www.w3.org/Protocols/.

Media: Used herein to refer broadly to objects, content, technology, or the like used to communicate information, such as text, graphics, sound, pictures, and videos, all of which are different types of media.

Mosaic: A mosaic is the image generated by an image sensor overlaid with a color filter array.

Perl: Short for Practical Extraction and Report Language, Perl is a programming language especially designed for processing text. Because of its strong text processing abilities, Perl has become one of the most popular languages for writing CGI scripts. Perl is an interpretive language, which makes it easy to build and test simple programs.

PPP: Refers to Point-to-Point Protocol, a well-known method for transmission of IP packets over serial lines; see, e.g., *RFC 1661: The Point-to-Point Protocol (PPP)*, available from the Network Working Group, the disclosure of which is hereby incorporated by reference. RFC 1661 is currently available via the Internet at: http://www.freesoft.org/CIE/RFC/1661/index.htm.

Primary and Secondary Channels: The primary channel is the color space axis that is most important for human perception. The secondary channels are the remaining two channels. For example, in the YUV color space, the Y channel is the primary channel and U and V are secondary channels. In the RGB color space, G is the primary channel and R and B are secondary channels.

SOAP: Stands for Simple Object Access Protocol which provides a way for applications to communicate with each other over the Internet, independent of platform. Unlike DCOM's IIOP, SOAP piggybacks a DOM onto HTTP (port 80) in order to penetrate server firewalls, which are usually configured to accept port 80 and port 21 (FTP) requests. SOAP relies on XML to define the format of the information and then adds the necessary HTTP headers to send it. SOAP was developed by Microsoft, DevelopMentor, and Userland Software and has been proposed to the Internet Engineering Task Force (IETF) as a standard.

Sub-band Coding: The general class of image compression techniques (including the wavelet-based coding method) where an image is decomposed into various bands and the bands are compressed using techniques suited to the band characteristics.

Transform-based Compression: Transform-based compression involves subjecting each color plane of an image by a mathematical transform (e.g., such as the Fourier Transform, Cosine Transform, or Wavelet Transform). The transformed plane is more amenable to image compression. The transformed plane is quantized (i.e., fewer bits are retained per pixel than in the original) and compressed using entropy coding techniques, like Huffman or arithmetic coding.

TCP: Stands for Transmission Control Protocol. TCP is one of the main protocols in TCP/IP networks. Whereas the IP protocol deals only with packets, TCP enables two hosts to establish a connection and exchange streams of data. TCP guarantees delivery of data and also guarantees that packets will be delivered in the same order in which they were sent. For an introduction to TCP, see, e.g., RFC 793, the disclosure of which is hereby incorporated by reference.

TCP/IP: Stands for Transmission Control Protocol/Internet Protocol, the suite of communications protocols used to connect hosts on the Internet. TCP/IP uses several protocols, the two main ones being TCP and IP. TCP/IP is built into the UNIX operating system and is used by the Internet, making it the de facto standard for transmitting data over networks. For an introduction to TCP/IP, see, e.g., *RFC 1180: A TCP/IP Tutorial*, the disclosure of which is hereby incorporated by reference. A copy of RFC 1180 is currently available at ftp://ftp.isi.edu/in-notes/rfc1180.txt.

XML: Short for Extensible Markup Language, a specification developed by the W3C. XML is a pared-down version of SGML, designed especially for Web documents. It allows designers to create their own customized tags, enabling the definition, transmission, validation, and interpretation of data between applications and between organizations. For further description of XML, see, e.g., *Extensible Markup Language (XML) 1.0 specification* which is available from the World Wide Web Consortium (www.w3.org), the disclosure of which is hereby incorporated by reference. The specification is also currently available on the Internet at http://www.w3.org/TR/REC-xml.

DETAILED DESCRIPTION OF A PREFERRED EMBODIMENT

The following description focuses on an embodiment of the present invention employing a digital camera device for capturing images that may be transmitted wirelessly, which is the currently-preferred embodiment. However, those skilled in the art will appreciate that the present invention may be embodied using other media capturing/recording/processing devices, including, for instance, digital audio recorders, video phones, closed-circuit cameras, video camcorders, or other devices capable of capturing, recording, and/or processing digital images, audio, and/or video. Further, the description will focus on implementation of portions of the invention in an Internet-connected environment including desktop and server computers, such as an IBM-compatible computer running under Microsoft® Windows 2000. The present invention, however, is not limited to any particular one application or any particular environment. Instead, those skilled in the art will find that the system and methods of the present invention may be advantageously embodied on a variety of different platforms, including Macintosh, Linux, BeOS, Solaris, UNIX, NextStep, and the like. Therefore, the description of the exemplary embodiments which follows is for purposes of illustration and not limitation.

Basic System

A. Digital Camera Hardware

Figure 1A:
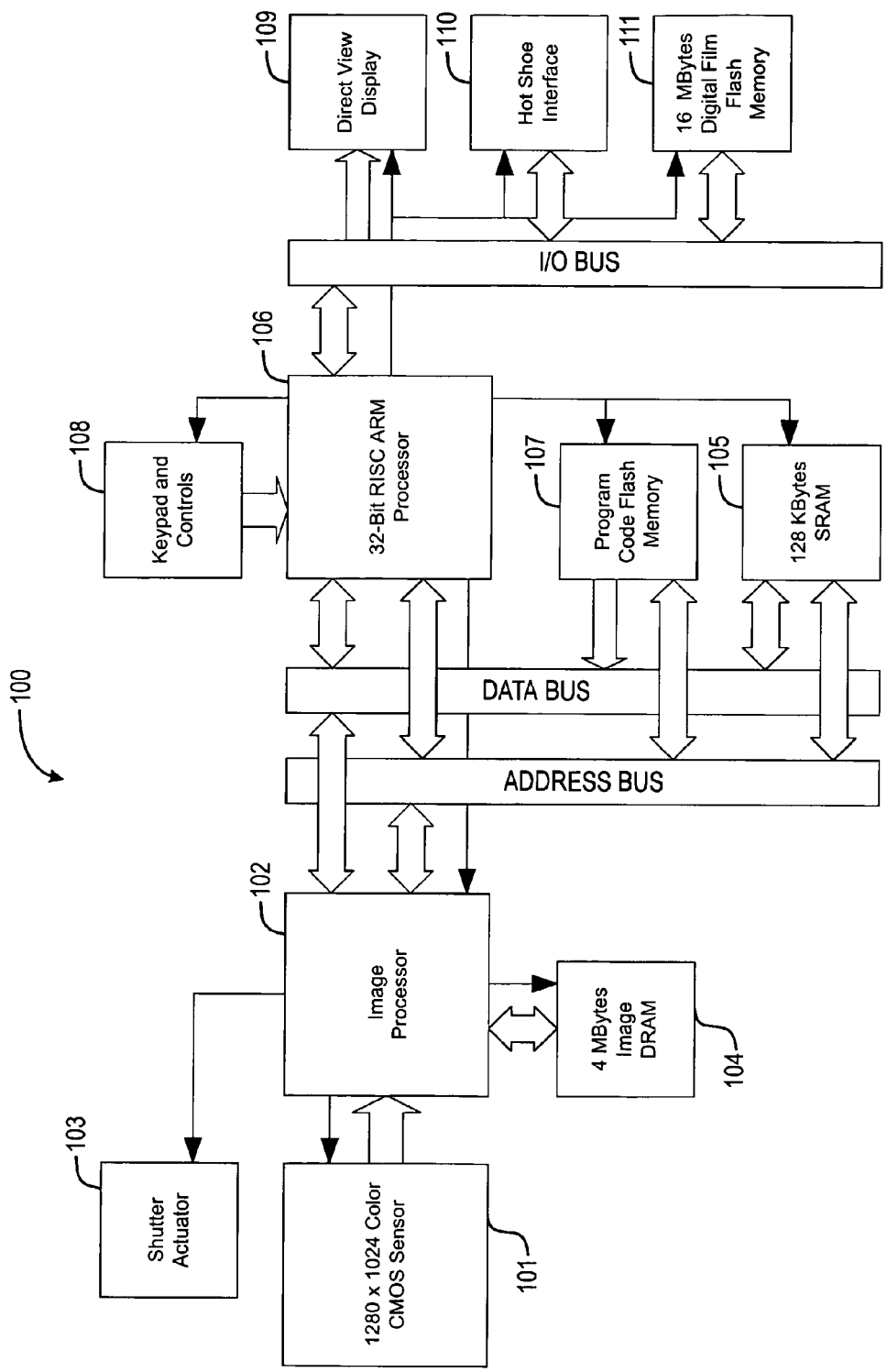
FIG. 1A is a block diagram illustrating a digital camera device suitable for implementing the present invention.

FIG. 1A is a block diagram illustrating a basic image capturing and recording system 100 suitable for implementing a portion of the present invention pertaining to initial capture of digital media, which then may be transmitted to a host system (e.g., computer system) using wireless technique. The system 100 also supports transmission using wireline technique. For purposes of illustration, the following will focus on implementation of the system 100 as a digital camera. However, as noted above, for purposes of implementing the methodology of the present invention, the system 100 may also be implemented in a variety of other digital image devices, or, if desired, other digital media devices (e.g., digital audio recorder or digital video recorder). the Sensor 101 by, in effect, telling it what to do and when. For instance, the Image Processor 102 issues timing signals to the Sensor 101 for indicating how the Sensor 101 should record and stream out image data. Further, the Image Processor 102 provides general Input/Output (I/O) control that allows one to coordinate control of the sensor with other electromechanical peripherals, such as a shutter, lens aperture, or the like.

Actual implementation of the Image Processor 102 itself may be accomplished in a variety of different ways. For a microprocessor-based implementation, for instance, the Image Processor 102 may be implemented as a microprocessor (e.g., PowerPC 823 microprocessor, available from Motorola, Inc. of Schaumburg, Ill.) with DSP (digital signal processing) logic blocks, memory control logic blocks, video control logic blocks, and interface logic. Alternatively, the Image Processor 102 may be implemented as a "camera on a chip(set)" using, for instance, a Sierra Imaging Raptor I or II chipset (available from Sierra Imaging, Inc. of Scotts Valley, Calif.), a Sound Vision Clarity 1 or 2 chipset (available from Sound Vision, Inc. of Framingham, Mass.) or similar chipset that integrates a processing core with image processing periphery. In a preferred embodiment, the Image Processor 102 preferably supports hardware implementation of a wavelet transform engine complete with a wavelet transform filter bank, so that the wavelet transform process may be pipelined through a series of dedicated hardware gates (instead of executed as a sequence of software instructions repeatedly loaded and processed by a general-purpose microprocessor).

The Image Processor 102 is not a stand-alone part but, instead, relies on the (Central) Processor 106 for control instructions. The Image Processor 102 sits on the Address and Data Buses and is accessible by the Processor 106 through a series of registers. In this manner, the Processor 106 may instruct the Image Processor 102 what to perform and when. For instance, the Processor 106 may instruct the Image Processor 102 to turn on the Sensor 101, to capture an image at the Sensor 101, and to execute the wavelet transform. Therefore, the Image Processor 102 is very much a facilitator but is not in and of itself a controller for the system.

The Shutter Actuator 103 is a simple, generic component for controlling light exposure on the Sensor 101. Depending on the behavior of the actual sensor employed, the Shutter Actuator 103 may not even be necessary. In particular, the Shutter Actuator 103 is employed in those instances where the Sensor 101 requires a black reference. In such an embodiment, the Shutter Actuator 103 is an electromechanical interface coupled to a solenoid which, when the interface responds to a particular logic level, triggers an open/close cycle of a mechanical shutter. The mechanical shutter, which serves to selectively block light entering the lens assembly of the camera, may be of a conventional design available from a variety of suppliers. A suitable supplier includes, for instance, Sunex, Inc. of Carlsbad, Calif.

The Image Memory (DRAM) 104 serves to store the image captured from the Sensor 101. The Sensor 101 itself does not "store" the image that it captures. Therefore, the Image Memory 104 is an image-capture and in-place transform (frame) buffer. This memory is controlled by the Image Processor 102 and can be shut off when not in use for power-saving purposes. During basic operation of the camera, the captured image is transferred directly into the Image Memory 104, using a sample/transfer technique. In order to make this efficient, the process is controlled by the Image Processor 102 in a manner somewhat akin to DMA (direct memory access) transfer employed on desktop computers. Here, the Image Processor 102 functions as a state machine which simply samples and transfers information from the Sensor 101 to the Image Memory 104. In the presently-preferred embodiment, the Image Memory 104 comprises conventional DRAM (dynamic random-access memory) memory available from a variety of vendors, including, for instance, Toshiba, Micron, Hitachi, Samsung, and others. A size of about 4 MB (megabyte) or more is suitable for this component.

The next several components discussed, which may be viewed as components hanging off of the Address and Data Buses of the Processor 106, are typical components that one would ordinarily expect to find when implementing a data processing device; collectively, these components may be viewed as a computer embedded in the camera. For example, these components include the previously-mentioned general-purpose microprocessor (Processor 106) coupled to memory (System Memory 105 and Program Code Flash Memory 107). The Working or System Memory 105 is the general working or scratchpad memory for the Processor 106. This memory is used for storing program-created variables, stacks, heap(s), and the like. In the presently-preferred embodiment, the System Memory 105 comprises static RAM (e.g., SRAM), which is also available from a variety of vendors. A size of about 128 KB (kilobyte) or more is suitable for this purpose. The Program Code Flash Memory 107, on the other hand, comprises 1 MB of directly-addressable flash storage that holds the operating system and embedded software, that is, the program code comprising the instructions that the processor must execute to operate. The flash memory, which may be conventional flash memory that is available from a variety of vendors, need not be of the removable type, as the Program Code Flash Memory 107 is not intended to be removed from the system by the camera user.

The Processor 106 itself, in the presently-preferred embodiment, comprises a 32-bit RISC ARM Processor designed by ARM Limited of Maidenhead, UK. ARM licenses its designs to semiconductor partners for manufacture, supply, and support; for a list of ARM licensees, see e.g., http.//www.arm.com/Partners/. The ARM processor has an efficient instruction set that is ideal for performing cyclical functions quite rapidly and includes sufficient bandwidth for transferring large amounts of data quickly (e.g., for performing Huffman coding on a large amount of data). Additionally, the processor is a dedicated processor, without the overhead of a substantial number of peripherals. These features make the processor attractive for use in a digital camera embodiment.

For a camera embodiment, the device will, in general, be expected to include an interface that is capable of receiving input from users. Keypad and Controls 108 are conventional inputs that support user input. Similarly, the Direct View Display ("Viewfinder") 109 is a direct view LCD (liquid crystal display) that provides feedback to the user or camera operator. During photography mode, the Viewfinder 109 replaces the plastic viewfinders and LCD panels found on most digital cameras and provides the most accurate real-time representation of the scene visualized by the sensor. The Viewfinder 109 overlays simple icons onto the image to indicate the status of various camera settings. The Viewfinder 109 fits inside an eyepiece which keeps sunlight out and allows the operator to visualize the scene in any lighting conditions. During preview mode, the Viewfinder 109 shows previews of the captured photos and allows the operator to delete unwanted photos or tag photos for wireless transmission. Thus for a camera embodiment, the Viewfinder 109 is used to provide a representation of the image that is being captured, in preview and/or post-capture fashion.

In order to provide the display image to the Viewfinder 109, the Sensor 101 is subsampled at a rate to create a version of the image appropriate for display. During preview processing, the system continuously captures the sensor mosaic and sub-samples the resulting mosaic for preview purposes. A histogram of the sampled luminosity is fed into a "linearization" filter to produce a balanced dynamic range for best optical perception. The scaled and "linearized" image is then displayed on the viewfinder module. The histogram data is then adjusted to match the preview image for use in linearizing the next image. The cycle is repeated continuously to provide a real-time viewfinder mechanism. The Viewfinder 109 itself typically operates in conjunction with a display controller and a frame buffer (not shown), both of which may be integrated within the display component itself.

Both the Keypad and Controls and Direct View Display components, which may be conventional in nature, interface directly with the Processor 106 through general I/O (e.g., I/O Bus). Typically, such devices communicate with the microprocessor through means of interrupt requests (IRQ). Both the Keypad and Controls and Direct View Display components are available from a variety of vendors. Examples include Sharp, Toshiba, and Citizen of Japan, Samsung of South Korea, and Hewlett-Packard of Palo Alto, Calif. More customized displays are available from Displaytech, Inc. of Longmont, Colo. For an embodiment that does not need to interact with users, such as a surveillance camera, the foregoing components may be eliminated.

Additionally for a camera embodiment, it is desirable for the device to include an interface for standard peripheral devices, such as a detachable flash device. This may be provided by Hot Shoe (Accessory) Interface 110, which is a general I/O port that may comprise a serial interface of a conventional design that the camera uses to interface to its accessories via the Hot Shoe Interface. In this manner, a flash accessory can be clipped onto the camera via the Hot Shoe Interface for added illumination.

The Hot Shoe Interface 110 combines a Ser. Peripheral Interface (SPI) with a multiplexed I/O bus which provides a plug-and-play interface to a family of accessories. These accessories may include, in addition to a flash unit, a wireless holster for cellular phones (e.g., available from Motorola, Nokia, Ericsson, and Samsung), extra film backs for compatibility with format digital film (e.g., Sony Memory Stick or SmartMedia), a USB cradle, an RJ-11 modem cradle, a wireless cellular module, extender cables, and the like. In the currently-preferred embodiment, the interface is based on the $I^2C$-standard serial interface, which supports logic allowing the device to sense $I^2C$-compatible devices that are attached to the port. $I^2C$, which stands for Inter IC Communication, is a serial bi-directional communication protocol created by Philips Semiconductor (subsidiary of Philips Electronics, based in The Netherlands) and is used for communication between integrated circuits. Most systems have one master and several slaves that communicate using only two wires. Every device has its own identification code. If that code is sent by the master only that device will respond with an acknowledgement. After the acknowledgement, the data to be communicated is sent or received by the master. Further information about the $I^2C$ communication protocol is available from Philips Electronics of The Netherlands. As with the Keypad and Controls 108 and Direct View Display or Viewfinder 109, the Hot Shoe Interface 110 itself is not required for implementing the image capturing and processing methodology of the present invention. In the specific embodiment of a consumer product such as a camera, though, these components typically would be included.

The system includes Digital Film Flash Memory 111, which serves as the "digital film" for the system for storing compressed images. The Flash Memory 111 may comprise available flash memory removable media, such as Compact-Flash, DataFlash, and Sony Memory Stick, typically in a 16 MB or larger size. Available vendors for flash memory include, for example, SanDisk of Sunnyvale, Calif. or Sony of Japan. Alternatively, the Flash Memory 111 may be affixed directly (i.e., non-removable) to the system 100. In such an embodiment, the additional bulk associated with a removable media cartridge holder and its accompanying interface may be avoided. Those skilled in the art will appreciate that the system 100 may incorporate other non-volatile memory configurations and designs that readily accommodate the image capture and processing methodology of the present invention. In general, for a consumer device embodiment, one should choose media that accommodates on the order of 100 compressed images or more.

The camera embodiment is powered by a single CR-123 lithium battery (not shown), provided with instant-on capability. Due in part to the distributed image processing approach of the present invention (presented below), the camera has significant power savings over other camera designs. This gives the device not only a size and weight advantage over other cameras but also a battery life advantage.

For connectivity, the system includes a wireless holster, a USB cradle, and a modem cradle. The wireless holster physically connects the camera to a cellular phone (e.g., Motorola StarTAC cellular phone) and interfaces the Hot Shoe Interface to the phone's external accessory plug. The camera can be easily pulled out of the holster for use and clipped back in for transmission. Detection of the holster and phone signal is automatic to allow for hands-free transmission and there is no risk of corruption due to interruption by either loss of signal or unclipping. The camera clips into the USB cradle through the Accessory Hot Shoe Interface 110 to provide rapid photo interchange to a personal computer equipped with a standard USB port. The USB cradle acts a USB slave device and therefore requires no batteries or power supply for operation and instead draws its power from the PC. The camera can also clip into a modem cradle through the Hot Shoe Interface. The modem cradle allows the camera to transmit images to the PhotoServer via a land line connection (e.g., 33.6 KBps) via a standard RJ-11 phone jack. The modem cradle is powered by the battery in the camera.

The specifications for the currently-preferred camera embodiment may be summarized as follows.

TABLE 1

Miniature Wireless Digital Camera Specifications:

| | |
|---|---|
| Sensor: | 1.3 Mega-Pixel Color CMOS |
| Optics: | 18 mm Fixed Focal Length, Fixed Aperture |
| Exposure Control: | Automatic, Macro Mode, Indoor/Outdoor Mode |
| Processor: | ARM 32-bit RISC |
| Chipset: | Image Processor (Lightsurf PhotonOne) |
| Memory: | 4 Mbytes DRAM + 128 Kbytes SRAM |
| Digital Film: | 16 Mbytes Internal Flash Film |
| File Format: | Progressive Photograph Format (PPF) |
| Wireless Protocol: | Communication protocol, such as packet-based TCP/IP, WAP, or the like |

TABLE 1-continued

Miniature Wireless Digital Camera Specifications:

| | |
|---|---|
| Battery: | CR-123 |
| Accessory Interface: | Accessory Hot Shoe |
| Accessories: | Flash Unit, Extra Film Back, Motorola Cellular Holster, USB Cradle, Modem Cradle |

B. Basic Computer Hardware (e.g., for Desktop and Server Computers)

Figure 1B:
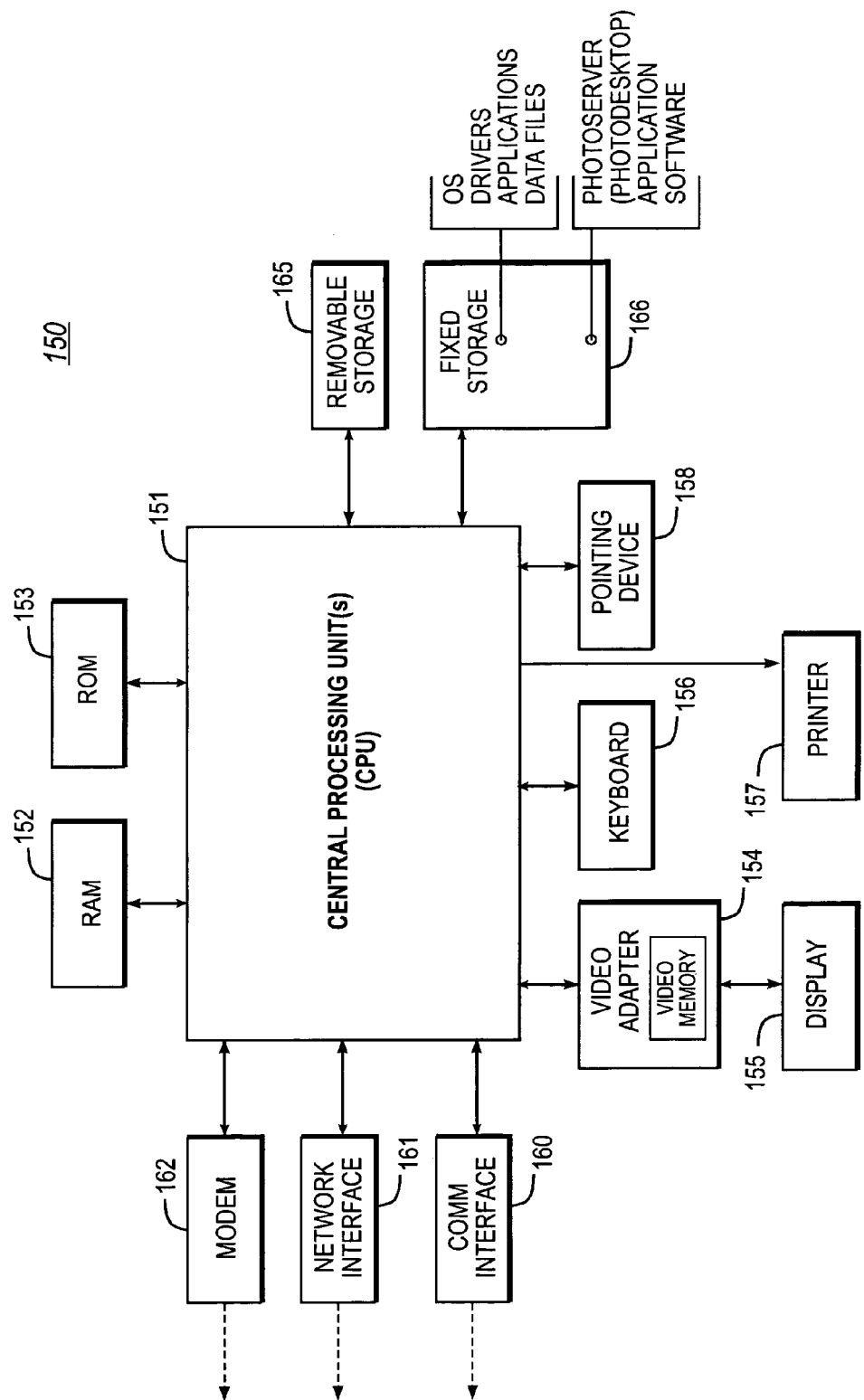
FIG. 1B is a block diagram illustrating a digital computer suitable for implementing distributed processing portions of the present invention.

Portions of the present invention may be implemented on a conventional or general-purpose computer system, such as an IBM-compatible personal computer (PC) or server computer. FIG. 1B is a very general block diagram of an IBM-compatible system 150, which is adapted to include portions of the distributed image processing of the present invention. As shown, system 150 comprises a central processor unit(s) (CPU) 151 coupled to a random-access memory (RAM) 152, a read-only memory (ROM) 153, a keyboard 156, a pointing device 158, a display or video adapter 154 connected to a display device 155, a removable (mass) storage device 165 (e.g., floppy disk), a fixed (mass) storage device 166 (e.g., hard disk), a communication port(s) or interface(s) 160, a modem 162, and a network interface card (NIC) or controller 161 (e.g., Ethernet). Although not shown separately, a real-time system clock is included with the system 150, in a conventional manner.

CPU 151 comprises a processor of the Intel Pentium® family of microprocessors. However, any other suitable microprocessor or microcomputer may be utilized for implementing the present invention. The CPU 151 communicates with other components of the system via a bi-directional system bus (including any necessary I/O controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 152 serves as the working memory for the CPU 151. In a typical configuration, RAM of sixteen megabytes or more is employed. More or less memory may be used without departing from the scope of the present invention. The read-only memory (ROM) 153 contains the basic input/output (I/O) system code (BIOS)—a set of low-level routines in the ROM that application programs and the operating systems can use to interact with the hardware, including reading characters from the keyboard, outputting characters to printers, and so forth.

Mass storage devices 165, 166 provide persistent storage on fixed and removable media, such as magnetic, optical or magnetic-optical storage systems, flash memory, or any other available mass storage technology. The mass storage may be shared on a network or it may be a dedicated mass storage. As shown in FIG. 1B, fixed storage 166 stores a body of program and data for directing operation of the computer system, including an operating system, user application programs, driver and other support files, as well as other data files of all sorts. Typically, the fixed storage 166 serves as the main hard disk for the system and stores application software implementing the PhotoServer (PhotoDesktop) component described below.

In basic operation, program logic (including that which implements methodology of the present invention described below) is loaded from the storage device or mass (fixed) storage 166 into the main (RAM) memory 152, for execution by the CPU 151. During operation of the program logic, the system 150 accepts user input from a keyboard 156 and a pointing device 158, as well as speech-based input from a voice recognition system (not shown). The keyboard 156 permits selection of application programs, entry of keyboard-based input or data, and selection and manipulation of individual data objects displayed on the display device 155. Likewise, the pointing device 158, such as a mouse, track ball, pen device, or the like, permits selection and manipulation of objects on the display device 155. In this manner, these input devices support manual user input for any process running on the system.

The computer system displays text and/or graphic images and other data on the display device 155. Display device 155 is driven by the video adapter 154, which is interposed between the display device 155 and the system 150. The video adapter 154, which includes video memory accessible to the CPU, provides circuitry that converts pixel data stored in the video memory to a raster signal suitable for use by a cathode ray tube (CRT) raster or liquid crystal display (LCD) monitor. A hard copy of the displayed information, or other information within the system 150, may be obtained from the printer 157, or other output device. The printer 157 may include, for instance, an HP Laserjet® printer (available from Hewlett-Packard of Palo Alto, Calif.), for creating hard copy images of output of the system.

The system itself communicates with other devices (e.g., other computers) via the network interface card (NIC) 161 connected to a network (e.g., Ethernet network), and/or a modem 162 (e.g., 56K baud, ISDN, DSL, or cable modem), examples of which are available from 3Com of Santa Clara, Calif. The system 150 may also communicate with local occasionally-connected devices (e.g., serial cable-linked devices) via the communication ("comm") interface 160, which may include an RS-232 serial port, a Universal Ser. Bus (USB) interface, or the like. Devices that will be commonly-connected locally to the comm interface 160 include laptop computers, handheld organizers, digital cameras, and the like.

IBM-compatible personal computers and server computers are available from a variety of vendors. Representative vendors include Dell Computers of Round Rock, Tex., Compaq Computers of Houston, Tex., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

The above-described system 150 is presented for purposes of illustrating the basic hardware underlying desktop and server computer components that may be employed in the system of the present invention. For purposes of discussion, the following description will present examples in which it will be assumed that there exists a "server" (e.g., Web server) which communicates with one or more "clients" (e.g., media capturing devices). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

C. Basic System Software

Figure 2:
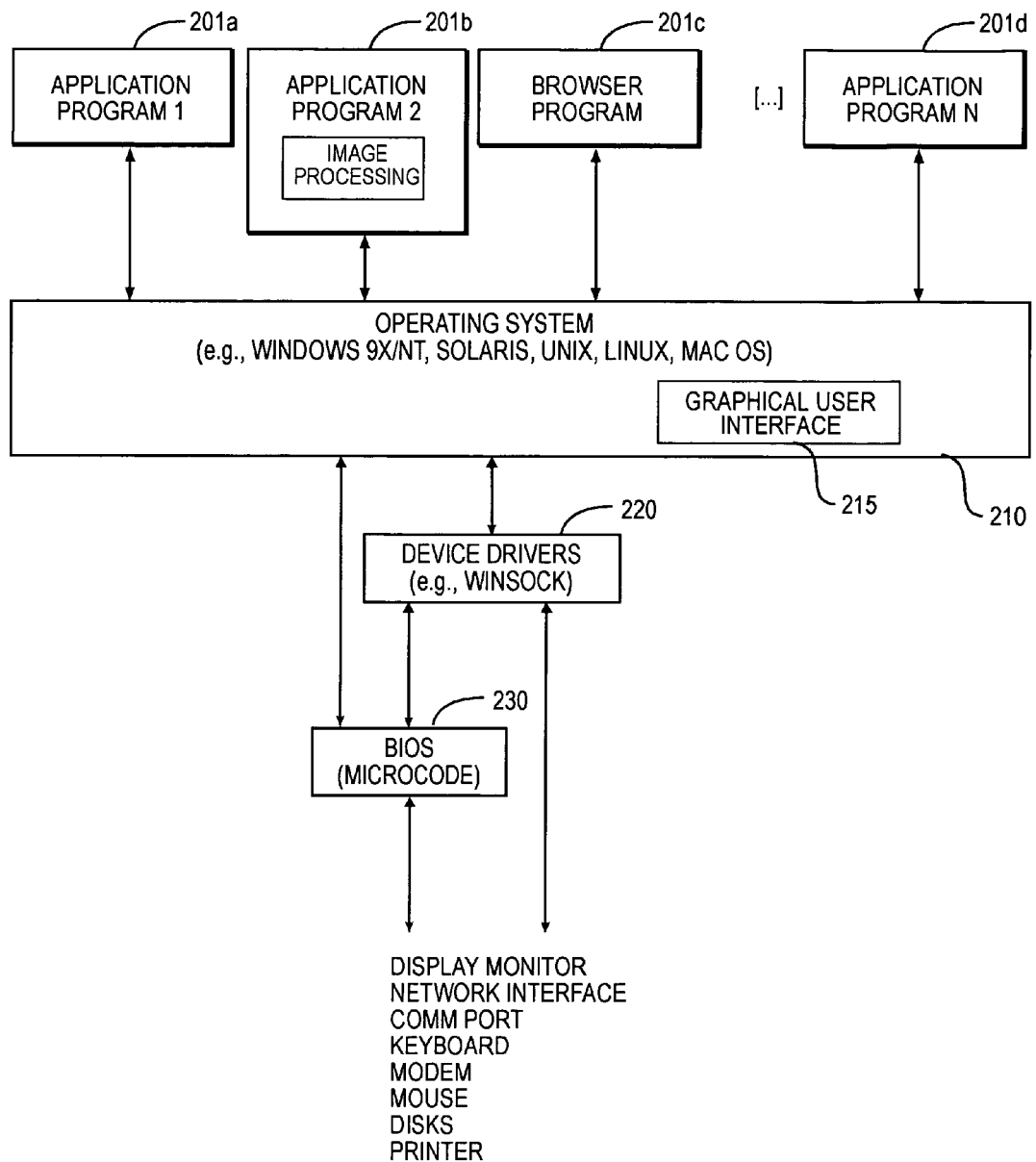
FIG. 2 is a block diagram of a software system suitable for controlling the computer of FIG. 1B.

Illustrated in FIG. 2, a computer software system 200 is provided for directing the operation of the computer system 150. Software system 200, which is stored in system memory (RAM) 152 and on fixed storage (e.g., hard disk) 166, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d), including image processing software, may be "loaded" (i.e., transferred from fixed storage 166 into memory 152) for execution by the system 150.

Software system 200 includes a graphical user interface (GUI) 215, for receiving user commands and data in a graphical (e.g., "point-and-click") fashion. These inputs, in turn, may be acted upon by the system 150 in accordance with instructions from operating system 210 and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver) and the system BIOS microcode 230 (i.e., ROM-based microcode), particularly when interfacing with peripheral devices. OS 210 can be provided by a conventional operating system, such as Microsoft® Windows 9x, Microsoft® Windows NT, or Microsoft® Windows 2000, all available from Microsoft Corporation of Redmond, Wash. Alternatively, OS 210 can also be an alternative operating system, such as IBM OS/2 (available from IBM of Armonk, N.Y.) or Macintosh OS (available from Apple Computer of Cupertino, Calif.).

Distributed Digital Image Processing

A. Basic Design Consideration

The basic approach adopted by the present invention during media capture is to adopt techniques for reducing the amount of processing power required by a given digital camera device and for reducing the bandwidth required for transmitting image information to a target platform. Every digital imaging device is inherently connected. Consider, for instance, a digital camera. It does not necessarily appear to be a "connected" device, as it may initially give the appearance of an end-to-end solution, where one is capturing an image, processing that image, and then storing it on digital film. In reality, however, the true end product is some type of output, such as a printed image used in a document. As it turns out, somewhere along the way the image is taken off the device and transmitted to yet another computing device, such as a server or desktop computer, where, for instance, the image may be cropped, touched up, or otherwise processed. Therefore, a digital image—due to the fact that it is digital—is inherently related to all other types of computing devices that can handle images. Given that environment in which digital cameras exist, there is an opportunity to take advantage of other processing power that is eventually going to come into contact with the images that are produced by the digital imaging device ("imager"). More particularly, there is an opportunity to defer and/or distribute the processing between the digital imager itself and the target platform that the digital imager will ultimately be connected to, either directly or indirectly. Therefore, rather than attempting to invent a revolutionary way to get better hardware performance (i.e., better silicon technology) or a revolutionary compression technique, the approach of the present invention is to decrease the actual computation that occurs at the digital imager: perform a partial computation at the digital imager device and complete the computation somewhere else—somewhere where time and size are not an issue (relative to the imager). In other words, recognizing that the images captured by a digital camera will typically end up on another computing device, the approach of the present invention is to take advantage of that fact by "re-architecting" the digital camera to defer resource-intensive computations, thereby substantially eliminating the processor requirements and concomitant battery requirements for digital cameras. Further, the present invention adopts an image strategy which facilitates transmission of images, thereby facilitating the wireless transmission of digital camera images.

For purposes of determining how to defer and/or distribute processing, the overall process of digital imaging, from capturing a light image to storing a digital representation of that image, may itself be viewed as comprising various subprocesses. Once individual subprocesses are identified, one can investigate various approaches for deferring and/or distributing those subprocesses to other devices. Consider, for instance, a decision to defer image compression. Such an approach entails immediate problems, however. The digital camera must have sufficient resources to store, at least temporarily, uncompressed images, which tend to be quite large in size. Although storage technology (e.g., flash memory) can be expected to have ever-increasing capacity, present-day storage technology makes that approach unattractive, if not impractical. Another difficulty posed by that approach is that the digital camera must exchange images in an uncompressed format with the target device (e.g., desktop computer). Again, such an approach is unattractive since it would require the user to spend an inordinate amount of time transferring images to the target device, given the limited bandwidth that is commercially feasible for downloading pictures from a digital camera. Therefore, an approach of eliminating compression is not attractive, unless one can somehow obtain massive storage and bandwidth capacity for the digital camera. The immediate challenge posed by a deferred/distributed processing approach, therefore, is how one can accomplish the approach in a manner that does not contradict the ultimate goal of obtaining quality digital images on a portable digital camera. To address this challenge, the entire imaging process, including its individual elements, is examined in order to figure out how the process can be reproduced in a manner that compute-intensive portions of the process are performed somewhere other than the digital camera itself, but done so in a manner that does not compromise the image information necessary for reconstructing a digital image of acceptable quality.

B. Distributed Image Processing

The imaging process approach of the present invention employed during media capture includes a rapid foreground process to capture and compress the image (e.g., one-second cycle) and a slower background process to further compress and transmit the image. The foreground process is optimized for speed to facilitate continuous rapid snapshots while the background process is optimized for power. The two-stage processing mechanism is assisted by an imaging processing server, the "PhotoServer," which typically includes Internet connectivity.

The first stage, the foreground stage, is performed in the camera itself. This stage produces a highly-compressed image based on wavelet transform technology. This image is stored on the 16 MB of digital film inside the camera. The image is then transmitted to the PhotoServer (target platform) via a packet-based protocol such as a Progressive Photograph Format (PPF) file. Suitable protocols include, for instance, Transmission Control Protocol/Internet Protocol (TCP/IP) and Wireless Application Protocol (WAP). For a description of TCP/IP, see e.g., Parker, T. et al., *TCP/IP Unleashed*, Sams Publishing, p. 33 et. seq., the disclosure of the reference in its entirety being hereby incorporated by reference. For a description of WAP, see e.g., Mann, S., *The Wireless Application Protocol*, Dr. Dobb's Journal, pp. 56–66, October 1999, the disclosure of which is hereby incorporated by reference.

The PPF mechanism (described in further detail below) allows selective transmission of varying degrees of photographic significance while maintaining the remaining elements of significance on the digital film in the camera. A lower-quality image transmitted to the server can later be upgraded to a higher-quality version simply by synchronizing the remaining elements of significance stored in the PPF file. The second stage of the process, the background stage, is performed on the PhotoServer. This stage completes the image processing cycle and produces a high-quality, color-balanced, compressed image in a standard file format such as JPEG. A similar second stage process also exists in a desktop implementation, the PhotoDesktop, for customers who wish to transfer images to a desktop computer (as the target platform) using a USB (universal serial bus) cradle accessory or other communication link.

Figure 3A:
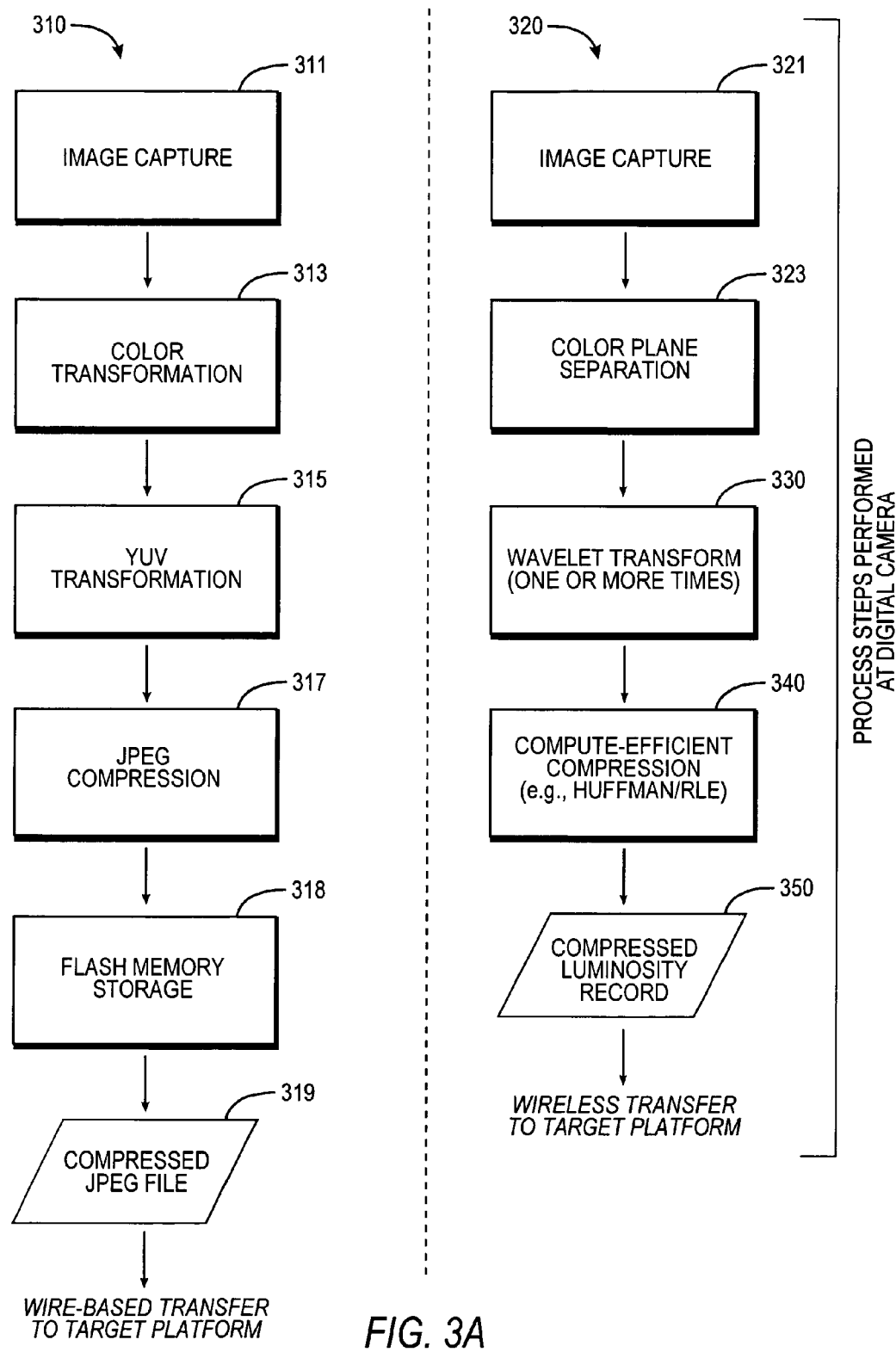
FIG. 3A is a block diagram illustrating a methodology of the present invention for distributed digital image processing (including contrasting it with conventional digital image processing).

Detailed construction and operation of the foregoing is perhaps best described by way of comparison with conventional digital image processing. FIG. 3A illustrates on its left-hand side a high-level process or methodology 310 that comprises the individual processes (i.e., subprocesses) or steps routinely employed for digital image processing. The digital imaging process or sequence 310 begins with image capture, as represented by capture block or capture process 311. This is the process of capturing light data (image) from a sensor and, in response, generating digital representations of that data (i.e., digital light levels based on the captured image). This is, in effect, an in-memory image of the light which has entered the camera's lens and struck the camera's CCD or CMOS sensor. It is interesting to note that at this point the digital camera has only captured light levels. Color information per se does not yet exist. Instead, color information, which must be inferred, is not determined yet at this point in the digital imaging process.

The capture process 311 is conventionally followed by a color interpolation (transformation) process 313, where color information may indeed be determined and applied to the image. In practice, the camera is able to infer color information based on captured luminance data and information that it knows about the individual pixels and where they lie within a matrix of color (pixels) that cover the surface of the camera's sensor. This information is now applied to the image by the color interpolation process 313, which is a compute-intensive process.

Because the human eye is more perceptive to certain colors than others, further processing of the image is required. The standard color space that the device "sees" the image in (e.g., RGB color space or model) is not necessarily the way that the human eye would view the image. For instance, the human eye has a certain distribution of retinal cones that are more sensitive to certain wavelengths of light. Therefore, in an effort to better match that expected by the human eye, YUV transformation process 315 maps or translates the image (e.g., RGB-based image) into YUV color space, a color model which takes into account luminance and chrominance. In YUV, Y is the luminance component, and U and V are the color or chrominance components. Luminance serves as a quantitative measure of brightness. Chrominance, on the other hand, reflects the difference in color quality between a color and a reference color that has an equal brightness and a specified chromaticity. In essence, the YUV transformation process 315 is a matrix transformation. Here, the red, green, and blue (RGB) values that apply to a particular piece of pixel data are multiplied by a vector which, in turn, translates the values into YUV color space. Although the individual transformation itself is not particularly complicated, the YUV transformation process 315 is applied to every pixel of the image and, thus, consumes a lot of processing cycles. Accordingly, the YUV transformation process 315 itself is also compute-intensive.

Now, the image may be compressed as represented by compression process 317. The basic approach applied in image compression is to prioritize the image data according to how a human eye would normally see it. In lossy image compression technique (e.g., JPEG), the chrominance levels that are less important to the human eye are compressed out. Luminance, which the human eye is more sensitive to, is given priority in the compression. Lossy techniques, which function largely by eliminating information that is the least significant to the human eye, are described in the technical, trade, and patent literature. See e.g., Nelson, M. et al., *The Data Compression Book*, Second Edition, Chapter 11: Lossy Graphics Compression (particularly at pp. 326–330), M&T Books, 1996. Also see e.g., *JPEG-like Image Compression* (Parts 1 and 2), Dr. Dobb's Journal, July 1995 and August 1995, respectively (available on CD ROM as *Dr. Dobb's/CD Release* 6 from Dr. Dobb's Journal of San Mateo, Calif.). The disclosures of the foregoing are hereby incorporated by reference.

After the foregoing lossy image capture process, the now-compressed image may be stored on persistent media. As indicated by processing block 318, conventional flash memory (or other suitable media) may be employed for this purpose, such as any one of the flash memory varieties previously mentioned. The end result is a compressed JPEG file 319, as shown.

The design goal of digital cameras today is to generate at the digital camera itself complete color images that are compressed in a standard image format (e.g., JPEG). This sequence, however, incurs multiple compute-intensive processes, including the color transformation process 313, the YUV interpolation process 315, and the compression process 317, with the end result being a relatively large image that is not well-suited for wireless transmission. In accordance with the teachings of the present invention, however, the foregoing design goal is not adopted. Note that the very color images that have been processed, at great computational expense, into a standard image format at the digital camera will ultimately be transferred to another device— another piece of computing hardware. If one assumes, for instance, that the images do not necessarily have to be exactly a color JPEG (or other standard image format) while stored on the digital camera, but that the images will be a color JPEG ultimately (e.g., target device), then one can begin to defer some of the processes required for processing digital images. In accordance with the present invention, image processing of a digital camera is performed in such a manner so as to retain the advantage of compression at the digital camera but remove the compute-intensive components of the process, so that they may be performed elsewhere (other than the digital camera itself). This process will now be described in further detail.

The approach of the present invention exploits the fact that there is really no such thing as "color sensitivity" on the digital camera. Instead, the camera uses a color inference transformation that employs a mosaic pattern of color pixels overlaid on a light-level sensor (e.g., CCD or CMOS sensor). For instance, as light shines through a red tile on the mosaic, it lights up the light-sensing element behind it. That element, in turn, records the luminosity observed. The digital camera may then employ its internal knowledge of the mosaic pattern—the specific arrangement of red, green, and blue pixels (of which there are a variety of standard patterns)—to infer the actual color. Each pattern itself tends to be a small, repeating pattern that is capable of being represented with a small amount of data. For example, a Bayer pattern will consist of a 2×2 pixel section (four pixels total) of two green pixels on one diagonal and a red and blue on another diagonal that is repeated over and over again. A simplistic approach to using the light information arriving at a particular pixel section is to merge together (i.e., matrix transformation) the information to produce four pixels having the same RGB level, at one quarter the resolution, but with accurate color data. Another approach is to take into account the luminosity observed at each of the pixels, so that not only is color information incorporated into the image processing but also the sharpness that is being perceived by each sensor as well.

The color interpolation process does not itself enhance the image data. Although it is certainly required for ultimately rendering a color image, it itself need not necessarily be performed at the digital camera and can therefore be deferred. Stated differently, if the knowledge of the color pattern can be placed somewhere else and the color image need not be completely generated right away (i.e., at the digital camera), then the step or process of transforming the originally-captured image into a color image may be deferred. In accordance with the present invention, the color interpolation and transformation process is in fact deferred altogether. Instead, the R, G, B color planes are separated and compressed. The compressed images are packaged into a single stream with header information to identify the individual bit-streams. The combined bit-stream may then be transmitted to the target device, with a small descriptor of what Bayer pattern should be applied either being transmitted to, or being assumed by, the target device.

The right-hand side of FIG. 3A illustrates a preferred methodology 320 for digital image processing in accordance with the present invention. At the outset, an image is captured by capture process 321, in a manner similar to that previously described for capture process 311. At the moment the shutter button is depressed, the sensor captures a full detail mosaic in two phases. The first phase is captured with the mechanical shutter closed, the second with the shutter open. Both phases happen in rapid succession, with the first being used to normalize the black level of the second. The mosaic is then fed into a linearization filter using the coefficients from the last preview frame prior to shutter click and serialized to DRAM. The image is also scaled to match the operator-selected image capture resolution. Any aberrant pixel data should fall outside of the dynamic range provided by the histogram and consequently be canceled out.

Next, the color interpolation or transformation process is entirely avoided. Instead, the methodology 320 immediately moves to extraction of the color planes, shown as color plane separation process 323, followed by a wavelet transform process 330 to prioritize information in the color planes. Here, the separated color planes are fed into a wavelet transform image—that is, a preferably hardware-implemented (for performance) wavelet transform process. Over a series of repeated cycles, the wavelet engine transforms the luminosity image in place in DRAM.

The wavelet transform process itself may be thought of as a process that applies a transform as a sequence of high- and low-pass filters. In operation, the transformation is applied by stepping through the individual pixels and applying the transform. This process, which creates an image that contains four quadrants, may for instance be performed as follows. First, a high-pass transform then a low-pass transform is performed in the horizontal direction. This is followed by a high-pass transform then a low-pass transform performed in the vertical direction. The upper-left quadrant is derived from a low-pass horizontal/low-pass vertical image; the lower-left quadrant comprises a high-pass horizontal/low-pass vertical image; the upper-right quadrant comprises a low-pass horizontal/high-pass vertical image; and the lower-right quadrant comprises a high-pass horizontal/high-pass vertical image. The result of this is that the information most important to the human eye (i.e., the information that, from a luminosity or black/white perspective, the human eye is most sensitive to) is in the high-priority "low/low" quadrant, that is, the upper-left quadrant which contains the low-pass horizontal/low-pass vertical image. Most of the information in the other three quadrants, particularly the lower-right quadrant, is fundamentally zero (when based as an onset of a center frequency), that is, image information that is least perceived by the human eye. Thus, the low/low quadrant is considered the highest-priority quadrant, with the remaining quadrants being considered to be of much lower priority.

The transform is a completely reversible process, such that the original image (luminosity record) may be restored without loss of information. In practice, however, some information is lost as a result of the process being performed digitally, as digital computing devices are of course only able to perform real number math with finite, not infinite, precision. Nevertheless given enough digital significance (that is typically available with processors today), this loss is imperceptible to the human eye. The human eye is perceptive only to a bit depth in the range of about five to six significant bits of image data (based on a certain center frequency). As a result, processing the image with even modest processing capability (e.g., a bit depth of 16 significant bits) generates a transform that is reversible in a manner that is not perceptible to the human eye. Here, the image data is arranged without any reliance on color in such a way that the information most important to the human eye is one-quarter of its original size. If desired, the best-perceived quadrant (e.g., the upper-left quadrant for the example sequence above) may be used as a basis to provide the user with a black and white image at the digital camera (e.g., for preview purposes).

In basic operation, the transform process consists of processing the image as a whole in a stepwise, linear fashion. For instance, when processing the image in a horizontal direction, one would take a horizontal vector of image data (e.g., seven horizontal neighboring pixels) and multiply that by a predetermined set of coefficients (e.g., seven coefficients for a seven-pixel vector). This yields a single-pixel value. Then the process continues in a sliding-window fashion by shifting over by some number of pixel(s) (e.g., two pixels), for processing the next vector of seven horizontal neighboring pixels. Further description of the wavelet transform process may be found, for instance, in the technical and trade literature. See e.g., Pigeon, S., *Image Compression with Wavelets*, Dr. Dobb's Journal, August 1999, pp. 111–115. The disclosure of the foregoing is hereby incorporated by reference, for all purposes.

Figure 3B:
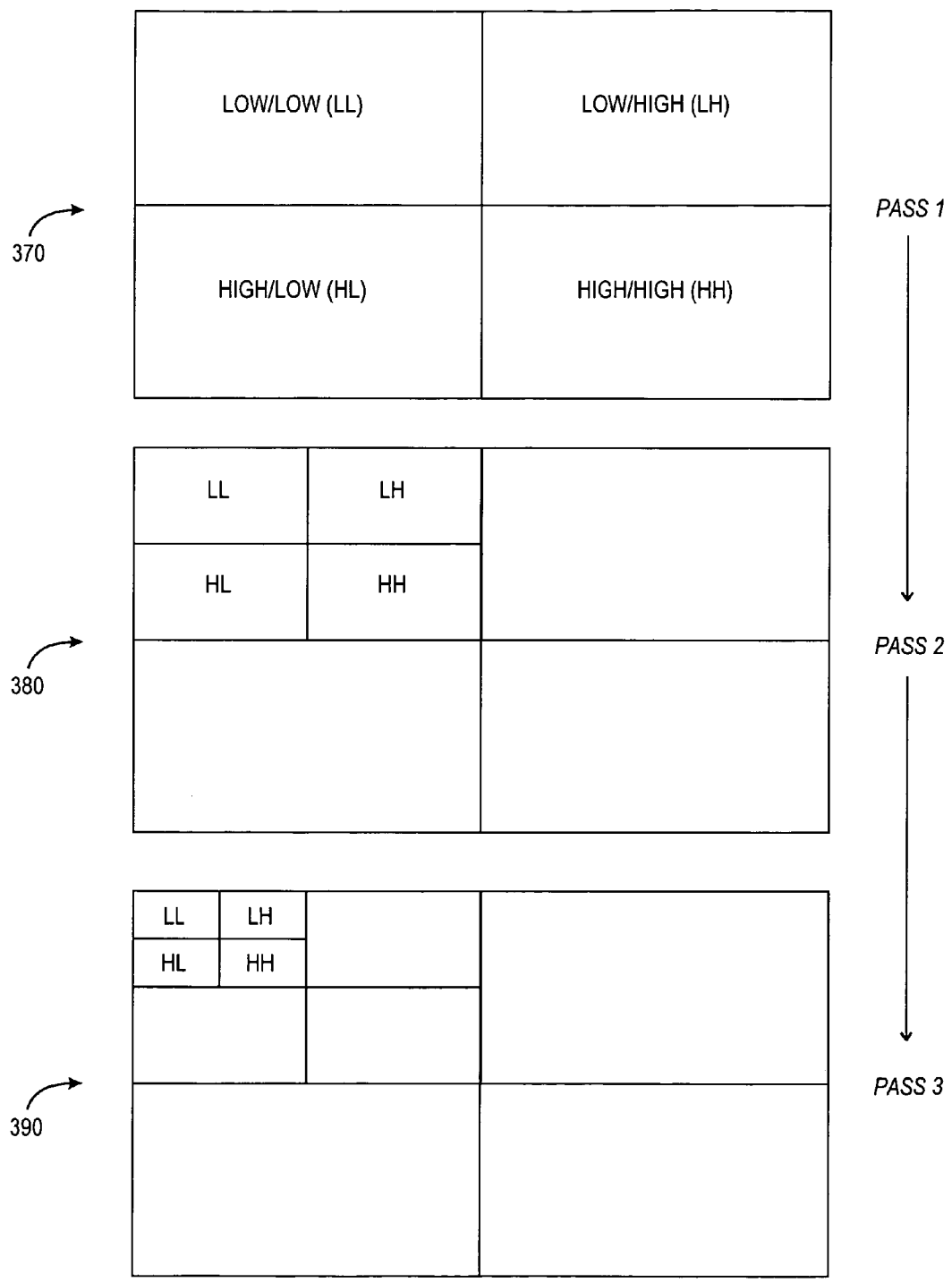
FIG. 3B is a block diagram illustrating a multi-pass wavelet transform process.
Figure 3C:
FIGS. 3C–I are black and white photographic images that compare the results of JPEG compression with wavelet transform.
Figure 3D:
Figure 3E:
Figure 3F:
Figure 3G:
Figure 3H:
Figure 3I:

As illustrated in FIG. 3B, the wavelet transform process may be repeated multiple times, if desired. When repeated, the process of applying high- and low-pass filters is repeated for the low/low quadrant of the then-current image (i.e., the prior result of high-pass horizontal and vertical filtering), again generating a four-quadrant image. For instance, as shown in FIG. 3B, the wavelet-transformed image 370, which has already undergone a first pass of the wavelet transform, is subjected to another pass of the wavelet transform process to generate wavelet-transformed image 380—that is, an image that has undergone two rounds of wavelet transformation. The process may continue in this fashion, for example, generating wavelet-transformed image 390. Each time, the subsequent pass is performed on the prior-resulting low/low quadrant. Those skilled in the art will recognize that other quadrants could also be decomposed in a similar manner. This process may continue recursively until the desired transformed image is obtained. Whether the image is transformed with a single pass or multiple passes, the end result is still a wavelet-transformed image. This image is "quantized" (i.e., reduced in bit depth) by dividing the wavelet coefficients (i.e., the numerical value of the pixels in the wavelet-transformed image) by a quantization scale factor. The quantization can differ from one band to another. The quantizations step sizes will be included in compressed bit-stream and will be used by the decompression system (e.g., on the desktop/server) to reverse the above process. Note that quantization and dequantization leads to loss of precision in the wavelet data and represents the lossy part of the compression. After quantization, the wavelet coefficients are compressed losslessly by one of several generic binary compression techniques (e.g., bit-plane decomposition of bands, followed by arithmetic coding).

After generating the wavelet-transformed image, therefore, the preferred methodology 320 of the present invention proceeds to apply compression to the image. At this point, the image information (i.e., all quadrants and subquadrants) can be compressed as if it were fundamentally just a normal binary file. Thus, one can apply a simple, conventional compression, as a compute-efficient compression process, as indicated by compression process 340. In a preferred embodiment, the compression is performed in succession stages. First, run-length encoding (RLE) is applied to compress the image data. RLE itself is a simple, well-known technique used to compress runs of identical symbols in a data stream. The insignificant regions of the image data (i.e., the low-priority quadrants) tend to be predominantly centered around a single value; these can be compressed substantially. When applying run-length encoding to this type of information, for instance, one gets extremely long runs of similar data. The image is serialized to flash memory during the encoding process to free the DRAM for the next image capture. The entire cycle from image capture through stage one compression and serialization to flash is rapid (e.g., less than one second) for the highest-quality mode. The camera is then ready to take another photograph. RLE, which typically encodes a run of symbols as a symbol and a count, is described in the patent, technical, and trade press; see, e.g., Zigon, Robert, *Run-Length Encoding*, Dr. Dobb's Journal, February 1989 (available on CD ROM as *Dr. Dobb's/CD Release* 6 from Dr. Dobb's Journal of San Mateo, Calif.), the disclosure of which is hereby incorporated by reference. In addition to RLE, the methodology 320 may include discarding low-priority data in order to provide more aggressive lossy compression.

This target result may then, in turn, be further compressed using Huffman coding, for generating a final compressed luminosity record 350 that is suitable for storage on a digital camera and for wireless transmission. Huffman coding is a method of encoding symbols that varies the length of the symbol in proportion to its information content. Symbols with a low probability of appearance are encoded with a code using many bits, while symbols with a high probability of appearance are represented with a code using fewer bits. Huffman coding is described in the patent, technical, and trade press; see, e.g., Nelson, M. et al., *The Data Compression Book*, Second Edition, Chapters 4 and 5, M&T Books, 1996, the disclosure of which is hereby incorporated by reference.

The wavelet transform-based compression used in the digital camera 100 achieves significantly better image quality than traditional JPEG compression used in other digital cameras. The image comparisons presented in FIGS. 3C–I illustrate this. The standard reference image for compression algorithms is the Lena image, shown in FIG. 3C in original uncompressed detail. The following image sets illustrate the resulting relative image degradation of wavelet and JPEG techniques for varying compression ratios. At an ultra-aggressive 48:1 compression ratio, the Lena image is still of reasonable quality using wavelet transform (FIG. 3E) while JPEG (FIG. 3D) has generated unacceptable pixelization. At a compression ratio of 32:1, the Lena image is showing better edge detail with wavelet transform (FIG. 3G) while JPEG (FIG. 3F) is still largely pixelized and unacceptable. At a compression ratio of 16:1, the fast quality compression ratio, wavelet transform (FIG. 3I) has produced a good quality image with good edge definition and few noticeable artifacts. JPEG (FIG. 3H), on the other hand, is barely approaching an acceptable image comparable with a wavelet ratio of 32:1 or more. Thus, the foregoing demonstrates that the wavelet transform-based compression technique produces far better shade continuity and edge detail than the equivalent JPEG.

Thus as described above, the camera-implemented portion of image processing (i.e., methodology 320) foregoes color processing. Instead of performing YUV transformation, the methodology performs wavelet transform compression on an image comprising a luminosity record. Further, JPEG-style compression, which is fairly compute-intensive, has been removed. Instead, the methodology 320 applies generic binary compression (e.g., run-length encoding and Huffman coding), which is far less compute-intensive. Note in particular that, up to this point, image compression in accordance with the present invention has been performed in a manner which is largely lossless, not lossy. Loss of image information at this point, which is quite small, is due only to digital rounding errors. If desired, however, additional compression techniques, including lossy ones, may be applied (e.g., at additional compression process 340). For instance, the image may be further compressed by reducing the bit depth in the low-priority quadrants.

The end result is that the amount of processing necessary to go from a captured image to a compressed record of the captured image (i.e., a record suitable for storage on the digital camera) is substantially less than that necessary for transforming the captured image into color and then compressing it into a color-rendered compressed image. Further, the resulting compressed luminosity record, because of its increased compression ratios (e.g., relative to conventional JPEG), facilitates wireless (or other limited bandwidth) transfer of images to target platforms.

The compressed luminosity record 350 is of course optimized for generation and storage on a digital camera, not for viewing by the user. Thus at the point where the compressed luminosity record 350 is transferred to another computing device (e.g., images downloaded to a desktop computer), image processing crosses over the distributed boundary to continue image processing on the target platform. In the currently-preferred embodiment, this is done via wireless transmission. Whenever the camera is connected to the cellular holster via the Hot Shoe clip, a background process is initiated to transmit any pending compressed PPF photographs to the PhotoServer for final processing. The process is transparent to the user, requiring no operator intervention and can occur while the camera is in low-power mode. Using WPTP as the transport layer, the process can be interrupted at any time without worry of any data corruption or need to re-send already transmitted packets.

Estimates for wireless transmission times follow in the tables below. These estimates are shown with varying operator-selectable image resolution and varying operator-selectable image quality. Image quality is a factor of compression ratio. As compression ratios increase, more loss of significant image data occurs.

TABLE 2

Wireless transmission times assuming a 10 Kbps transmission rate

| Quality | Resolution | | |
| --- | --- | --- | --- |
| | Photographic 1280 × 1024 | Standard 1024 × 768 | Internet 512 × 384 |
| High (4:1) | 255 seconds | 153 seconds | 38 seconds |
| Standard (8:1) | 126 seconds | 76 seconds | 19 seconds |
| Fast (16:1) | 63 seconds | 38 seconds | 8 seconds |

TABLE 3

Wireless transmission times assuming a 56 Kbps transmission rate

| Resolution Quality | Photographic 1280 × 1024 | Standard 1024 × 768 | Internet 512 × 384 |
| --- | --- | --- | --- |
| High (4:1) | 51 seconds | 31 seconds | 8 seconds |
| Standard (8:1) | 23 seconds | 15 seconds | 4 seconds |
| Fast (16:1) | 13 seconds | 8 seconds | 2 seconds |

As an option, an operator can also transmit the PPF photographs to a personal computer via the USB cradle. This process employs the same packet-based communication protocols except that it happens over a wire-line connection and in the foreground. Photographs transmitted to the PhotoServer or to the PhotoDesktop can be synchronized using sections of the PPF file. Synchronization is the act of supplying any supplemental data to images in order to enhance them to the maximum quality PPF record available. For instance, synchronization of a fast-quality PPF file and a high-quality PPF file of the same image will result in enhancement of the fast-quality image to high-quality.

The Progressive Photograph Format (PPF) itself comprises a sequence of sequential image sections ordered by decreasing optical significance. The first section is the most significant image data and represents a complete fast quality version of the image. This is followed by sections two and three which contain subsequent detail data to enhance the image to normal quality and high quality respectively. Using the PPF approach, a fast-quality image can be transmitted to the PhotoServer, taking maximum advantage of transmission data size and speed. The server image can then be synchronized with the remaining components of the PPF file at a later time to restore the image to its original maximum quality. With this unique approach, the operator does not have to sacrifice image quality in order to maximize wireless throughput.

Now, the remainder of image processing can be performed at the target platform (e.g., server or desktop computer) in a straightforward manner, without the size and portability constraints that are imposed on the digital camera. Moreover, one can apply all of the processor capability of the target platform. Note, however, that the foregoing approach may be modified so that the image is (optionally) color processed at the digital camera (e.g., for viewing as a color JPEG file), yet transmitted as a PPF file, thus preserving the high-compression benefit for wireless transmission.

Figure 4A:
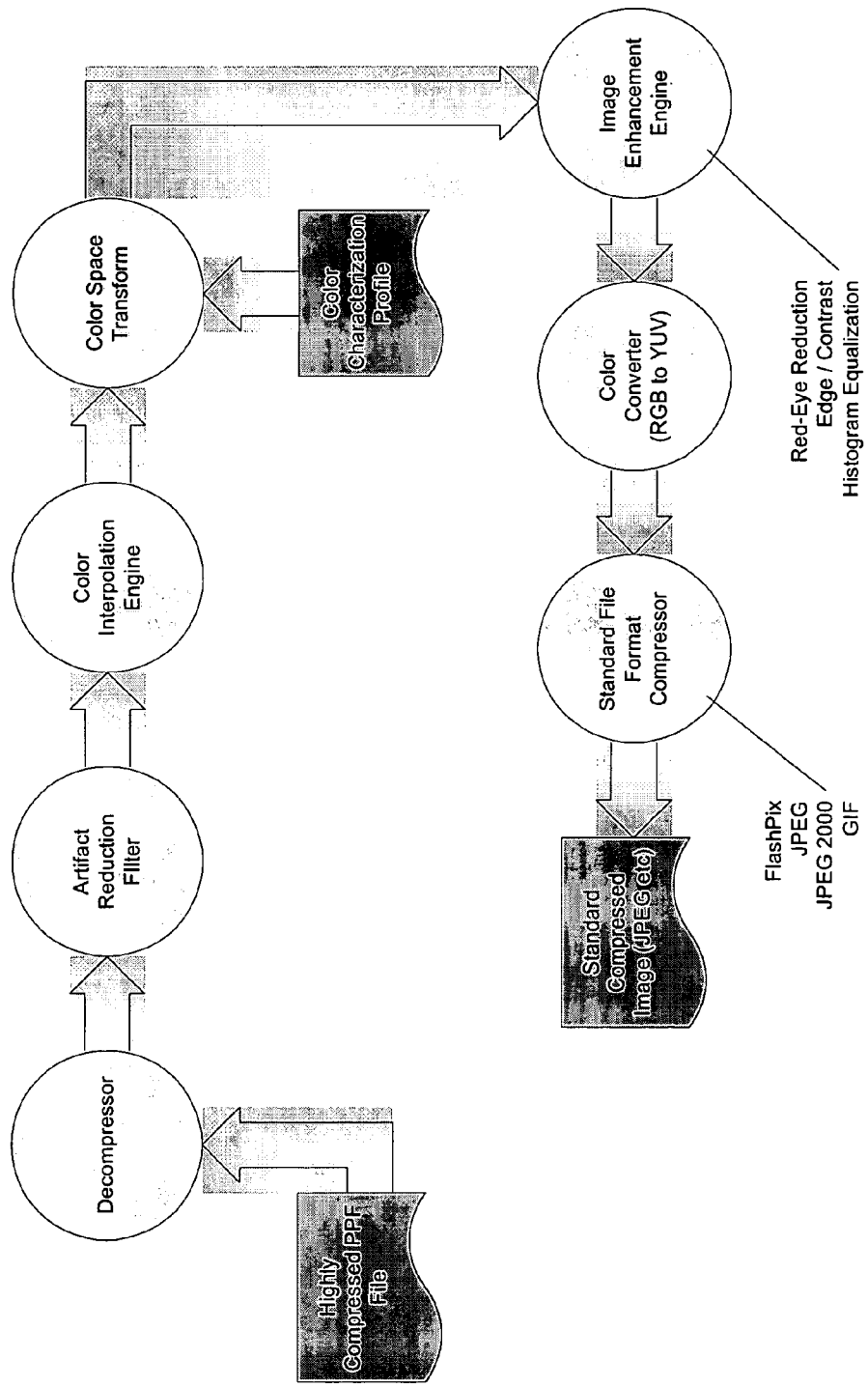
FIG. 4A is a block diagram illustrating overall processing at a target platform (e.g., server or desktop computer).

FIG. 4A provides an overview of the completion of image processing at the target platform. The PhotoServer receives highly-compressed PPF files from the digital camera and completes the image processing cycle. In the decompression phase, a decompressed image is reconstructed from the PPF file. The resulting image is then run through an artifact reduction filter which compensates for artifacts introduced by the camera during the compression process. The result is then arranged into the original sensor color mosaic. The image is then processed by the color interpolation engine, which removes the mosaic pattern and produces a high-quality color image. The resulting image is in the RGB color space. Next the color characterization profile of the specific camera (recorded at factory assembly time) is used to balance the colors in the image to match human color perception. This stage makes up for the differences in how the camera sensor and the human eye see color. The image enhancement phase is optional. In this phase the balanced color image is processed to reduce red-eye artifacts, to enhance contrast, to harden and smooth edges, or even to interpolate to a higher resolution. Finally, the image is again compressed. The resulting output is an industry-standard, high-quality color image file such as JPEG, JPEG 2000, or FlashPix.

Figure 4B:
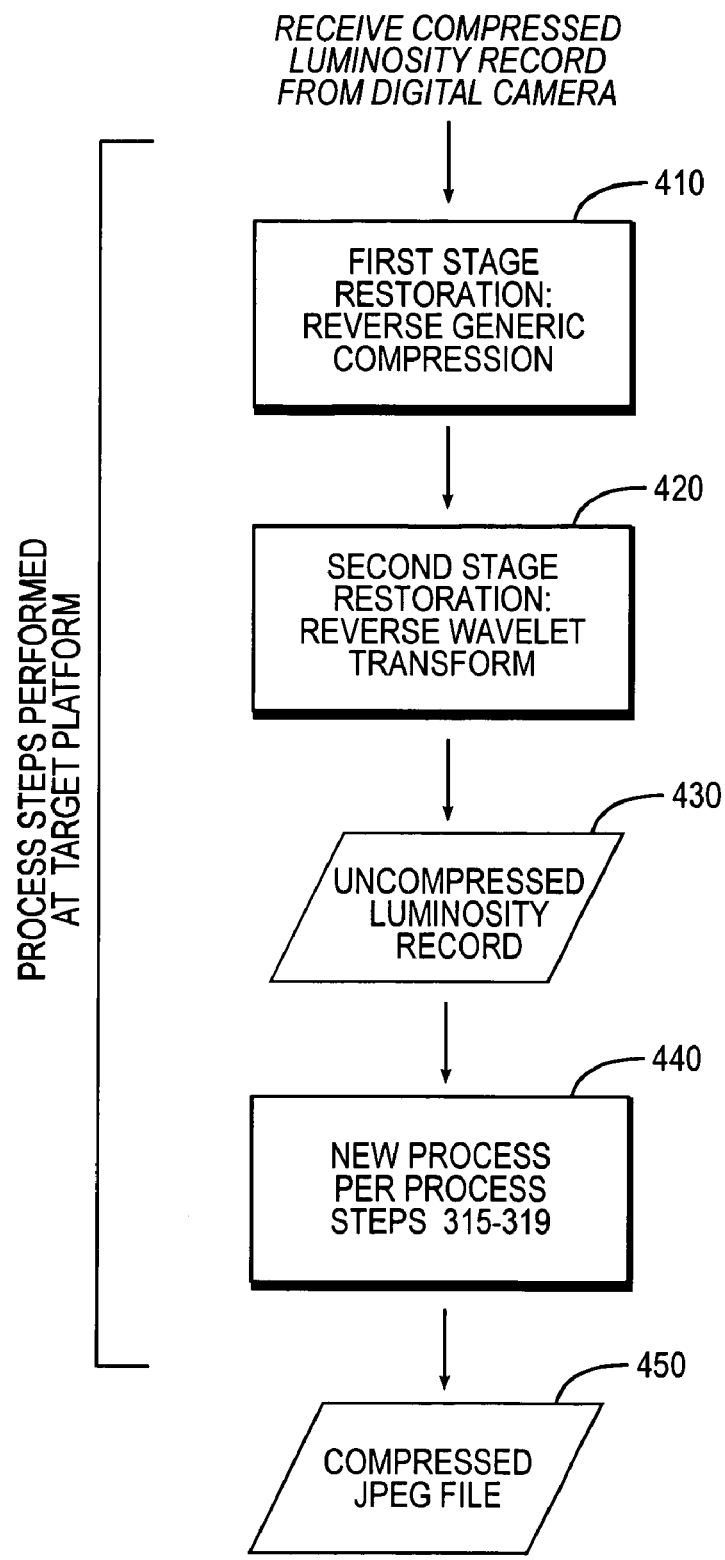
FIG. 4B is a block diagram illustrating method steps of the present invention for completing image processing at a target platform (e.g., server or desktop computer).

FIG. 4B illustrates specific method steps involved at the target platform. First, the decompression process 410 decompresses the compressed luminosity record (e.g., reversing the Huffman coding and RLE compression). Thereafter, the wavelet transform is reversed, for restoring the uncompressed luminosity record. This is illustrated by the inverse wavelet transform process 420. Reversing the wavelet transform process yields an uncompressed luminosity record 430—that is, a record of that which was originally sent from the camera's sensor, in full resolution. As previously noted, some loss of information from the original luminosity record may result, but it is typically at a rate that is imperceptible to the human eye. It is possible to have near lossless compression/decompression but, in the preferred embodiment, some controlled loss is accepted in order to further optimize the process (e.g., avoid adding precision that would not result in better image quality, as perceived by the user). As indicated by process block 440, conventional image processing (e.g., process steps 315–319) can now be applied to the uncompressed luminosity record for generating a color image for storage in a desired (e.g., typically standardized) file format. The end result is that one still ends up with a color digital image stored in one of the standardized formats (e.g., JPEG image 450). After processing the image, the PhotoServer may conveniently be used to further propagate the image, such as making the image available over the Internet to a multitude of other users (e.g., family and friends of the camera user). The image may, of course, also be rendered in hard copy, using a printing device available to the computer.

Note that, in accordance with the teachings of the present invention, the compute-intensive elements of digital image processing have been deferred such that they need not be performed at the digital camera but, instead, are deferred until the image arrives at the target platform (e.g., more powerful desktop or server computer). In this manner, the amount of processing capability required at the camera is decreased, or for a given level of processing power the images may be processed faster at the digital camera. Additionally, the bandwidth required to transmit images from the digital camera to the target platform is substantially reduced, thereby facilitating wireless transmission of the images. At the same time, the present invention accomplishes this without losing the advantages of high compression, such as decreased storage requirement and decreased transmission time for downloading images.

Methodology and File Format for Wireless Progressive Transmission of Digital Images A. Overview The digital imaging device of the present invention incorporates a progressive transmission methodology allowing a user to capture a moment at a high level of quality, yet transmit a version of that image in a manner that is adapted for the communication bandwidth or medium currently available. The approach adopted by the present invention is to incorporate a software-implemented methodology (and supporting file format) into the imaging device itself that records (or is capable of recording) a moment in the full digital quality (desired by the user) but then prioritizes the image information into a variety of logical partitions or layers. Using this layered image information, the system, under control of a user, can choose how much or how little image information is actually transmitted to a target destination at a given point in time. Notwithstanding this flexibility, the user has at all times a full quality recording of the image.

Consider an embodiment of the methodology utilizing, for instance, nine layers. (The approach itself may be extended to any arbitrary number of layers or compartments, however). In such an embodiment, the first layer stores just enough image information to reproduce the image with a reasonable level of quality/resolution (e.g., suitable for Web page viewing). The second layer, containing additive image information, allows the image to be reproduced at a higher level of quality (and/or resolution), when combined with image information from the first layer. The ninth (i.e., final) layer contains the image information that, together with the eight earlier layers, helps reproduce the image at the highest quality/resolution levels desired.

In typical usage, therefore, the user records an image at its full quality on the digital film of his or her imaging device (or highest quality desired by the user), that is, utilizing all layers (e.g., the full nine-layer file for a nine-layer file embodiment). When uploading the image, however, the system optimizes transmission to only that layer or layers suitable for the then-existing communication medium, thereby reducing, if needed, the total amount of image information required to be sent and thus reducing transmission time and bandwidth requirements. Further in accordance with the present invention, the user may elect to collaborate or synchronize the differences between the image information captured (e.g., full nine-layer file) with the image information already transmitted to a target destination (e.g., first layer only), at the user's convenience, so that the transmitted image may be upgraded to its final, full quality/resolution representation. In this manner, the present invention allows the user to record an image at its full digital quality/resolution yet send only so much of that image that is cost-effective and quick to transmit, at a given instance in time, based on the then-existing communication medium available.

B. Implementation as Layer Over Existing Compression

1. General

A number of techniques exist for compressing image information, including some of which may be viewed as de facto standards. Examples include, for instance, the aforementioned Discrete Cosine Transformation or DCT-based and wavelet transform-based compression methodologies. Rather than abandoning these techniques, the present invention is preferably embodied in a manner that accommodates them. This allows one to avoid "reinventing" image compression, which may itself cause new problems. Therefore, the present invention is preferably embodied as a functional layer on top of existing image compression. At the same time, however, the present invention is largely independent of the underlying image compression that is employed.

2. Embedded or Layered Coding

Figure 5A:
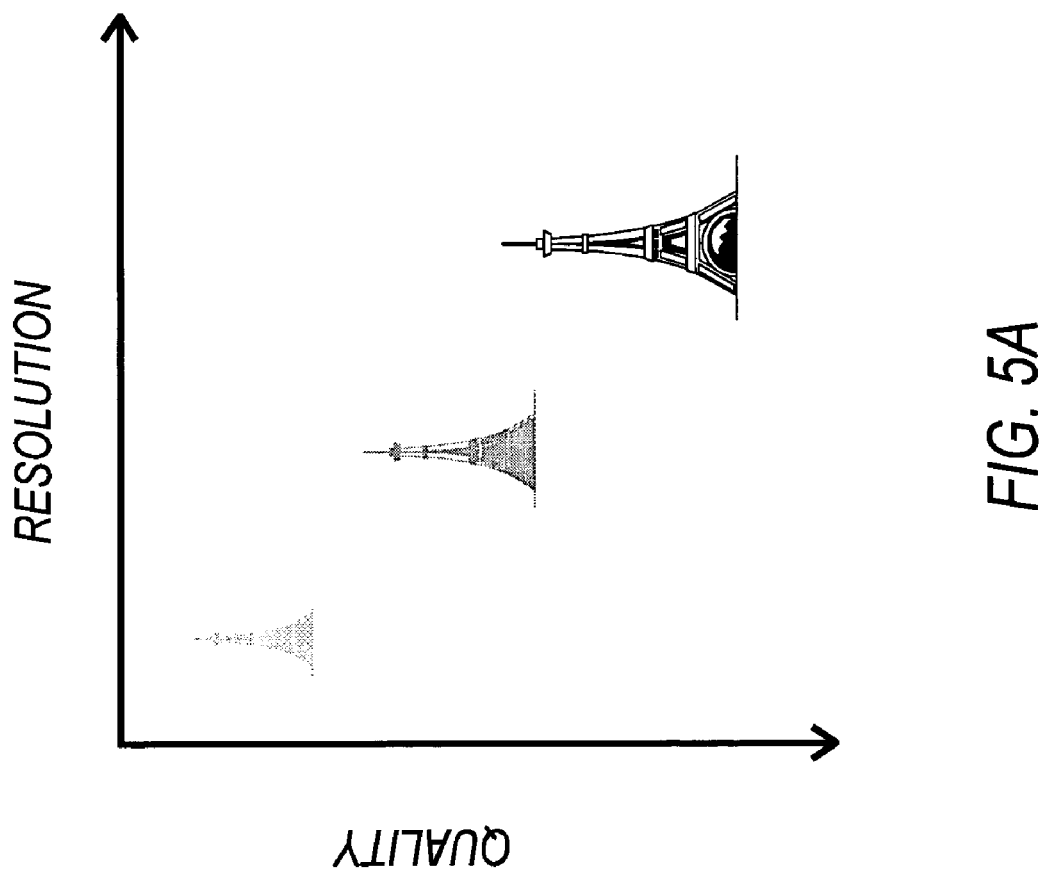
FIG. 5A is a graph illustrating the interplay between quality and resolution when rendering an image.
Figure 5B:
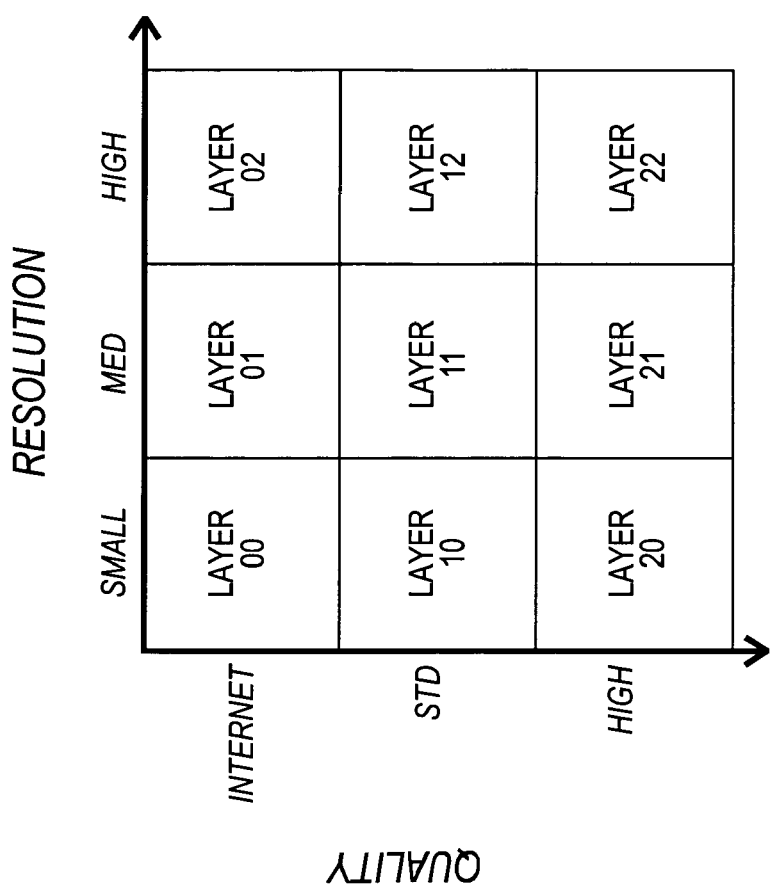
FIG. 5B is a graph illustrating division of quality/resolution combinations into various layers to form a matrix or grid.

In image compression, embedded or layered coding refers to a compression technique where the image data is coded in multiple data sections, called "layers". The base layer represents the image at a particular resolution and quality. The "resolution" specifies how many pixels are employed. The "quality" specifies the signal/noise ratio, which is related to the degree of quantization that has occurred for the data. The interplay between these two may be represented graphically, as shown by the graph in FIG. 5A. Various combinations of resolution and quality may be selected for rendering a given image. Selection of combinations is simplified if the graph is viewed as being divided into various layers, such as shown by the matrix or grid 550 in FIG. 5B. As shown, the two dimensions that affect each layer are resolution and quality. With each increasing layer, one adds to the resolution and/or adds to the quality. Thus, the layers cumulatively improve the resolution or quality (or both) of the image.

Examples of layered coding techniques include the JPEG progressive scanning method described by W. B. Pennebaker and J. L. Mitchell, *JPEG Still Image Data Compression Standard*, Chapman and Hall, New York, 1993, particularly at Chapter 6: *JPEG modes of operation*, and include the sub-band layered coding techniques described by D. Taubman and A. Zakhor, *Multirate 3-D subband coding of video*, IEEE Transactions on Image Processing, Vol. 3, No.5., September 1994, pages 572–588. The disclosures of each of the foregoing are hereby incorporated by reference. As commonly used, the term "sub-band coding" refers to the general class of image compression techniques (including the wavelet-based coding method described earlier) where an image is first decomposed into various bands and then the bands are compressed using techniques suited to the band characteristics. The layered coding technique is perhaps best illustrated by way of example.

Consider the layered (progressive) coding technique supported in the JPEG standard, for example. The image is first segmented into 8×8 blocks, and the blocks are then transformed with the Discrete Cosine Transform (DCT) to result in 64 coefficients (positions 0 through 63) per block. These coefficients are quantized based on 64 quantized step sizes, prescribed one for each of the 64 positions. The base layer (i.e., Layer 00) may store only the DC band, that is, all of the coefficients at position zero. Continuing in this manner, the next layer stores coefficients 1 through 20, for instance. The next layer stores the remaining coefficients, 21 through 64. An alternative way to add more layers to this scheme is to divide up how the information is transmitted. For instance, the first layer may be transmitted followed by the most significant bits (or bit plane) of the next layer (i.e., to a certain bit depth). Note that the individual bitplanes are coded using entropy coding techniques.

For a wavelet-compressed image, for example, suppose that one has three resolution levels (e.g., as shown in FIG. 3B). Assume a uniform bit depth of 8 bits for all levels after quantization. (In general, though, the quantization step size can be varied for each band, leading to a different number of significant bitplanes in each band. The quantization step sizes are then transmitted with the image header). Assume bitplane 1 is the most significant bitplane and bitplane 8 is the least significant bitplane. Also assume that the original image is 640 pixels wide and 480 pixels high. The three resolution levels would then correspond to 160×120, 320×240, and 640×480, where W×H represents an image width of W pixels and height of H lines. Suppose that one wants to code the image with the layering scheme shown in FIG. 5B. The lowest resolution level (160×120) has a single band (LL) and the other resolution levels have 3 (LH, HL, HH) bands.

The base layer (i.e., Layer 00) may correspond to bitplanes 1 through 4 of the lowest resolution (160×120) level, Layer 10 may correspond bitplanes 5 and 6 of the lowest resolution level, and Layer 20 may correspond to the remaining two bitplanes (7 and 8). Layer 01 may store bitplanes 1 through 3 of the 3 bands corresponding to the next higher resolution level (320×240), Layer 11 may store bitplanes 4 through 5, and Layer 21 may store the remaining bitplanes (6 though 8) for that resolution level. Finally Layer 02 may correspond to bitplanes 1 through 2 of the three bands at the highest resolution level (640×480), followed by bitplanes 3 through 5 for Layer 12 and 6 through 8 for Layer 22. As can be seen, more bitplanes "at the same resolution level" are added along the quality axis, thereby improving the image quality at a fixed resolution. Similarly more bitplanes at the "next higher resolution level" are added along the resolution axis, thereby improving the image resolution.

The bitplanes in the different layers may be coded independently, or some dependencies may exist on preceding layers, as desired. More important is that the layers cumulatively add more information. Where dependencies exist, it is meaningless to transmit a layer that is dependent on layers that are not yet transmitted. Where dependencies do not exist, it is still useful to transmit the layers in a sequence that improves the picture quality and resolution. For example, in a layered coding scheme using JPEG progressive scanning, the first layer to be transmitted may be the DC coefficients that shows a crude representation of the image, the second layer transmitted may be AC coefficients 1 through 30 which further refines the image, finally followed by a third layer that codes the remaining coefficients.

C. Design Considerations/Assumptions

The following methodology is particularly suitable in instances where the main data storage (i.e., storage media) does not exist on the imaging device and the imaging device is typically untethered from the data storage. However, opportunities occur from time to time to transfer information to the main data storage, when the imaging device is occasionally tethered (e.g., to the data storage or to another device in communication with the data storage). Often in such a situation, other constraints exist, including time constraints and bandwidth constraints, such that only a small amount of data may be exchanged at a given instance in time. Against this backdrop, the user desires to get as much of his or her picture rendered as quickly as possible, thereby providing a good representation of the picture at the data storage side and perhaps even freeing up some storage at the imaging device.

As described above, digital image representation of a picture may be considered along two axes, resolution and quality (for a particular color depth). This presents the user with a matrix of choices. For example, the user may select a low-resolution image of 320×240 pixels in a camera capable of capturing 640×480 pixels, or the user may select a "high-quality" JPEG or a "low-quality" JPEG. In accordance with the present invention, the image information is layered so that the smallest-resolution, lowest-quality image is the lowest layer in the matrix (i.e., Layer 00). Each layer represents the smallest segment of information that is meaningful to send. Among the layers, Layer 00 represents the least amount of information needed for rendering a meaningful image. As one keeps adding layers along the axis of quality, more image data is added and the rendered picture becomes progressively higher in quality. Here, as one moves along the axis of quality, the image data becomes progressively less quantized as more and more bitplanes are transmitted. In a similar manner, one may progress along the axis of resolution, for obtaining a rendered image of increasingly higher resolution.

Figure 5C:
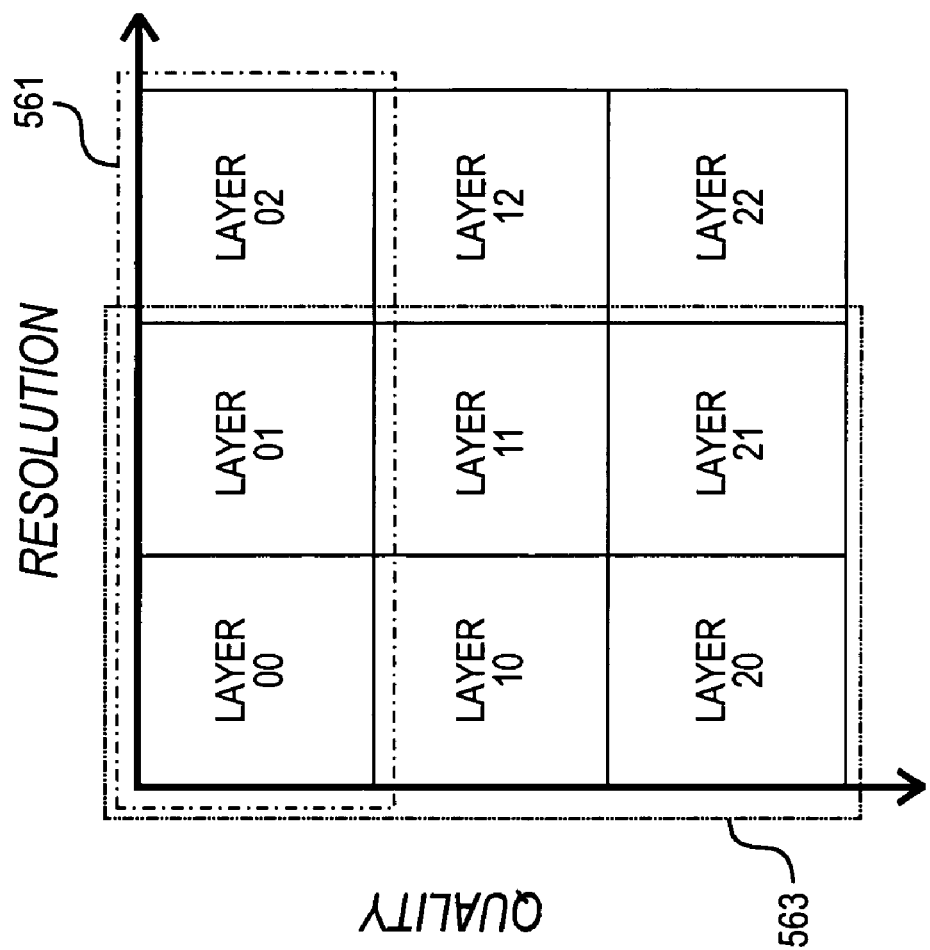
FIG. 5C is a graph illustrating that transmission of layers should be selected so as to fall within a single bounding box.

As the information between layers is somewhat dependent (in the format employed for the currently-preferred embodiment), transmission occurs in a manner such that the layers transmitted form a contiguous block of layers. There is no immediate use for transmitting information from a layer that cannot be interpreted or processed correctly until receipt of another layer. As shown in FIG. 5C, for instance, this may be viewed as layers falling within a bounding box. Thus, the information transmitted is preferably within a rectangle that encloses the smallest region. Examples include, for instance, rectangle 561 and 563, each rectangle including layers that are contiguous.

Recall that each layer represents an atomic unit: the lowest segment of the data that can be sent. Each time the imaging device or camera is connected (directly or indirectly) to the main data storage, there exists an opportunity to send one or more extra layers. The actual constraints present are dependent on the user's given situation, such as whether the imaging device is connected via wireless or wireline communication. Therefore, how the layers are transmitted is, in a preferred embodiment, configurable (automatically and/or user-configurable) for a given communication scenario. In a wireline scenario, bandwidth is less expensive and thus more layers can be transmitted at a given instance in time. Here, the configuration may be controlled by the target device (i.e., server computer having the main data storage), so that the target device controls which layers it uploads. In a wireless scenario, on the other hand, bandwidth is more constrained. In that case, typically only the first layer would be uploaded. Additional layers would be uploaded at a later point in time (i.e., "updates"), either via a wireless or wireline communication medium. For the logical partitions shown in FIG. 5C, a maximum of nine communication sessions are required for transmitting the image at full resolution and full quality.

D. Data Organization and Processing

1. Preferred Embodiment

Figure 6A:
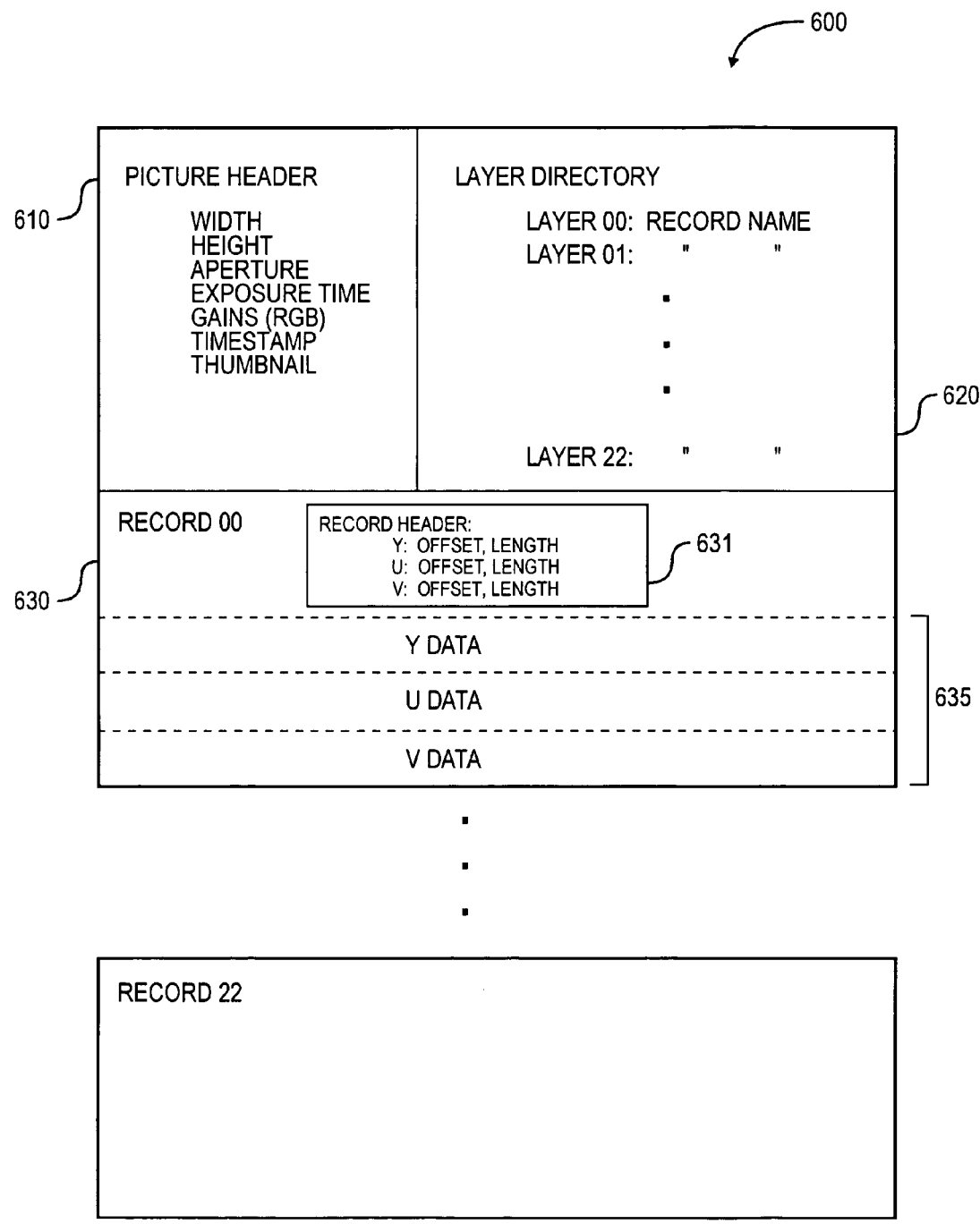
FIG. 6A is a block diagram illustrating the basic data organization or progressive file format employed in a preferred embodiment of the present invention.
Figure 6B:
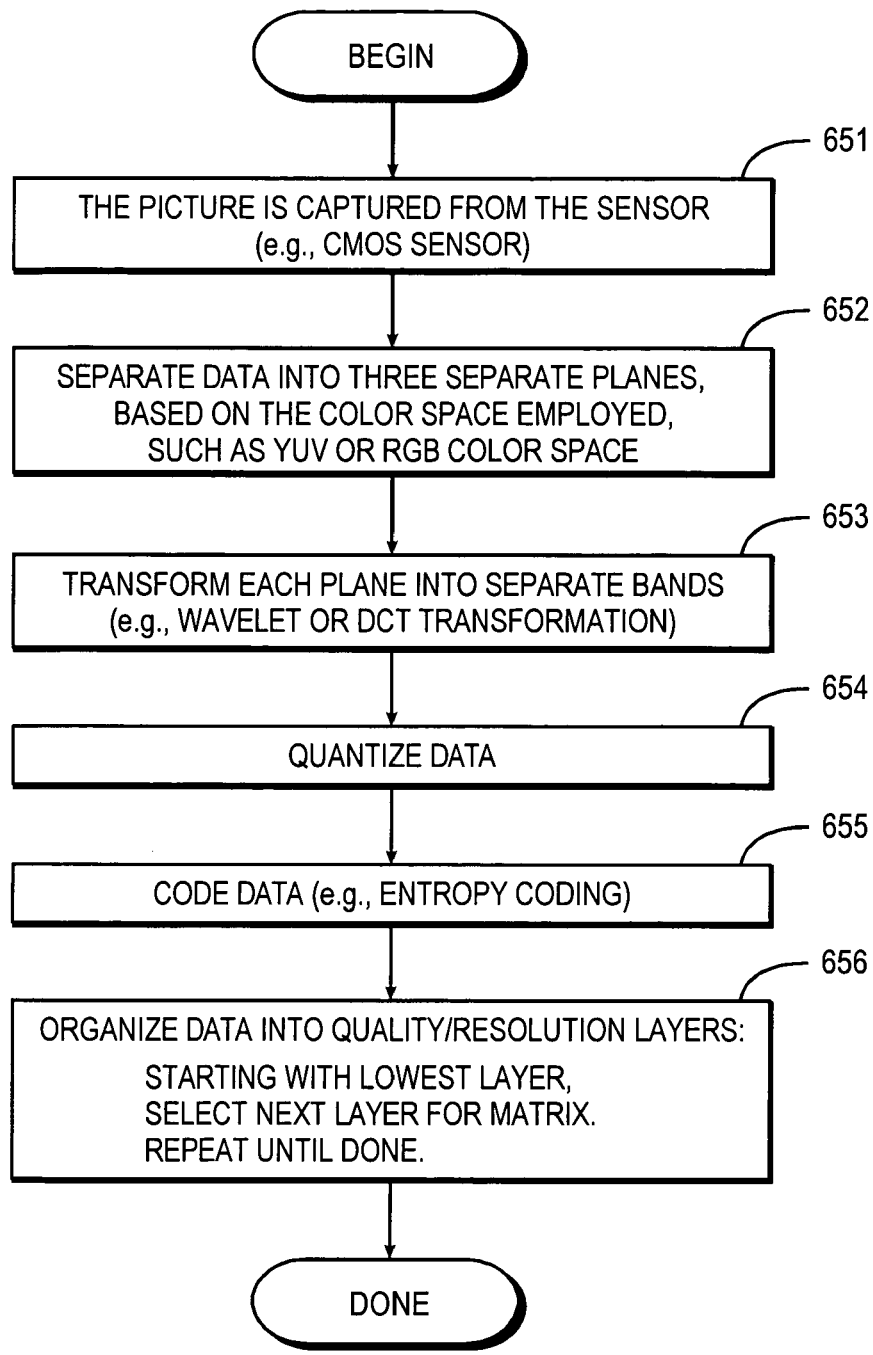
FIG. 6B is a flowchart illustrating the methodology of the present invention for organizing information into the progressive file format of the FIG. 6A.

FIG. 6A illustrates the basic data organization or progressive file format employed in a preferred embodiment of the present invention. Accompanying FIG. 6B represents the corresponding methodology 650 employed for organizing raw image data into the progressive file format 600, shown in FIG. 6A. Initially the picture is captured from the sensor (e.g., CMOS sensor), as represented by step 651. The raw image data represents a mosaic, arranged as repeating Bayer patterns, in memory (frame buffer). The mosaic is separated into a three separate planes, based on the color space employed, such as YUV or RGB color space. This is indicated by step 652. In the preferred embodiment, YUV color space is employed. Therefore, the raw image data is separated into separate Y, U, and V planes. At this point, each plane is transformed (e.g., wavelet or DCT transformation) into separate quadrants or bands, as shown by step 653, and then quantized as shown by step 654. For wavelet-transformed data, therefore, the image information has been decomposed into separate bands or quadrants (each to a certain bit depth), which have been quantized. Each bitplane within each band is coded (e.g., entropy coding), for compressing the data, as indicated by step 655. Within each bitplane, multiple passes of coding may be applied. Although the information is coded, the length and location of each piece of data is preserved, so that the information may be organized into different layers, that is, inserted into different layers, as shown by the file format 600.

Now, the transformed, compressed and quantized image information is further organized into a quality/resolution matrix, using the various layers available from the file format 600 for FIG. 6A. Each layer is represented by two coordinates: resolution and quality. Organizing the image information into different layers includes selecting particular bands for a given layer, each band being represented to a particular bit depth. Layer 00 represents the lowest resolution/quality for the image; it will store the "smallest band." Therefore, at this point, the system decides what will be the smallest layer, as indicated by step 656. This includes determining which bands to take for the image, and to what bit depth. For example, Layer 00 may contain bands 1 through 10, yet only include three bitplanes in band 1, two bitplanes in band 3, and so forth and so on. This information is stored in Layer 00. Thus, Layer 00 itself is further subdivided, based on the bitplanes its stores. The storage methodology 650 continues in this manner, filling out the other layers (i.e., proceeding along quality/higher resolution) until the quality/resolution matrix is complete. Each layer preferably includes information from all three separate color planes.

To assist with processing, the file format 600 stores housekeeping information in a header section. Specifically, housekeeping or attribute information for the picture is stored in the picture header 610, as shown in FIG. 6A. The picture header 610 includes capture-specific information or attributes about the picture, including width and height, aperture and exposure time used to capture the picture, analog gains of the (CMOS) sensor, timestamp, and the like. The header also includes information on the quantization step sizes employed for the various bands in the image. If desired, the picture header 610 may include a thumbnail image (bitmap), which is useful for providing a quick preview of the image. The thumbnail could be compressed using any coding technique.

Additionally, the file format 600 stores housekeeping information about the layers, using a layer directory 620. Each layer itself is stored, in a preferred embodiment, as a separate record, such as a separate physical file in a flash file system. The layer directory 620 includes an entry for each layer record; the entry includes the name of the accompanying a physical file (text string) and length of the file (numeric value). Each record, such as record 630, includes a record header (e.g., record header 631) for storing housekeeping information about that particular record. For a YUV color space embodiment, for instance, the record header 631 stores Y offset and length, U offset and length, and V offset and length. This is followed by the record body 635, which stores the image information proper. For a YUV color space embodiment, this would include, for example, separate Y data, U data, and V data compartments or sections, within the record.

Figure 7:
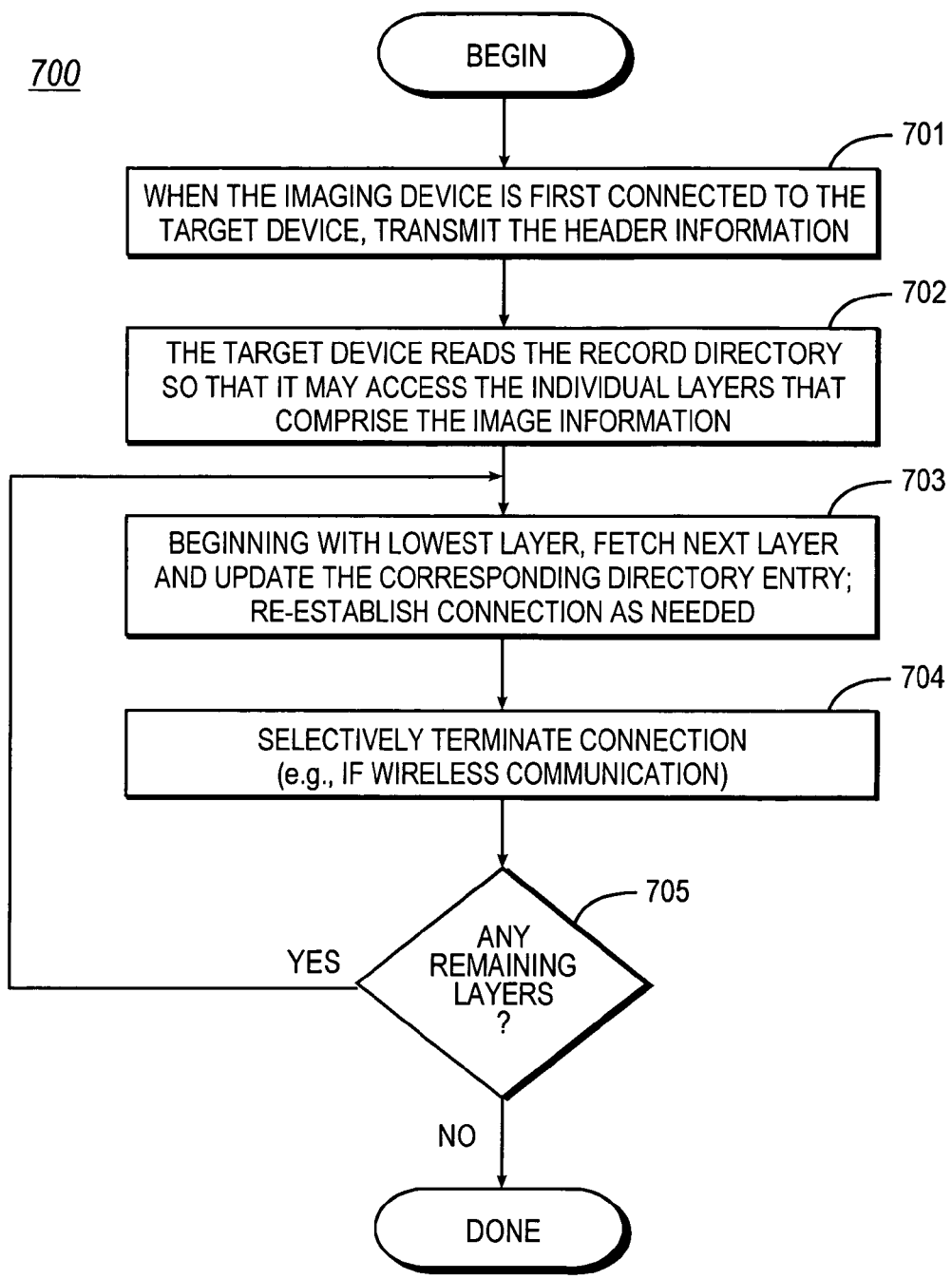
FIG. 7 is a flowchart illustrating the methodology of the present invention for transferring image data to a destination device (e.g., server computer).

The methodology 700 of the present invention for transferring image data is illustrated in FIG. 7. When the imaging device is first connected to the target device, the header information is transmitted, so that the target device includes the basic information about the picture (e.g., including a thumbnail). This is illustrated in step 701. Next, at step 702, the target device reads the record directory of an image to control uploading of that image. Now, the target device (e.g., server computer) is ready to access and fetch the individual layers that comprise the image information. Starting with the first record entry, the target device successively fetches the corresponding records (referenced by the recorded directory entries), as illustrated by step 703. As each record is retrieved, the server computer may reset the record entry (e.g., setting the filename to NULL) on the imaging device-side, for indicating that that record has already been fetched. Once the entry has been set to NULL, the corresponding record may be deleted. At the same time, at the server computer, the corresponding record entry is updated to now reference the just-fetched record. This allows the imaging device to know which records have been sent, and allows the server computer to know which records have been received. Upon transmission of the layer, the communication connection may be (optionally) now closed, as indicated by step 704.

The server computer fetches successive record(s) at the next opportunity, either during the current connection or during the next connection (indicates that the current connection is now terminated). Step 705 illustrates that a loop is established to jump back to step 703 for transmitting the next (remaining) layer. The server computer itself may be configured to fetch the layers in a particular order, such as first increasing the quality before increasing the resolution, or conversely increasing the resolution before increasing the quality. As previously described, however, the server computer should preferably retrieve layers such that a bounding box encloses all retrieved layers. Once no more layers remain to be transmitted (a fact which is uncovered at step 705), the method is done.

As an example of real-life application of the foregoing methodology consider, for instance, a user "in the field" who needs to capture an image and transmit it back to his or her office. Here, the user may initially be interested in only a low-quality version (say, the first layer only) of the image for transmission back to the office. The device though records a high-quality/resolution version of the image. There is no loss of image information in the high-quality/resolution version of the image if no quantization is employed (i.e, the device then would store a lossless version of the image), but typically small quantization step sizes are employed so as to control the size of the high-quality/resolution version of the image. Only the first layer is transmitted back to a target device at the user's office (e.g., a desktop or server computer with Internet connectivity). At a later point in time, for instance, when time and/or bandwidth are not an issue, the user can transmit all remaining layers for the image. Here, the remaining layers need not be directly transmitted to the destination device. Instead, the user can, for example, transmit the remaining layers to yet another device, such as his or her home computer, which then may synchronize or collaborate the information with that already present at the destination device, for generating a copy of that image at full quality (at either one or both of the devices). As demonstrated by this example, the present invention allows the user to avoid the classic tradeoff of image quality versus transmission time. In particular, the user need not endure long transmission time in order to transmit a copy of the image, nor is the user forced to only record a low-quality version of the image for transmitting.

2. Alternative Embodiments

Figure 8:
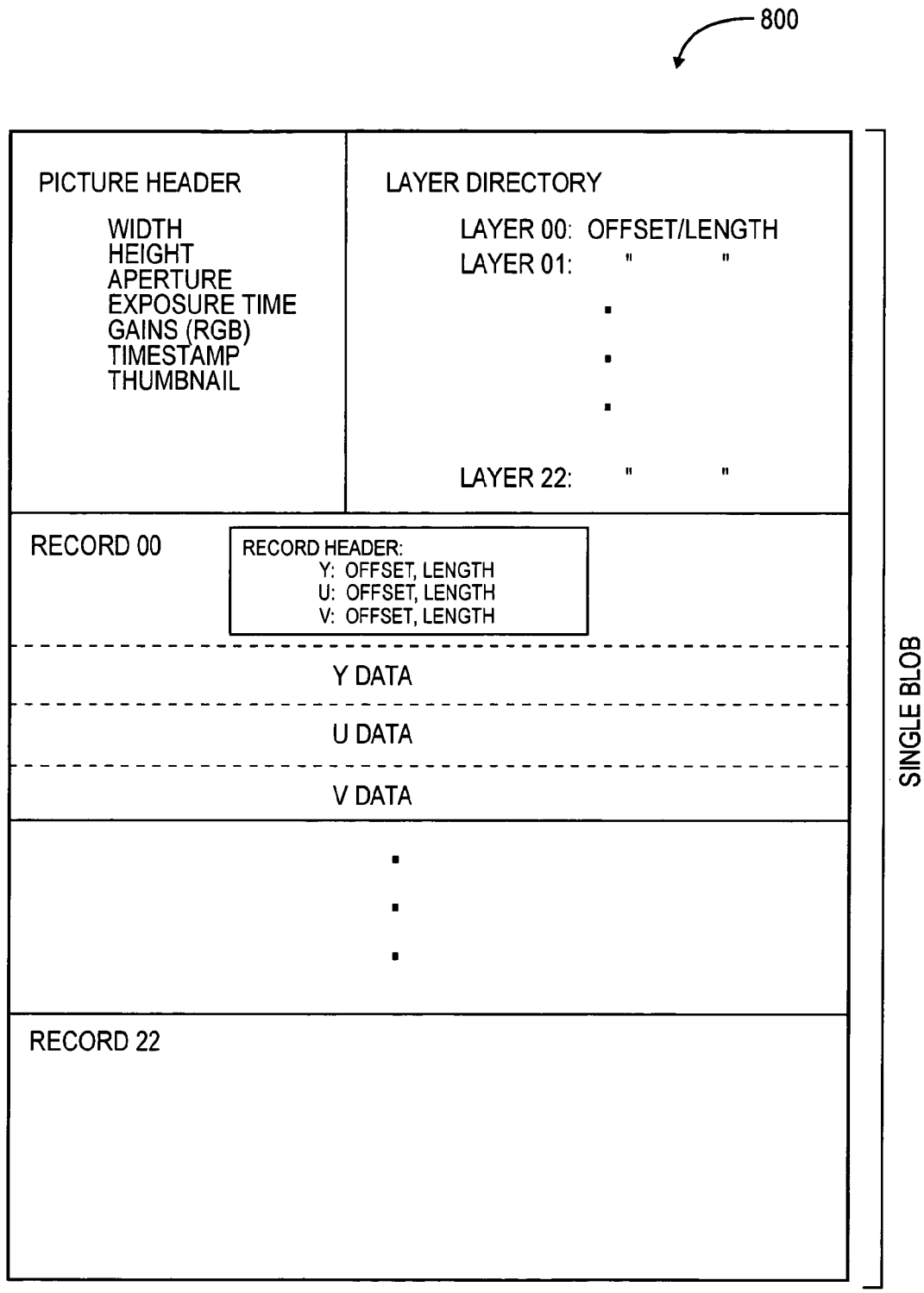
FIG. 8 is a block diagram illustrating a binary large object (blob) embodiment of the basic data organization or progressive file format of the present invention, for use in devices not supporting physical files.

Those skilled in the art will appreciate that the foregoing data organization may be modified to accommodate the peculiarities or constraints of a given environment. For instance, the foregoing data organization may also be embodied in devices that do not readily support record-oriented organization. In such a case, the image information is simply organized into a single blob (binary large object), which may be subdivided into separate logical sections corresponding to the previously-mentioned header and record sections. Also, the directory entries are modified to store offset/length entries (instead of filenames for physical files). FIG. 8 illustrates the basic approach. FIG. 8 demonstrates a recordless file format 800 in that it does not provide individual records (i.e., named files) per se. Instead, the information is organized such that the highest-priority layer occurs at the bottom of the blob object and the lowest-priority layer occurs at the top. The server accesses the structure by taking increasing amounts of the blob, so that the corresponding image file at the server becomes increasingly larger (as additional logical layers are uploaded). As each layer is uploaded to the server, the corresponding memory at the imaging device may be freed, so that it can be used for other purposes. Thus as shown, there is no need for the records to exist as separate physical files.

E. Progressive File Format Advantages

In accordance with the present invention, image information after wavelet decomposition and quantization is sorted into successive layers or compartments, based on quality and resolution criteria. No new image information is lost during the layering process, nor has any numeric operation (e.g., floating point operation) been performed which would render the information less accurate. Instead, the image information is organized in a fashion that allows the system to control the transmission of varying qualities/resolutions of a given image from the progressive file format. Since the user is able to capture an image at full quality, yet choose what quality/resolution the image is transmitted at, the user is not forced to capture poor quality images just to have good transmission times. Instead, the user can enjoy high-quality images as well as good transmission times.

Media Spooler System and Methodology

A. General Design

Uploading media wirelessly, in particular digital pictures from a wireless digital camera to a Web server, is actually a fairly complex task. Consider, for instance, a "mobile visual communicator" comprising a wireless digital camera that may connect to a cellular phone (e.g., system 100 or comparable device), or with built-in cellular phone functionality. To transmit photographic images, the camera initiates a wireless data call through the cellular phone. Under current second generation cellular networks, this data call results in a 9600 baud modem call over the existing Public Switched Telephone Network. That modem call goes to the user's ISP (Internet Service Provider), which invokes PPP (Point-to-Point protocol) to get Internet connectivity to the mobile visual communicator. At this point, pictures can now be uploaded to a Web server.

Problems remain when implementing this communication using existing approaches, though. Web severs are designed and optimized to respond to HTTP (Hypertext Transport Protocol) requests over TCP connections. However, HTTP client code is fairly complex and therefore difficult to implement on thin-clients like a wireless digital camera. For instance, a thin-client device typically has little processor and/or memory resources available for executable code. Additionally, HTTP/TCP itself is not necessarily optimized for use over slow, unreliable links.

At the outset of designing a solution for better transmission of digital content or media, it is helpful to recognize that there exists a vast multitude of connections (e.g., thousands, or even hundreds of thousands) coming over a slow wireless link. In other words, the nature of the problem is such that a very large number of connections will, in effect, be slowly trickling data. Additionally, given the large number of simultaneous connections and that many of them may be lost (i.e., aborted), it is important to adopt an approach which does not require retransmission of data or information which has already been successfully sent. This is particularly important with wireless communications since retransmission of previously-sent information will incur substantial server-side overhead, with the high potential for cascading failure at the server. Accordingly, it is important to reduce unnecessary transmission of content that is coming from the recording or capturing devices.

As an additional design consideration, enhanced efficiencies may be realized by positioning the solution at the wireless carrier, that is, at the point of the processing of incoming wireless communication signals. By designing the solution for deployment at the wireless carrier, the solution is better suited for scaling, based on the number of wireless clients that that carrier services. Additionally, the wireless carrier provides a centralized location, thereby facilitating deployment, management, and administration (e.g., billing).

Finally, the solution is designed such that it does not assume that content will be transmitted in any particular manner. In other words, the solution does not assume that content necessarily must be transmitted wirelessly. Instead, content may arrive through wireless communication, wire-line communication, or some combination thereof. By recognizing that portions of an item of interest may arrive through a variety of potential communication media, the solution is able to provide an optimized approach for handling instances of lost connections, and thereby perform the least amount of work possible for successfully transmitting the entire contents of an item.

B. Media Spooler Architecture and Operation

1. Overview

The present invention provides a media spooler or gateway to address these problems by acting as a protocol gateway between a thin-client device and a target host or server (supported by a server infrastructure). More particularly, the media spooler of the present invention acts as a protocol gateway between thin-client devices (e.g., the mobile visual communicator or system 100 described above) and server infrastructure (e.g., server-based computer systems or "Web servers" of a photographic service provider). This task entails accepting multiple, simultaneous connections from various client devices (e.g., wireless digital cameras), extracting information from those devices (e.g., digital photographs), and then uploading that information to the target server infrastructure. In basic operation, the media spooler queries each client device for the information (e.g., pictures) the client device thinks should uploaded, and then the media spooler queries the server infrastructure for the subset of pictures that have not been already uploaded. This improved coordination or synchronization of information between a device and target host allows for efficient recovery of dropped cellular data calls by essentially allowing the media spooler to "pick up where it left off."

2. General Architecture

Figure 9:
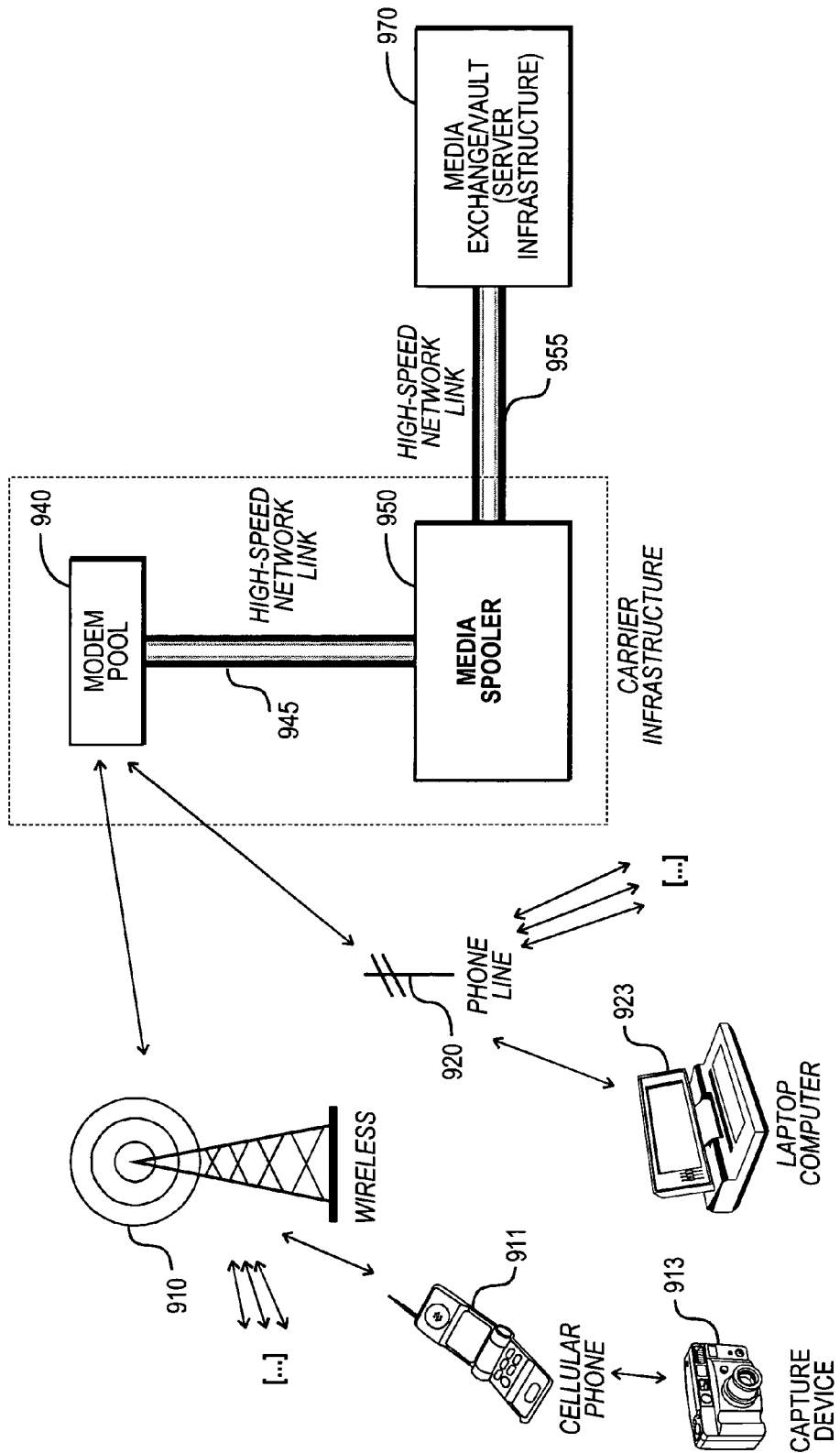
FIG. 9 is a high-level block diagram illustrating a communication environment in which a media spooler or gateway of the present invention operates.

FIG. 9 represents the overall communication environment 900 in which the media spooler or gateway of the present invention operates. Content enters the environment through a variety of devices. Examples include, for instance, a media capturing device 913 (e.g., digital camera). Other examples include digital video and digital audio capturing devices (not shown). In the environment 900, the media capturing device 913 is attached (intermittently) to a cellular phone device 911, which in turn communicates through a wireless network 910 to a modem pool 940. Instead of a cellular phone device, the device 911 may comprise a Bluetooth-enabled communication device or a wireless modem attached to the capturing devices. As also shown, a PC or laptop computer device 923 may connect over wireline (e.g., regular phone line) 920 to the same modem pool 940, which is offered by the carrier. This arrangement illustrates carriers that offer both wireless data and wired ISP connections. Regardless of how a particular device is connecting to the environment, ultimately a data call is placed by the device (or on behalf of the device) for establishing a connection with the modem pool 940. As shown by the ellipsis in the figure, a variety of other devices may connect as well, either through wireless or wireline means. Whether the arriving connection is wireless or wireline, the media spooler 950 may still operate to improve overall system operation.

As shown, the modem pool 940 resides at the carrier (i.e., cellular phone provider) infrastructure, for receiving incoming connections from a variety of devices. Additionally, the media spooler 950 is also located at the carrier infrastructure, in effect juxtapositioned near the modem pool 940. Here, the media spooler 950 is located near the modem pool 940, the two being connected together over a high-speed backbone data network or link 945. In the currently-preferred embodiment, communication between the two occurs via TCP/IP. The media spooler 950, in turn, connects to back-end server infrastructure 970. The server infrastructure 970 comprises media asset management ("vault") and media exchange. It may operate at a remote data center(s) and/or may operate at the carrier's data center (e.g., located within the carrier's infrastructure). Connection between the media spooler 950 and the server infrastructure 970 occurs through a high-speed backbone data network or link 955, either over the Internet (if the data center is remote) or within the carrier's infrastructure (if the data center is local).

3. General Operation

Exemplary basic operation proceeds as follows. A media capturing device, which is connected to a data-capable cellular phone, captures information to media (e.g., digital photograph). The cellular phone places a data call, for instance, at 9600 baud, to its available modem pool at the appropriate carrier (i.e., subscribed to for this cellular phone). Once the data call is established, the capturing device transmits the data (media information) to the modem pool, using TCP/IP protocol. The modem pool collects the bits of information pertaining to the digital photograph being transmitted and, in turn, passes that information to the media spooler, which resides in close proximity to the modem pool. Once the media spooler receives enough bits of information to define the digital photograph (or useful portion thereof), the digital photograph is transmitted via a high-speed data network to the server infrastructure, also using a high-speed connection. The same basic data flow exists for other devices, including, for instance, when a digital photograph is uploaded from a laptop computer via a data call to the modem pool.

For incoming data that it is receiving, the media spooler itself is independent of any given file format. In particular, the media spooler may spool a variety of disparate media types, apart from Progressive Photograph Format (PPF) files. The media spooler applies a byte-level "smart-retry" approach to transmitting data, which ensures that transmission will resume at the point of the last successfully-received byte of data. This byte-level approach is applied regardless of whether the media type being transmitted supports compartment-level transmission. For instance, if a cellular call is dropped in the middle of a compartment, the spooler will resume subsequent transmission at the last byte received. In this manner, information may be transmitted in a manner which minimizes retransmission of data that has already been successfully received.

As the incoming client data is received, it is written to the media spooler's disk. When the spooler gathers a complete PPF compartment or complete file of another media type, it then uploads it to the Web server. In the case of a broken connection to the spooler, the spooler will upload the portion received to the Web server. On a subsequent connection from the same device, the media spooler will resume downloading the PPF compartment or file of another media type at the point where the previous connection broke; thus guaranteeing that data is only going over the slow cellular link once. The media spooler is able to resume at the point of the last connection by always querying the client device for a complete list of compartments and their sizes ready for downloading. Before the media spooler actually commences downloading it queries the Web server for the subset of bytes of compartments that should actually be downloaded from the client.

The cumulative effect, at a given point in time, is that there will be a multitude of connections and, therefore, a multitude of media Progressive Photograph Format (PPF) compartments being simultaneously transmitted. During this operation, in conjunction with the server infrastructure and client device, the media spooler must decide whether to retrieve a particular compartment or piece. As multiple client connections are open at any given instance in time, this decision process is occurring for a multitude of client devices that are currently connected. If desired, the media spooler may be configured so that it only transmits media objects that have reached a prescribed amount of completion (e.g., 100% of compartments received for an object).

C. Media Spooler Components

Figure 10:
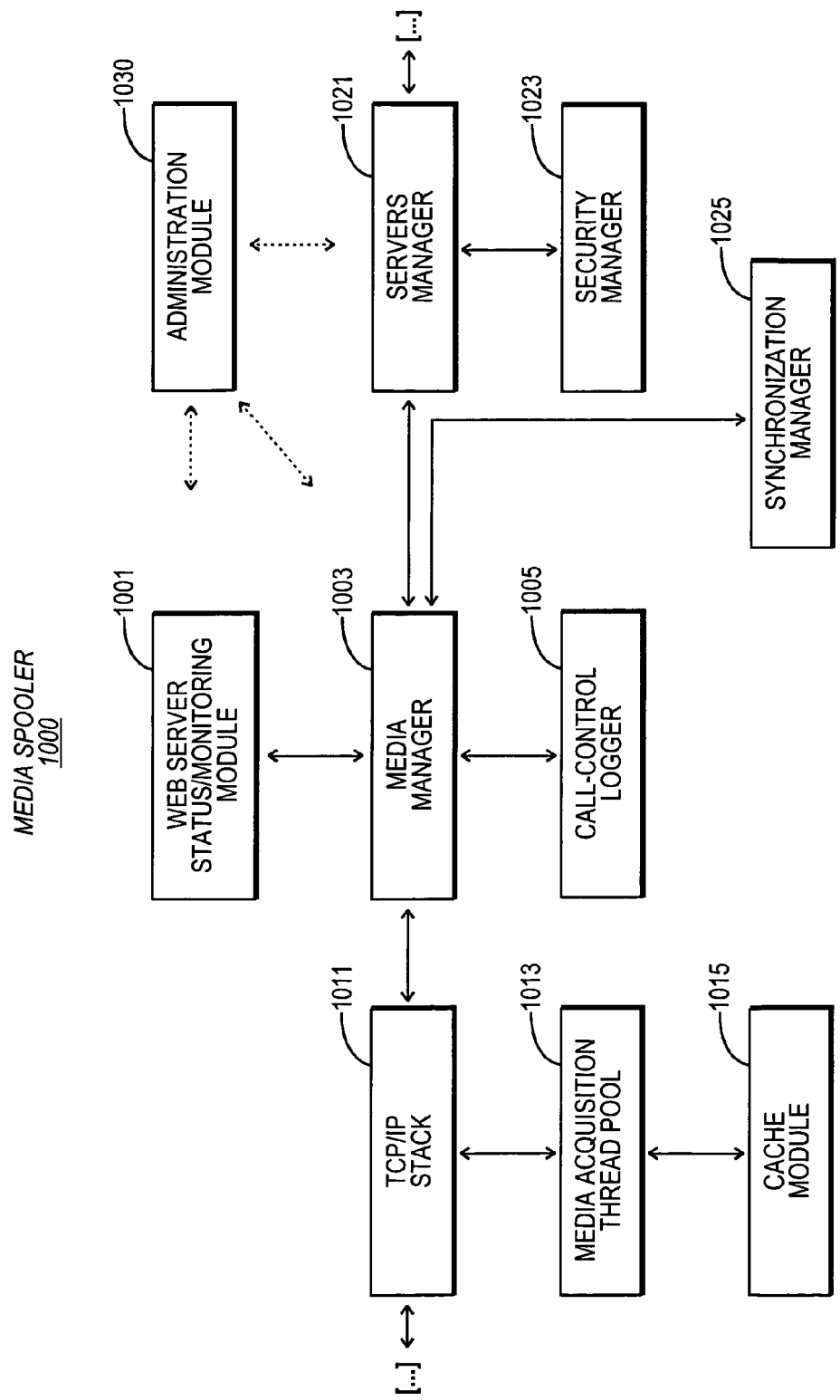
FIG. 10 is a block diagram illustrating the media spooler of the present invention in further detail.

FIG. 10 illustrates the media spooler of the present invention (shown at 1000) in further detail. The media spooler 1000 comprises multiple components, including a Web server status (monitoring) module 1001, a media manager 1003, a call-control logger 1005, a TCP/IP stack 1011, a media acquisition thread pool 1013, a cache module 1015, servers manager 1021, security manager 1023, a synchronization manager 1025, and an administration module 1030. The media spooler 1000 operates on top of an operating system (not shown), such as Linux, FreeBSD, UNIX, Windows 2000, or the like. Individual modules of the media spooler 1000 will now be described in further detail.

The TCP/IP stack 1011 supports a multitude of concurrent connections. A shown, the TCP/IP stack 1011 is the communication gateway, or entry point, into the media spooler 1000. The TCP/IP stack 1011 may be provided by the underlying operating system (e.g., Linux built-in TCP/IP support) or by existing third-party implementations, such as InterNiche Portable TCP/IP Protocol Stack, version 1.6, available from InterNiche Technologies, Inc. of San Jose, Calif. The TCP/IP stack 1011, which operates under the control of the media manager 1003, is configured for supporting a multitude of long-duration, concurrent connections.

The media manager 1003 itself serves as a central piece that coordinates operation of several of the other modules, in addition to the TCP/IP stack. In a complementary manner, the servers manager 1021 serves to provide communication between the media spooler 1000 and the server infrastructure. The servers manager 1021 exposes a secured XML-based interface allowing it to communicate with a variety of different server infrastructures. The servers manager 1021 operates in conjunction with the security manager 1023, in order to establish the particular type of secured communication that will be employed (e.g., SSL vs. SSH, depending on the type of protocols employed). As also shown, the synchronization manager 1025 interfaces directly with the media manager 1003. The synchronization manager 1025 includes logic for determining whether to pull a particular compartment or component (of a data object of interest) from one of the media-capturing devices (or other clients). If the synchronization manager 1025 determines that a particular component, in fact, does need to be pulled, then the media manager 1003 will immediately proceed to retrieve that component.

Actual communication with each individual client occurs in conjunction with the media acquisition thread pool 1013. This module controls a pool of threads (i.e., processes) that are available for servicing the communication sessions with the multiple concurrent clients. Recall that many concurrent clients are communicating with the media spooler 1000 through a comparatively-slow wireless link, for instance, via a 9600 baud connection to the capturing device. In effect, a large number of client devices are trickling data to the system. Therefore, in order to efficiently service this communication scenario, the media acquisition thread pool 1013 allocates a thread for each such connection. Each thread, in turn, operates in conjunction with the cache module 1015 to dump (i.e., load) data into the file-based cache system, as the data becomes available over the wireless connection.

In order to track or log each communication connection coming into the system, the media spooler 1000 includes a logging component, the call-control logger 1005. This module, which is in direct communication with the media manager 1003, provides specific tracking for each data call that has occurred.

The following data structure may be employed for tracking calls.

Count of pictures transferred
Count of files transferred
Count of data bytes transferred
Call Start Time & Call End Time The logger tracks time/length of each call, as well as details about the particular user (account) and data traffic associated with each particular call. In the currently-preferred embodiment, this information includes the number of pictures (or compartments) transmitted as well as the total number of bytes of data transmitted during the call (session). This information, in turn, may be used for providing usage metrics, including, for instance, providing information supporting per-image or time-based billing.

Two components operate in a stand-alone fashion: the administration module 1030 and the Web server status module 1001. The administration module 1030 operates as a stand-alone module that provides system administrator control over the various components of the media spooler 1000, including, for instance, establishing user accounts and passwords. Thus, the administration module 1030 functions as a supervisory module overseeing the interaction of all of the components. The Web server status module 1001 provides system-wide monitoring of the activity that is currently occurring. For instance, the Web server status module 1001 provide statistics about the number of concurrent connections and the number of data objects that have been transmitted over a given period of time. In the currently-preferred embodiment, this module may expose a public interface, thereby allowing this information to be published to the World Wide Web (for authorized parties).

D. Media Spooler Data Structures

1. Image Data Structure

The following is an exemplary data structure describing images at both a camera and the server, using the Perl programming language's associative array feature.

```
$VAR1 =   [
              {
                  'id' => 'ls__00200020__02921003__00840002b__800000A3',
                  'part' =>   [
                                  {
                                      'frombyte' => '0',
                                      'id' => 1,
                                      'tobyte' => 5309
                                  },
                                  {
                                      'frombyte' => '0',
                                      'id' => 2,
                                      'tobyte' => 5043
                                  },
                                  {
                                      'frombyte' => '0',
                                      'id' => 3,
                                      'tobyte' => 17364
                                  }
                              ]
```

```
        },
        {
                'id' => 'ls_00200020_02921003_00840002b_800000A5',
                'part' =>    [
                                {
                                        'frombyte' => '0',
                                        'id' => 1,
                                        'tobyte' => 4682
                                },
                                {
                                        'frombyte' => '0',
                                        'id' => 2,
                                        'tobyte' => 4522
                                },
                                {
                                        'frombyte' => '0',
                                        'id' => 3,
                                        'tobyte' => 15533
                                }
                        ]
        }
]
```

The above sample shows a list of pictures on the camera. Each picture has an identifier (ID) field and a part field. The ID is the picture's globally-unique identifier (GUID), and the part field is actually a list of compartments. Each compartment has an ID in addition to a "frombyte" and a "tobyte". When the spooler system communicates with the camera, the frombyte will always be 0, and the tobyte is the length of the compartment. After fetching this information from a camera, the spooler then asks the server for the subset of compartments that should actually be uploaded.

As noted above, the data structure describing images from the camera is the same as the information from the server. The following is a sample that matches the sample above.

The sample above shows that only compartment #3 of picture ls_00200020_02921003_00840002b_800000A3 needs to be uploaded, while all of the compartments (i.e., whole) picture ls_00200020_02921003_00840002b_800000A5 needs to be uploaded.

2. GUID Data Structure

The device ID of a particular camera device is used to obtain a monotonically-increasing unique picture ID, through a special registry API method. This UI32 (32-bit unsigned integer) value is combined with additional individual device-specific values, SYSTEM/ModelInfoNum, SYSTEM/SerialNum, and SYSTEM/FwVersion, the three

```
$VAR1 =  [
        {
                'id' => 'ls_00200020_02921003_00840002b_800000A3',
                'part' =>    [
                                {
                                        'frombyte' => '0',
                                        'id' => 3,
                                        'tobyte' => 17364
                                }
                        ]
        },
        {
                'id' => 'ls_00200020_02921003_00840002b_800000A5',
                'part' =>    [
                                {
                                        'frombyte' => '0',
                                        'id' => 1,
                                        'tobyte' => 4682
                                },
                                {
                                        'frombyte' => '0',
                                        1 'id' => 2,
                                        'tobyte' => 4522
                                },
                                {
                                        'frombyte' => '0',
                                        'id' => 3,
                                        'tobyte' => 15533
                                }
                        ]
        }
]
``` of which form the camera's device ID (gDevID), to form the globally Unique picture ID for each picture taken (GUID).

In the currently-preferred embodiment, this GUID is an ASCII character string in the following format:

mmmmmmmm_ssssssss_ffffffffFFF_nnnnnnnn where mmmmmmmm is the 8 ASCII_encoded hex nibbles of the value SYSTEM/ModelInfoNum, ssssssss is the 8 ASCII-encoded hex nibbles of the value SYSTEM/SerialNum, ffffffffFFF is an ASCII string representing SYSTEM/FwVersion, where ffffff is the revision number and FFF is a set of revision attributes, and nnnnnnnn is the monotonically-increasing unique picture ID (identifier).

This resulting string is the GUID of a picture, and, in the currently-preferred embodiment, is also the "root name" of all files generated by a camera device for a particular captured image.

E. Media Spooler Detailed Operation

Figure 11A:
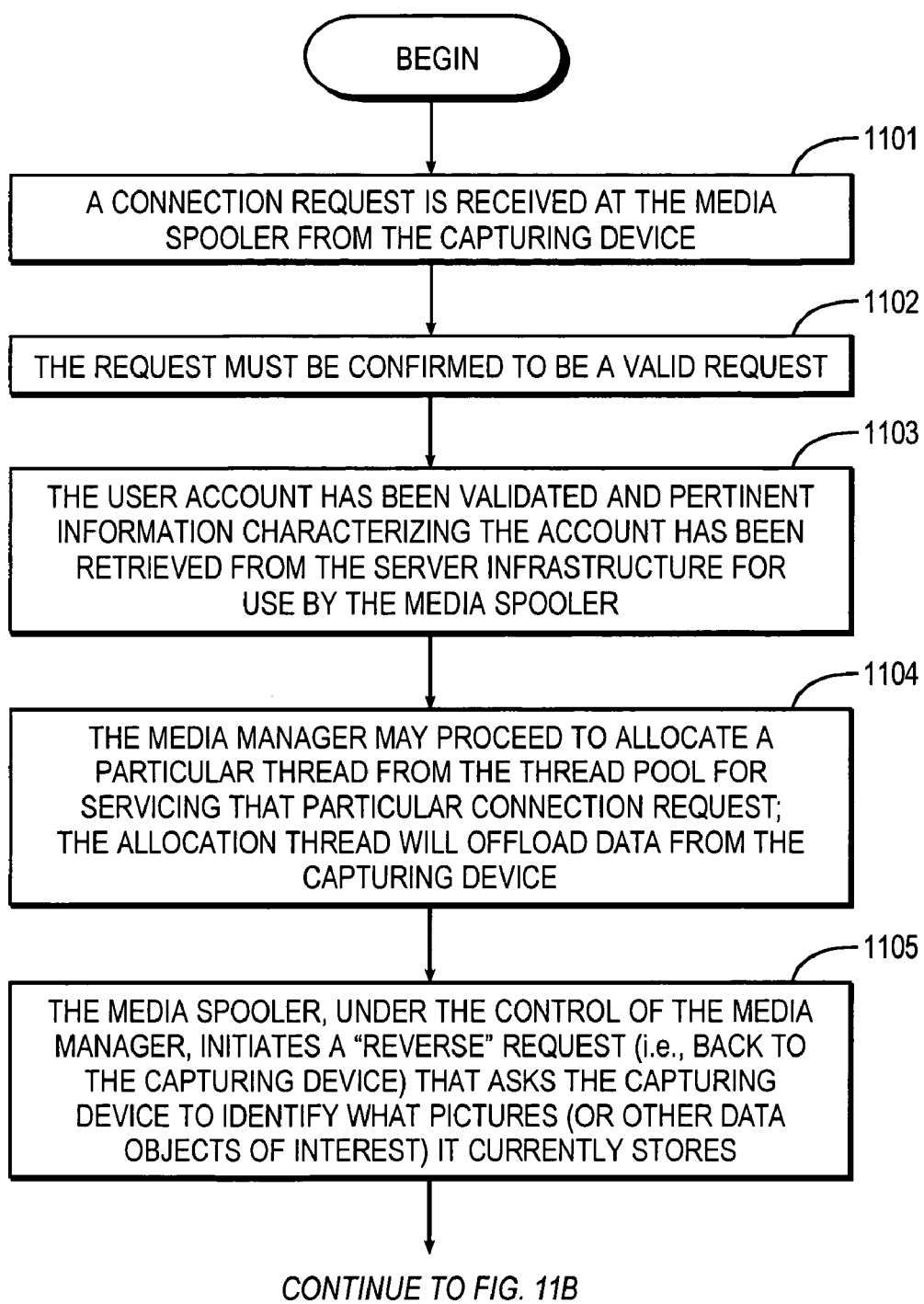
FIGS. 11A–B comprise a flowchart illustrating method steps of the present invention for efficient transmission of media content from wireless devices.
Figure 11B:
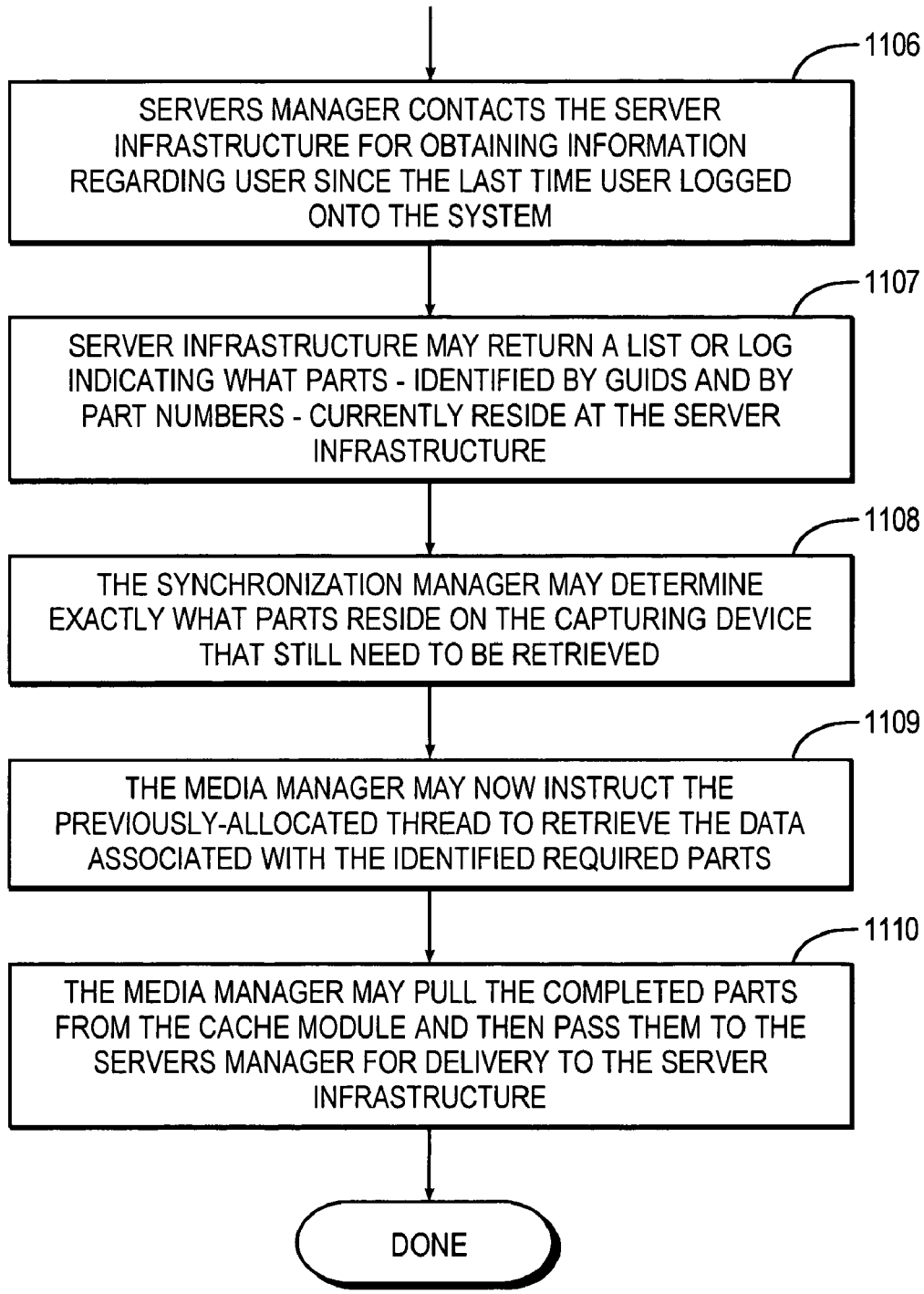

With a basic understanding of the media spooler's architecture, the end-to-end operation of the media spooler may now be described in further detail. Consider, for instance, a capturing device supporting a four-part progressive file format. The method steps for this operation are illustrated in FIGS. 11A–B, with a corresponding protocol session illustrated in FIG. 11C. At step 1101, a connection request is received at the media spooler from the capturing device. In particular, this request comes in through TCP/IP stack 1011 for processing by the media manager 1003. At this point, the request must be confirmed to be a valid request, as indicated by step 1102. For example, the step includes validating that the user is an authorized user. In order to carry out the step, it is necessary to consult with the server infrastructure. Therefore, the servers manager 1021 initiates dialogue with the server infrastructure for retrieving the user-specific authentication information (e.g., user name and password) pertinent to this particular user. Upon receiving this information, the media spooler 1000 may compare it with the user name and user password received at logon, from the capturing device. At the conclusion of step 1103, the user account has been validated and pertinent information characterizing the account has been retrieved from the server infrastructure for use by the media spooler 1000. Once the account has been validated, the media manager 1003 may proceed to allocate a particular thread from the media acquisition thread pool 1013 for servicing that particular connection request, as indicated by step 1104. The allocated thread will be called upon to offload data from the capturing device.

At step 1105, the media spooler 1000, under control of the media manager 1003, initiates a "reverse" request (i.e., back to the capturing device) that asks the capturing device to identify which of its stored pictures (or other data objects of interest) are to be uploaded. Every particular object (e.g., digital image file) is associated with a globally-unique identifier (GUID) that the capturing device has assigned. The GUID is selected to be unique across the entire system. In response to this request, the capturing device returns a media acquisition list-identifying, by GUID and by part number, the specific parts that the capturing device currently stores. Each record of the list includes the following fields for identifying each part: GUID, part number, part size, and format (e.g., PPF format).

In a complementary fashion, the media spooler 1000 issues a request to the servers manager 1021, inquiring about what pieces the server infrastructure currently has for this particular user—that is, what pieces have already been uploaded. This step, which is shown as step 1106, requires that the servers manager 1021 contact the server infrastructure for obtaining this information. In a manner similar to that done by the capturing device, the server infrastructure may return a list or log indicating what parts—identified by GUIDs and by part numbers—currently reside at the server infrastructure, as indicated by step 1107. The data structure of the server infrastructure's list may be the same as, or similar to, the capturing device's media acquisition list. However, the server infrastructure returns to the spooler information indicating the subset of data that the server does not have and thus should be extracted from the device.

Now, the media manager 1003 passes the two lists to the synchronization manager 1025. In turn, the synchronization manager 1025 may determine exactly what parts reside on the capturing device that still need to be retrieved, as shown by step 1108. In other words, the synchronization manager 1025 informs the media spooler 1000 exactly which parts it should upload from the capturing device. For example, the synchronization manager 1025 may have reported that, for this particular user, the following parts still needed to be retrieved: GUID #2, Part #2 and GUID #4, Part #3. The media manager 1003, acting on this information, may now instruct the previously-allocated thread to retrieve the data associated with the identified required parts (i.e., "chunks"), as indicated by step 1109. The media manager 1003 is free to act on any other incoming requests. At the same time, however, the allocated thread is busy dumping into in the cache module 1015 the incoming contents for the identified required parts. Once the cache module 1015 has received all of the required parts, it alerts the media manager 1003. The media manager 1003 may then pull the completed parts from the cache module 1015 and then pass them to the servers manager 1021 for delivery to the server infrastructure. This is indicated by step 1110. The part data itself is transferred as a blob object, wrapped within an XML package.

Figure 11C:
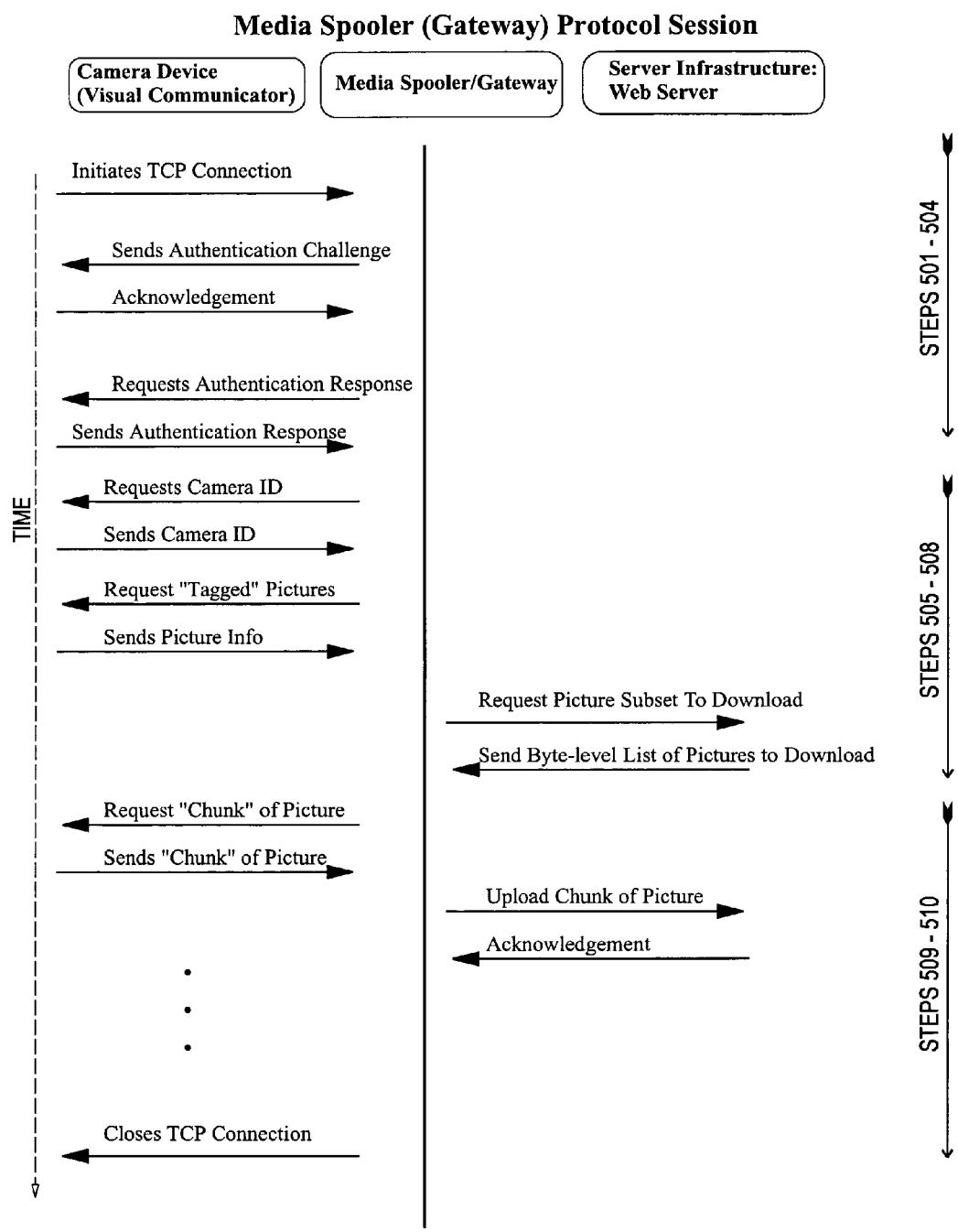
FIG. 11C is a diagram illustrating a communication protocol of the present invention which operates during the method illustrated in FIGS. 11A–B.

Additionally, the communication protocol (of FIG. 11C) between the media spooler and clients is implemented using a light-weight protocol, so that required code space is minimized on the clients. The protocol engine is itself fairly small since it responds to a simple set of requests as shown in FIG. 11C (instead of the more difficult work of generating requests, parsing responses, and handling timeouts). By using a light-weight protocol as a remote user interface, such as the same protocol employed between the wireless digital camera and the cellular phone, only one protocol engine need be compiled into the thin client. The protocol itself may also be optimized for slow data links (e.g., cellular data phone calls).

F. Implementation via remote procedure calls

1. General

In accordance with the present invention, remote procedure calls (RPCs) are defined to provide the media spooler with a means to determine which photos are currently uploaded for particular accounts. In particular, the remote procedure calls define methods to upload actual photos to a target site, methods to annotate information (meta data) for photos uploaded, and methods to set and get generic settings for a particular camera.

The following Table 4 lists remote procedure commands which the media spooler will issue to the server infrastructure.

TABLE 4

Remote Procedure Calls

| Command | Description |
|---|---|
| Query Stored Photos | Query the database on the server for a list of photos currently stored for a camera and/or user account. |
| Set Photo Meta Data | Store additional annotated information about uploaded photos. This may also include setting a list of e-mail addresses to forward the photo. |
| Store Photos | Send photo(s) to the server for storage into a user's account. Also store annotated meta data on a per-photo basis. |
| Set Camera Settings | Set camera-specific information and/or settings. |
| Get Camera Settings | Get the settings which were set with the command Set Camera Settings. |

Of the five commands which will be made, the Query Stored Photos command and the Set Camera Settings command are defined to be time critical. Specifically, both the Query Stored Photos command and the Set Camera Settings command will be called only once per camera upload session, immediately following the camera's initial negotiation with the media spooler. After uploading photos from the camera to the media spooler, the Store Photos command is called with all the photos uploaded. This command also takes care of setting any meta data associated with the photos at the time of uploading them. Finally, the Set Photo Meta Data command is used to change meta data for photos which currently reside on the server infrastructure.

2. Query Stored Photos Command

The Query Stored Photos command is used to query the server as to photos which have been previously uploaded. Since the camera can store and send photos in multiple parts (compartments) from either the desktop or through a wireless data call, this method is employed by a "Camera Spool Server" to query the application server to determine which parts have previously been uploaded. This allows the Camera Spool Server to avoid sending duplicate photos or photo parts to the application server.

Table 5 contains a list of the items the Camera Spool Server will supply as part of the query. Not all items are required. Missing items will be treated as wild card searches in the database.

TABLE 5

Query Stored Photos Database Query Fields

| Field | Type | Description |
|---|---|---|
| CamId | Numeric (128 bits) | Unique Camera ID individually assigned for each camera produced by LightSurf. |
| IMEI | var char[128] | International Mobile Equipment ID. Assigned by phone manufacturer. |
| IMSI | var char[128] | International Mobile Subscriber ID (equivalent to PSTN phone #). Assigned by carrier. |
| PSTN | var char[128] | Public Switched Telephone Number of the mobile phone which sent the photo. |
| Ticket | var char[128] | Unique ticket number using TBD calculus uniquely identifying camera/phone combination. |
| GUID | Numeric (128 bits) | Unique photo ID automatically assigned to each photo generated by a LightSurf camera. This field is unique across all LightSurf cameras. | a. Query Stored Photos SOAP Request

Listing 1 is the schema for the Query Stored Photos SOAP (Simple Object Access Protocol) request. The Camera Spool Server will make this request after the initial negotiation with the camera. This request is to allow the Camera Spool Server to determine which photos it should upload from the camera versus which photos (including compartments) have already been uploaded to the server for a particular account, Camera ID, Phone, or both. Depending on whether the user model is camera-centric or phone-centric, photos will be stored into user accounts mapped to either the camera's ID, the phone's ID, or a combination of both. Any fields which are not transmitted in the request should be treated as "don't care." An example of the actual Query Stored Photos SOAP request is shown in Listing 2.

Listing 1: Query Stored Photos SOAP Request Schema

```
<element name="GuidArray">
<complexType base="SOAP-ENC Array">
<element name="Guid" type="integer"/>
</complexType>
</element>
<element name="PhotoReqRecord">
<complexType base="SOAP-ENC:Structure">
<element name="CamId" type="integer" minOccurs="0" maxOccurs="1"/>
<element name="IMEI" type="string" minOccurs="0" maxOccurs="1"/>
<element name="IMSI" type="string" minOccurs="0" maxOccurs="1"/>
<element name="PSTN" type="string" minOccurs="0" maxOccurs="1"/>
<element name="Ticket" type="string"minOccurs="0" maxOccurs="1"/>
<element name="GuidList" type="GuidArray" minOccurs="0"/>
</complexType>
</element>
<element name="QueryStoredPhotos">
<complexType base="SOAP-ENC:Array">
<element name="Record" type="PhotoReqRecord" minOccurs="1" maxOccurs="unbounded"/>
</complexType>
</element>
```

Listing 2: Query Stored Photos SOAP Request Example

```
<QueryStoredPhotos>
<Record>
<CamId>
1234
</CamId>
<Ticket>
AXZ1-12QF-TG73-DW2P
</Ticket>
<GuidList>
<Guid>12345</Guid>
<Guid>12346</Guid>
<Guid>12347</Guid>
</GuidList>
</Record>
<Record>
<CamId>
1234
</CamId>
</Record>
</QueryStoredPhotos>
``` b. Query Stored Photos SOAP Response

Listing 3 is the schema for the Query Stored Photos SOAP response to the SOAP request (as described in section 1 above). It is practically identical to the schema for the request (Listing 1). The response only contains the corresponding records which are matched from the database query. In other words, if a request is made containing only a "CamId," then all records matching that "CamId" will be returned. Alternatively, if a request is made with a list of "GUIDs", the response will only contain the records matching the "GUIDs" which are the photos already stored on the server. The Camera Spool Server will then know to only upload (from the camera) photos not listed in the returned "GUID" list since these are the photos missing from the server.

---

Listing 3: Query Stored Photos SOAP Response Schema

```
<element name="GuidArray">
<complexType base="SOAP-ENC:Array">
<element name="Guid" type="integer"/>
</complexType>
</element>
<element name="PhotoRespRecord">
<complexType base="SOAP-ENC:Structure">
<element name="CamId" type="integer"/>
<element name="IMEI" type="string"/>
<element name="IMSI" type="string"/>
<element name="PSTN" type="string"/>
<element name="Ticket" type="string"/>
<element name="GuidList" type="GuidArray"/>
</complexType>
</element>
<element name="ResponseStoredPhotos">
<complexType base="SOAP-ENC:Array">
<element name="Record" type="PhotoRespRecord"
minOccurs="1" maxOccurs="unbounded"/>
</complexType>
</element>
```

Listing 4: Query Stored Photos SOAP Response Example

```
<Record>
<CamId>
1234
</CamId>
<IMEI>
ABCDEF12345XYZ
</IMEI>
<IMSI>
1234-1222-111
</IMSI>
<PSTN>
831-555-1234
</PSTN>
<Ticket>
AXZ1-12QF-TG73-DW2P
</Ticket>
<GuidList>
<Guid>12346</Guid>
</GuidList>
</Record>
<Record>
<CamId>
1234
</CamId>
<IMEI>
ABCDEF12345XYZ
</IMEI>
<IMSI>
1234-1222-111
</IMSI>
<PSTN>
831-555-1234
</PSTN>
<Ticket>
AXZ1-12QF-TG73-DW2P
</Ticket>
```

-continued

```
<GuidList>
<Guid>12345</Guid>
<Guid>12346</Guid>
<Guid>12347</Guid>
</GuidList>
</Record>
</PhotoRespRecord>
```

3. Store Photos Command

The Store Photos command is used to transfer uploaded photos (from the camera) to the application server. To minimize application server resources, this command will be used to send a batch set of photos, and the meta data associated with the photos, in a single command. Since this command gets called in the background (when the Camera Spool Server is idle) there is no real-time response requirements imposed by the Camera Spool Server.

The format of the request is that of a SOAP message with an attachment. The schema for the SOAP XML is shown in Listing 5. An example of this request is shown in Listing 6.

---

Listing 5: Store Photos SOAP Request Schema

```
<element name="AcctRecord">
<complexType base="SOAP-ENC:Structure">
<element name="CamId" type="integer"/>
<element name="IMEI" type="string"/>
<element name="IMSI" type="string"/>
<element name="PSTN" type="string"/>
<element name="Ticket" type="string"/>
</complexType>
</element>
<element name="EmailList">
<complexType base="SOAP-ENC:Array">
<element name="emailadd" type="string"/>
</complexType>
</element>
<element name="AlbumList">
<complexType base="SOAP-ENC Array">
<element name="album" type="string"/>
</complexType>
</element>
<element name="PhotoImageRef">
<complexType name="PhotoImage">
<attribute name="href" type="uriReference"/>
</complexType>
</element>
<element name="PhotoRecord">
<complexType base="SOAP-ENC Structure">
<element name="Guid" type="integer"/>
<element name="Title" type="string"/>
<element name="Location" type="string"/>
<element name="Comments" type="string"/>
<element name="Emaillist" type="EmailList"/>
<element name="Albumlist" type="AlbumList"/>
<element name="PhotoImage" type="PhotoImageRef"/>
</complexType>
</element>
<element name="UploadPhotos">
<element name="Account" type="AcctRecord"/>
<complexType base="SOAP-ENC:Array">
<element name="Photo" type="PhotoRecord"
minOccurs="1" maxOccurs="unbounded"/>
</complexType>
</element>
```

Listing 6: Store Photos SOAP Request Example

```
MIME-Version: 1.0
Content-Type: Multipart/Related;
boundary: MIME__SOAP__Unique__Boundary;
--MIME__SOAP__Unique__Boundary
Content-Type: text/xml
Content-Location: uploadphotos.xml
```

-continued

```
<?xml version='1.0'?>
<s:Envelope xmlns:s="http://schemas.xmlsoap.org/soap/envelope/"
 xmlns:xsd="http://www.w3.org/1999/XMLSchema"
 xmlns:xsi="http://www.w3.org/1999/XMLSchema-instance"
 s:encodingStyle="http://schemas.xmlsoap.org/soap/encoding/">
<s:Body>
<UploadPhotos id="ref-1" s:root="1">
<Account href="#ref-2" />
<Photo href="#ref-3" />
<Photo href="#ref-4" />
</UploadPhotos>
<item s:id="ref-4">
<Guid>1234123</Guid>
<Title>Another one</Title>
<PhotoImage href="photo2.ppf"/>
</item>
<item s:id="ref-2">
<CamId>99876</CamId>
<IMEI>IMEI-ABCDEFG</IMEI>
<IMSI>IMSI-1234</IMSI>
<PSTN>8315551234</PSTN>
<Ticket>ABCD-1234-EFGH-5678</Ticket>
</item>
<item s:id="ref-3">
<Guid>1234122</Guid>
<Title>Stupid Photo Example</Title>
<Comments>This is an example of a photo upload</Comments>
<AlbumList>Test</AlbumList>
<PhotoImage href="photo1.ppf"/>
</item>
</s:Body>
</s:Envelope>
--MIME_SOAP_Unique_Boundary
Content-Type: x-image/ppf
Content-Location: photo1.ppf
... Binary PPF image ...
--MIME_SOAP_Unique_Boundary
Content-Type: x-image/ppf
Content-Location: photo2.ppf
... Binary PPF image ...
--MIME_SOAP_Unique_Boundary--
```

During the upload of each photo, meta data will be assigned to each photo. The description of the meta data is described in Table 6. Many of the meta data fields will be empty and are not required to contain any valid data. All the meta data fields are either ASCII or unicode strings.

TABLE 6

Photo Meta Data

| Name | Description |
| --- | --- |
| Date & Time | This is the best guess date/time of when the photo was taken. |
| Title | The user-supplied title for the photo. |
| Comments | The user-supplied comments for the photo. |
| Location | The user-supplied location of where the photo was taken. |
| E-Mail List | List of e-mail addresses which are used to force a photo being uploaded to also be e-mailed to members on the list. |
| Album List | The user album(s) where the photo should be stored/moved. |

The reply for the Store Photos command is simply an acknowledgment that the photos were successfully uploaded to the server and that it is now safe to delete them from the Camera Spool Server.

4. Set Camera Settings Command

The Set Camera Settings command is used to store information about a particular camera. The database on the application server does not need to be concerned about the format of the data, only knowing that it will be formatted as UTF-8 data with a minimal storage requirement. The data stored with the Set Camera Settings command will be retrieved using the Get Camera Settings command (section E below).

5. Get Camera Settings Command

The Get Camera Settings command is used to retrieve data stored using the Set Camera Settings command (above). This command will be called during the initial negotiation with the camera. Because of this, there is a requirement that the time required to process this command be as short as possible. The purpose of this command is to notify the Camera Spool Server about (1) new features which can be dynamically changed on the camera as it attaches, (2) changes in the user preferences, or (3) other notifications which can be made on a per-camera basis. Currently there is no hard specification as to what these features/settings are. The Get Camera Settings and Set Camera Settings commands are here to provide a future method to allow the Camera Spool Server to have future access to this information.

6. Set Photo Meta Data Command

The Set Photo Meta Data command is used to change meta (ancillary) data on a per-photo basis. Since photos might not always be uploaded to the server, this command is used to modify the meta data associated with a particular photo. Table 6 contains a list of meta data which the Camera Spool Server is possibly required to set for each uploaded photo.

G. Alternative Embodiment: Modification of Spooler Deployment

The media spooler of the present invention is not required to be deployed at the carrier, such as shown by the embodiment of FIG. 10. In an alternative embodiment, the media spooler may instead be deployed at a location(s) other than the carrier's site—that is, located remotely. Since the media spooler's media manager will be operating at the server infrastructure's side, several components may be eliminated, including the servers manager, synchronization manager, and security manager. Specifically, the media manager may communicate directly with the server infrastructure, for determining the status of individual parts of an object (digital photograph) of interest. The media manager need not communicate through the servers manager component, nor need the media manager communicate with the server infrastructure in a secure manner, as the media manager will reside within the same security boundaries (e.g., firewall) as the server infrastructure.

Appended herewith an Appendix A are source listings, in the Perl script programming language, providing further description of the present invention. A suitable environment for creating and testing Perl script programs is available from a variety of vendors, including Perl Builder available from Solutionsoft, Perl Studio available from AyerSoft, and Perl for Win32 available from ActiveState Tool Corp.

While the invention is described in some detail with specific reference to a single-preferred embodiment and certain alternatives, there is no intent to limit the invention to that particular embodiment or those specific alternatives. For example, those skilled in the art will appreciate that the media spooler of the present invention may be deployed at locations other than the carrier, such as described above. Additionally, although the preferred embodiment has been described in terms of digital photograph media from a wireless digital camera, those skilled in the art will appreciate that the media spooler of the present invention may be advantageously employed for transmitting all types of digital media, including text, graphics, sound, video, and the like. Thus, the true scope of the present invention is not limited to any one of the foregoing exemplary embodiments but is instead defined by the appended claims.

APPENDIX A:

```perl
#! /usr/bin/perl -w
# camspool-backend.pl
#==============================================================================
v

####BSTDHDR####

#==============================================================================
=

####DESCRIPTIONBEGIN####
AUTHOR(S):      Matthew H. Gerlach
#  PURPOSE:
DESCRIPTION:

#      This is a perl script that implements the "backend" portion
#  of the camspooler.  The backend is responsible for taking the
#  the pictures that have been uploaded to the camspool frontend
#  and in turn uploading it to the real Lightsurf web server to
#  a particular user's account.

#      This particular implementation simply involves polling a directory,
#  looking for new files that have been downloaded.  When it finds one,
#  it reads the pictures ancillary data file for information about the
#  picture and its associated user, or if a new account needs to be made.
#  With the information, it tries to deposit the pictures in the correct
#  account.  Basically, once a picture has be put in the directory by the
#  camspool front end, the backend will try until hell freezes over to
#  get that picture to the account.

####DESCRIPTIONEND####
#==============================================================================
=

####COPYRIGHTBEGIN####

(c) Copyright 1999, 2000 Lightsurf Technologies, Inc.   ALL RIGHTS RESERVED.

####COPYRIGHTEND####
#==============================================================================
=

####ESTDHDR####
#==============================================================================
^ use strict;
use LS_UnixDaemonUtils;
use LS_UploadClient;
use XML::Simple;
use Data::Dumper;
use LWP::UserAgent;
use Benchmark;
```

```perl
if ($#ARGV < 1)
{
    &print_usage;
} my($picture_dir) = shift;

if (! -d $picture_dir)
{
    LS_LogPrint "$picture_dir is not a directory\n";
    &print_usage;
} my(%url_info) = ();

$url_info{start} = shift;

if (!defined($url_info{start}))
{
    LS_LogPrint "you must give a url to upload to\n";
    &print_usage;
} my($sleep_time) = 10;
my($arg);
my($log_filename) = undef;
my($pid_filename) = undef;
my $uid = undef;
my $gid = undef;

while ($arg = shift)
{
    if ($arg =~ /^--sleep$/)
    {
        $arg = shift;
        if (!defined($arg))
        {
            LS_LogPrint "-t needs a time value\n";
            &print_usage;
        }
        $sleep_time = oct($sleep_time) if $sleep_time =~ /^0/;
    }
    elsif ($arg =~ /^-D$/)
    {

$pid_filename = shift;
        if (!defined($pid_filename))
        {
            LS_LogPrint "-D needs a pid_filename\n";
            &print_usage;
        }
    }
    elsif ($arg =~ /^--log$/)
    {
        $log_filename = shift;
        if (!defined($log_filename))
```

```
            {
                LS_LogPrint "--log needs a log_filename\n";
                &print_usage;
            }
        }
        elsif ($arg =~ /^--uid$/)
        {
            $uid = shift;
            if (!defined($uid))
            {
                LS_LogPrint "--uid needs a uid\n";
                &print_usage;
            }
        }
        elsif ($arg =~ /^--gid$/)
        {
            $gid = shift;
            if (!defined($gid))
            {
                LS_LogPrint "--uid needs a uid\n";
                &print_usage;
            }
        }
        elsif ($arg =~ /^--login$/)
        {
            $url_info{login} = shift;
            if (!defined($url_info{login}))
            {
                LS_LogPrint "--login needs a login\n";
                &print_usage;
            }
        }
        elsif ($arg =~ /^--passwd$/)
        {
            $url_info{passwd} = shift;
            if (!defined($url_info{passwd}))
            {
                LS_LogPrint "--passwd needs a passwd\n";
                &print_usage;
            }
        }
        elsif ($arg =~ /^--del$/)
        {
            $url_info{del_photo} = 1;
        }
        else
        {
            LS_LogPrint "Unknown option: $arg\n";
            &print_usage;
        }
    } if (defined($log_filename))
    {
        LS_SetLogFile($log_filename);
    } if (defined($pid_filename))
```

```perl
{
    &LS_BecomeDaemon();

$SIG{TERM} = \&HandleSigTerm;

&LS_WritePidFile($pid_filename);
} if (defined($gid))
{
    LS_SetGid($gid);
} if (defined($uid))
{
    LS_SetUid($uid);
} write pid file after changing uid/gid
so that we can delete pid file if necessary

if (defined($pid_filename))
{
    $SIG{TERM} = \&HandleSigTerm;

&LS_WritePidFile($pid_filename);
} select(STDERR); $| = 1;
select(STDOUT); $| = 1;

&CamspoolBackend($picture_dir, $sleep_time, \%url_info);

sub print_usage
{
    print "Usage $0 <picture_dir> <url> [--sleep sleep_interval ]\n";
    print "                                [-D pid_file ]\n";
    print "                                [--log log_file ]\n";
    print "                                [--uid uid ]\n";
    print "                                [--login login ]\n";
    print "                                [--passwd passwd ]\n";
    print "                                [--del ]\n";
    print "    picture_dir - directory to poll for tagged pictures\n";
    print "    url         - url of server to upload to (e.g. http://dsheth-nt4:8080)\n";
    print "    --sleep     - seconds between directory polls (default = 10)\n";
    print "    -D          - start process as daemon and write the rsulting prociess it to pid_file \n";
    print "    --log       - LSLogPrint log info to passed file (default = STDOUT)\n";
    print "    --uid       - set program's effective user id\n";
    print "    --login     - optional login used for server authentication\n";
    print "    --passwd    - optional login used for server authentication\n";
    print "    --del       - delete photos when uploaded to server\n";
```

```
        exit(1);
    } sub HandleSigTerm
    {
        LS_LogPrint "Terminated\n";
        unlink($pid_filename);
        exit(1);
    }

# CamspoolBackend
    #
    #   This function implements the basic flow control
    # of the Campspool back end.  In short it runs forever,
    # periodically checking the passed directory for any
    # upload jobs (i.e. files ending with ".tag").  As long as it
    # finds jobs to upload, it will; otherwise, it sleeps for a bit
    # before checking for more jobs.
    #
    sub CamspoolBackend
    {
        my($picture_dir, $sleep_time, $url_ref) = @_;
        my(@jobs);
        my($job_file_name, $job, $upload_client);

my $last_ticket = "";

my $jobs_completed = 0;

my $job_successful;

LS_LogPrint "Starting $0\n";

while (1)
        {
            @jobs = &getUploadJobs($picture_dir);

$jobs_completed = 0;
            foreach $job_file_name (@jobs)
            {
                $job = ReadJob("$picture_dir/$job_file_name.tag");

if (!defined($job))
                {
                    LS_LogPrint "Failed to parse job
$picture_dir/$job_file_name\n";
                    &renameBadJob("$picture_dir/$job_file_name");
                    next;
                }

LS_LogPrint "\n";
                LS_LogPrint "Attempting upload job $job_file_name\n";
                $job_successful = 0;
```

```

# given a device_login (a.k.a. a ticket) we need to create
# an upload client.  As long we are uploading jobs with
# the ticket, we can reuse the upload client.

if ($job->{ticket} ne $last_ticket)
{
    if (defined($url_ref->{login}))
    {
        $upload_client = new LS_UploadClient($url_ref->{start},
$job->{ticket},
                                                                login   =>
$url_ref->{login},
                                                                passwd =>
$url_ref->{passwd},);
    }
    else
    {
        $upload_client = new LS_UploadClient($url_ref->{start},
$job->{ticket});
    } if (!defined($upload_client) || !ref($upload_client))
    {
        LS_LogPrint "Error creating upload client for job
$job_file_name\n";
        &renameBadJob("$picture_dir/$job_file_name");
        $last_ticket = "";
        next;
    } if we fall through here, then we successfully got an
upload_client
} if ($job->{type} eq "image/x-lspp")
    {
        $job_successful =
$upload_client->UploadImageCompartment($job->{guid},
$job->{type},
$job->{savedFilename},
$job->{part}, 0, 0);
    }
    elsif ($job->{type} eq "image/x-lsanc")
    {
        $job_successful = &CamspoolUploadAnc($picture_dir, $job,
$upload_client);

if (!defined($job_successful))
        {
            LS_LogPrint "Anc job $job_file_name is empty\n";
            $job_successful = 1;
        }
```

```
            }
            else
            {
                LS_LogPrint "Unknown job type, $job->{type}, in
$job_file_name\n";
            } if ($job_successful > 0)
            {
                LS_LogPrint sprintf "Successfully uploaded %s job
$job_file_name\n", $job->{type};
                $jobs_completed++;
                $last_ticket = $job->{ticket};

if (exists($url_ref->{del_photo}))
                {
                    if (!unlink ("$job->{savedFilename}"))
                    {
                        LS_LogPrint "Failed to delete job data
$job->{savedFilename}: $!\n";
                        &renameBadJob("$picture_dir/$job_file_name");
                    }
                    elsif (!unlink ("$picture_dir/$job_file_name.tag"))
                    {
                        LS_LogPrint "Failed to delete job
$picture_dir/$job_file_name: $!\n";
                        &renameBadJob("$picture_dir/$job_file_name");
                    }
                }
                else
                {
                    if (!rename("$picture_dir/$job_file_name.tag",
"$picture_dir/$job_file_name.snt"))
                    {
                        LS_LogPrint sprintf "Failed to rename %s to %s: $!\n",
                                            "$picture_dir/$job_file_name.tag",
                                            "$picture_dir/$job_file_name.snt"
;

}
                }
            }
            else
            {
                LS_LogPrint sprintf "Failed to upload %s job
$job_file_name\n", $job->{type};
                &renameBadJob("$picture_dir/$job_file_name");
                $last_ticket = "";
            }

}

# if there are no new jobs or we couldn't successfully upload any job
        # then we will sleep a bit to give the server some breathing room
        #
        if ($jobs_completed <= 0)
        {
```

```perl
            sleep $sleep_time;
        }
    }
} getUploadJobs

This function will return a list of upload jobs.  These
#     jobs are just files in the passed dir, ending with ".tag".

sub getUploadJobs
{
    my($dir) = @_;
    my(@tagged_files);

if (!opendir(JOBS , "$dir"))
    {
        LS_LogPrint "can't open directory $dir: $!\n";
        exit(1);
    }

@tagged_files = readdir JOBS;

if (!closedir JOBS)
    {
        LS_LogPrint "can't close directory $dir: $!\n";
        exit(1);
    }

@tagged_files = grep {s/\.tag$//} @tagged_files;

return(sort @tagged_files);
} sub ReadJob
{
    my ($filename) = @_;

if (!open(FILE, $filename))
    {
        LS_LogPrint "Failed to open job file, $filename: $!\n";
        return undef;
    } my $line;
    my ($key, $value, %hash);

while ($line = <FILE>)
    {
        chomp $line;

($key, $value) = split(/ /, $line);
        $hash{$key} = $value;
    } if (!close(FILE))
```

```perl
    {
        LS_LogPrint "Failed to close job file, $filename: $!\n";
        return undef;
    } return \%hash;
}

# renameBadJob

# For whatever reason we might encounter a job file that broken in some
# way.  To avoid continually retrying the bad job, we rename the filename
# so that it ends with ".bad".

sub renameBadJob
{
    my ($job_filename) = @_;

if (!rename("$job_filename.tag", "$job_filename.bad"))
    {
        LS_LogPrint "Failed to rename bad job,$job_filename: $!\n";
    }
} sub CamspoolUploadAnc
{
    my ($picture_dir, $job, $upload_client) = @_;

my($old_RS) = $/;
    my($input);

my($STITLE, $LOCATION, $COMMENTS);
    my(@EMAIL );
    my($recip, $addr);

my $anc_file = "$job->{savedFilename}";

$TITLE    = "";
    $LOCATION = "";
    $COMMENTS = "";
    @EMAIL    = ();

$/ = undef;  # set input separator to undef to read whole file if (!open(ANC_FILE, $anc_file))
    {
        LS_LogPrint "failed to open anscillary data file $anc_file\n";
        $/ = $old_RS;
        return(0);
    }
    $input = <ANC_FILE>;
    $input =~ s|<Ver>[\n\r]*.*[\n\r]*</Ver>||i;

my $xml = XMLin($input, forcearray => 1);

close(ANC_FILE);
    $/ = $old_RS;
```

```
    ## Get the photo title
    defined $xml->{title}->[0] && ($TITLE=$xml->{title}->[0]);

...Location...
    defined $xml->{location}->[0] && ($LOCATION=$xml->{location}->[0]);

...Comments...
    defined $xml->{comments}->[0] && ($COMMENTS=$xml->{comments}->[0]);

...email list...
    if (exists $xml->{email_list}->[0]->{email})
    {
        my $email=$xml->{email_list}->[0]->{email};
        foreach $recip (@$email)
        {
          my $alias="",$addr="";
          defined $recip->{alias}->[0] && ($alias=$recip->{alias}->[0]);
          defined $recip->{emailadd}->[0] && ($addr=$recip->{emailadd}->[0]);
          push @EMAIL,("$addr");
        }
    } my $rval = undef;

if ((length($TITLE)    > 0) || (length($LOCATION) > 0) ||
        (length($COMMENTS) > 0)   )
    {
#       LS_LogPrint "title is \"$TITLE\"\ncomments are
\"$COMMENTS\"\nlocataion is·\"$LOCATION\"\n";

if (!$upload_client->SetMetaData( "guid", $job->{guid},
                                            title    => $TITLE,
                                            location => $LOCATION,
                                            comments => $COMMENTS, ))
        {
            return(0);
        }
        else
        {
            $rval = 1;
        }
    } if ($#EMAIL >= 0)
    {
        return($upload_client->ShipEmailAddrs("guid", $job->{guid}, \@EMAIL));
    }
    return($rval);
}

#! /usr/bin/perl -w
# camspool-frontend.pl
#========================================================================
v

####BSTDHDR####

```

```
#=============================================================================

####DESCRIPTIONBEGIN####
AUTHOR(S):      Matthew H. Gerlach
#  PURPOSE:        Implements Camspool's front end
#  DESCRIPTION:

#  This program implementes the Lightsurf Camspool's frontend.
#  It is responsible for receiving (or initiating) TCP connections from/to
#  a Lightsurf camera.  Once the TCP connection is established,
#  this program becomes a "client" in terms of making a series
#  of UICHAN resqests to the camera to get information and utlimately
#  fetching pictures to a local harddrive.

####DESCRIPTIONEND####
#=============================================================================

####COPYRIGHTBEGIN####

(c) Copyright 1999, 2000 Lightsurf Technologies, Inc.   ALL RIGHTS RESERVED.

####COPYRIGHTEND####
#=============================================================================

####ESTDHDR####
#=============================================================================
^
use strict;
use IO::Socket;
use Data::Dumper;
use LS_UnixDaemonUtils;
use LS_Uichan;
use LS_UploadClient;
use POSIX "sys_wait_h";

my $gDefaultTcpPort = 13002;

if ($#ARGV < 0)
{
    &print_usage();
} my %gSpoolInfo = ();

$gSpoolInfo{local_dir} = shift;
$gSpoolInfo{guid_type} = "tagged";

if (! -d $gSpoolInfo{local_dir})
{
    die "    $gSpoolInfo{local_dir} is not a directory\n";
}
```

```perl
my $arg;
my $tcp_port    = $gDefaultTcpPort;
my $log_filename = undef;
my $host        = undef;
my $pid_filename = undef;
my $uid         = undef;
my $gid         = undef;
while ($arg = shift)
{
    if ($arg =~ /^-D$/)
    {
        $pid_filename = shift;
        if (!defined($pid_filename))
        {
            print "-D needs a pid_filename\n";
            &print_usage;
        }
    }
    elsif ($arg =~ /^--log$/)
    {
        $log_filename = shift;
        if (!defined($log_filename))
        {
            print "--log needs a filename\n";
            &print_usage;
        }
    }
    elsif ($arg =~ /^--uid$/)
    {
        $uid = shift;

if (!defined($uid))
        {
            print "--uid needs a uid\n";
            &print_usage;
        }

}
    elsif ($arg =~ /^--gid$/)
    {
        $gid = shift;

if (!defined($gid))
        {
            print "--gid needs a gid\n";
            &print_usage;
        }

}   elsif ($arg =~ /^--login$/)
    {
        $gSpoolInfo{login} = shift;
        if (!defined($gSpoolInfo{login}))
        {
            print "--login needs a login\n";
            &print_usage;
        }
```

```
        }
        elsif ($arg =~ /^--passwd$/)
        {
            $gSpoolInfo{passwd} = shift;
            if (!defined($gSpoolInfo{passwd}))
            {
                print "--passwd needs a passwd\n";
                &print_usage;
            }
        }
        elsif ($arg =~ /^--host$/)
        {
            $host = shift;
            if (!defined($host))
            {
                print "--host needs a host_id\n";
                &print_usage;
            }
        }
        elsif ($arg =~ /^--port$/)
        {
            $tcp_port = shift;
            if (!defined($tcp_port))
            {
                print "--port needs a tcp_port\n";
                &print_usage;
            }
        }
        elsif ($arg =~ /^--del$/)
        {
            $gSpoolInfo{del_photo} = 1;
        }
        elsif ($arg =~ /^--all$/)
        {
            $gSpoolInfo{guid_type} = "all";
        }
        elsif ($arg =~ /^--url$/)
        {
            $gSpoolInfo{url} = shift;
            if (!defined($gSpoolInfo{url}))
            {
                print "--url needs a url\n";
                &print_usage;
            }
        }
        else
        {
            print "Unknown option: $arg\n";
            &print_usage;
        }
    } if (defined($log_filename))
    {
        LS_SetLogFile($log_filename);
    }
```

```
    autoflush STDERR 1;
    autoflush STDOUT 1;

if (defined($host))
    {
        &CamspoolConnector($host, $tcp_port, \%gSpoolInfo);
    }
    else
    {
        &CamspoolListener($tcp_port, \%gSpoolInfo, $pid_filename, $uid, $gid);
    } exit(0);

sub print_usage
    {
        print "Usage $0 <local_dir> \n";
        print "                                    [--url sync_url ]\n";
        print "                                    [-D pid_file ]\n";
        print "                                    [--log log_file ]\n";
        print "                                    [--uid uid ]\n";
        print "                                    [--gid gid ]\n";
        print "                                    [--login login ]\n";
        print "                                    [--passwd passwd ]\n";
        print "                                    [--host host_id ]\n";
        print "                                    [--port tcp_port ]\n";
        print "                                    [--del ]\n";
        print "                                    [--all ]\n";
        print "    local_dir  - local directory to store pictures\n";
        print "    url        - url of server to perform database sync query\n";
        print "    -D         - start process as daemon writing to log_file and
    pid_file \n";
        print "    --log      - send output to log_file instead of STDOUT\n";
        print "    --uid      - set program's effective user id\n";
        print "    --gid      - set program's effective group id\n";
        print "    --login    - optional login used for server authentication\n";
        print "    --passwd   - optional passwd used for server authentication\n";
        print "    --host     - initiate TCP connection to host_id, otherwise
    listen for TCP connections\n";
        print "    --port     - either listen or connect to tcp_port, default =
    $gDefaultTcpPort\n";
        print "    --del      - delete photos on camera instead of setting state
    to \"done\"\n";
        print "    --all      - fetch all pictures rather than just \"tagged\"
    pictures\n";
        exit(1);
    }

#  This little function handles a SIG_TERM signal.
    #  it just removes the $pid_filename and exits
    #
    sub HandleSigTerm
    {
        LS_LogPrint "Terminated\n";
        unlink($pid_filename);
```

```perl
        exit(1);
    }

#   This function implements a Camspool connector.
    #   In other words it initiates a TCP connection
    #   to a camera and then has a standard CamspoolSession.
    #
    sub CamspoolConnector
    {
        my($host, $port, $info_ref) = @_;

my $sock = new IO::Socket::INET(PeerAddr => $host,
                                        PeerPort => $port,
                                        Proto    => 'tcp', );
        if (!defined($sock))
        {
            LS_LogPrint "Failed to connect to $host:$port\n    $!\n";
            exit(1);
        } my $uichan = new LS_Uichan($sock);

$info_ref->{session_id} = 0;
        $info_ref->{port}       = $port;

&CamspoolSession($uichan, $info_ref);

$uichan->Empty();

close $sock;
    }

#   REAPER
    #
    #   Since CamspoolListener() forks children for each incoming connection,
    #   the children must be reaped when they die.  This little
    #   function was taken right from Chapter 6 of "Programming Perl" 2nd Edition.
    #
    sub REAPER
    {
        $SIG{CHLD} = \&REAPER;

while (waitpid(-1, WNOHANG) > 0)
        {
        }
    }

# This function implements a Camspool listener.
    # Forever, this function will accept TCP connections,
    # forks, and has the child perform a stand CamspoolSession.
    #
    sub CamspoolListener
    {
        my($port, $info_ref, $pid_filename, $uid, $gid) = @_;
```

```perl
LS_LogPrint "Starting $0\n";

my $sock = new IO::Socket::INET(LocalPort => $port,
                                Proto     => 'tcp',
                                Reuse     => 1,
                                Listen    => SOMAXCONN,);

if (!defined($sock))
{
    LS_LogPrint "Failed to create listening socket: $!\n";
    exit(1);
} don't bother becoming a daemon until we know
we can bind to the socket.

if (defined($pid_filename))
{
    LS_BecomeDaemon();

$SIG{TERM} = \&HandleSigTerm;

LS_WritePidFile($pid_filename);
} we must hold off setting the gid/uid until
we have bound to the socket.  This allows
# root to bind to a priveledge port, and then
# become a nobody.  Be sure to set gid before
# uid.

if (defined($gid))
{
    LS_SetGid($gid);
} if (defined($uid))
{
    LS_SetUid($uid);
} we must write the pid file after we switch uid
so that we can delete when we get terminated

if (defined($pid_filename))
{
    $SIG{TERM} = \&HandleSigTerm;

LS_WritePidFile($pid_filename);
} my ($new_sock, $child_pid);

my $session_counter = 0;
```

```perl
        $SIG{CHLD} = \&REAPER;

while (1)
        {
            LS_LogPrint "Waiting for connection\n";

$new_sock = $sock->accept();

if (!defined($new_sock))
            {
                LS_LogPrint "Accept failed: $!\n";
                next;
            }

$session_counter++;

$child_pid = fork();

if (!defined($child_pid))
            {
                LS_LogPrint "fork failed: $!\n";
                close($new_sock);
                next;
            } if ($child_pid == 0)
            {
                # Child closes its copy of the main socket
                close $sock;

LS_LogPrint sprintf "Accepted connection from %s:%d\n",
                                    $new_sock->peerhost(),
                                    $new_sock->peerport();

my $uichan = new LS_Uichan($new_sock);

$info_ref->{session_id} = $session_counter;
                $info_ref->{port}       = $port;

&CamspoolSession($uichan, $info_ref);

$uichan->Empty();

close $new_sock;

exit(0);
            }
            else
            {
                # Parent closes copy of child's socket.
                close $new_sock;
            }
        }
    }

# CamspoolSession
    #
```

```perl
# This function performs a single "syncing" session with
# a camera.  A session lasts as long as there are
# pictures to be fetched and nothing fails.

sub CamspoolSession
{
    my($uichan, $info_ref) = @_;

if (!$uichan->AuthCamera())
    {
        LS_LogPrint "Could Not Authenticate Camera\n";
        exit(1);
    }

LS_LogPrint "Successfully Authenticated Camera\n";

my $ticket = $uichan->GetTicket();

if (!defined($ticket))
    {
        LS_LogPrint "Could not get Ticket\n";
        exit(1);
    }

LS_LogPrint "Got ticket $ticket\n";

my @tagged_guids;
    my @sync_guids;
    my $upload_client = undef;

$info_ref->{session_count} = 0; # initialize count of files moved during session
    $info_ref->{byte_count}    = 0;
    my $picture_count          = 0;

my $session_start_time = time;
    my $list_ref_to_fetch;
    my $done = 0;
    while (!$done)
    {
        @tagged_guids = ();
        @sync_guids   = ();

if (!$uichan->GetGuids($info_ref->{guid_type}, \@tagged_guids))
        {
            LS_LogPrint "Could not get tagged guids\n";
            last;
        } if ($#tagged_guids < 0)
        {
            LS_LogPrint "Session cleanly ended\n";
            last;
        } if (!exists($info_ref->{url}))
        {
            $list_ref_to_fetch = \@tagged_guids;
```

```
            }
            else
            {
                #
                #   Make db transaction to determine subset of @tagged_guids that
        should
                #   be uploaded.
                #
                if (!defined($upload_client))
                {
                    if (exists($info_ref->{login}) && exists($info_ref->{passwd}))
                    {
                        $upload_client = new LS_UploadClient($info_ref->{url},
        $ticket,
                                                              login   =>
        $info_ref->{login},
                                                              passwd =>
        $info_ref->{passwd});
                    }
                    else
                    {
                        $upload_client = new LS_UploadClient($info_ref->{url},
        $ticket);
                    } if (!defined($upload_client))
                    {
                        LS_LogPrint "Failed to get upload session\n";
                        exit(1);   # FIXME upload the pictures anyway.
                    }
                }

$upload_client->PerformSyncRequest(\@tagged_guids, \@sync_guids);
                $list_ref_to_fetch = \@sync_guids;
                LS_LogPrint sprintf "Tagged guids from camera\n%s\n", Dumper
        \@tagged_guids;
                LS_LogPrint sprintf "Sync guids from data base\n%s\n", Dumper
        \@sync_guids;
        #       print Dumper \@sync_guids;
            } my($guid_ref, $key);
            foreach $guid_ref (@$list_ref_to_fetch)
            {
                if (!&CamspoolGetPicRec($uichan, $info_ref, $guid_ref, $ticket))
                {
                    LS_LogPrint "Failed to get picture record for
        $guid_ref->{id}\n";
                    $done = 1;
                    last;
                }
                else
                {
                    $picture_count++;
                }
            }
```

```perl
        #
        # if we synced with the database and nothing
        # failed, then pull off ancillary files
        # of those pictures not needing data
        #
        if (exists($info_ref->{url}) && (!$done) && ($#tagged_guids >
$#sync_guids))
        {
            if (!&CamspoolResolveAncFiles($uichan, $ticket, $info_ref,
\@tagged_guids, \@sync_guids))
            {
                $done = 1;
            }
        }

} my $session_time = time - $session_start_time;
    my $report = sprintf "Transfered %d pictures %d files %d bytes in %d
seconds ",
                        $picture_count,
                        $info_ref->{session_count},
                        $info_ref->{byte_count},
                        $session_time;

if (($info_ref->{session_count} > 0) && ($session_time > 0))
    {
        $report .= sprintf "%d bytes/sec\n",
int($info_ref->{byte_count}/$session_time);
    }
    else
    {
        $report .= "\n";
    }

LS_LogPrint $report;
}

# CamspoolGetPicRec

# This function gets a picture "record" from the camera and
# spools it to disk as specified in the $info_ref->{local_dir}.
# A picture recond consists of  some number of "comparments"
# of image data, and a ancillary file.

# In order for the progress bar on the phone to behave properly,
# I need to tell the camera the start and end percents the
# compartment is of the whole picture.

sub CamspoolGetPicRec
{
    my($uichan, $info_ref, $guid_ref, $ticket) = @_;

# start by accumulating the total bytes for all of the compartments
    # and create a list of just comparment tags in $guid_ref.
    #
```

```perl
    my $compartment_list_ref = $guid_ref->{part};
    my $compartment_ref;

my $total_compartment_bytes = 0;
    foreach $compartment_ref (@$compartment_list_ref)
    {
        $total_compartment_bytes += $compartment_ref->{tobyte} -
$compartment_ref->{frombyte};
    }

LS_LogPrint sprintf "%s has %d compartments for %d bytes\n",
                        $guid_ref->{id},
                        ($#$compartment_list_ref + 1),
$total_compartment_bytes;

my $compartments_fetched = 0;
    my $percent_complete     = 0;

my $compartment_end_percent;
    my $compartment_percent;

my $saved_filename;
    my $job_filename;
    my $compartment_bytes;

my ($bytes_read, $bytes_2_read);
    foreach $compartment_ref (@$compartment_list_ref)
    {
        $compartment_bytes     = $compartment_ref->{tobyte} -
$compartment_ref->{frombyte};

$compartment_percent =
int(($compartment_bytes/$total_compartment_bytes)*100);

$compartment_end_percent = $percent_complete + $compartment_percent;

LS_LogPrint sprintf "    Fetching %s with %-6d bytes %2d%% - %2d%%\n",
                        "$guid_ref->{id}.pp$compartment_ref->{id}",
                        $compartment_bytes,
                        $percent_complete,
                        $compartment_end_percent;

$saved_filename = &CamspoolComputeUniqueFileName($info_ref,
                                                        $guid_ref->{id},
sprintf(".pp%s",$compartment_ref->{id}));

($bytes_read, $bytes_2_read) = $uichan->GetPic($guid_ref->{id},
                                        $saved_filename,
                                        $compartment_ref->{id},
                                        startPercent => $percent_complete,
                                        endPercent   =>
$compartment_end_percent,);

if (($bytes_read <= 0) || ($bytes_read != $bytes_2_read))
        {
            LS_LogPrint "    failed to get part $compartment_ref->{id} for
$guid_ref->{id} $bytes_read $bytes_2_read\n";
```

```perl
            last;
    }

LS_LogPrint "    Successfully fetched
$guid_ref->{id}.pp$compartment_ref->{id}\n";

# Write backend "job" file here.
    #
    $job_filename = &CamspoolComputeUniqueFileName($info_ref,
$guid_ref->{id}, "");

&CamspoolWriteTagFile($job_filename,
                          guid           => $guid_ref->{id},
                          part           => $compartment_ref->{id},
                          savedFilename  => $saved_filename,
                          ticket         => $ticket,
                          type           => "image/x-lspp",);

$compartments_fetched++;

$info_ref->{session_count}++;
    $info_ref->{byte_count} += $compartment_bytes;

# attempt to set state for compartment successfully sent
    #
    if (!$uichan->SetPhotoState($guid_ref->{id}, "SENT",
$compartment_ref->{id}))
    {
        LS_LogPrint "    failed to set photo state to SENT
$compartment_ref->{id} for $guid_ref->{id}\n";
        last;
    }

$percent_complete += $compartment_percent;
  }

# we will always have to grab the anc, so we don't return
  # successfully until we we've got it, wrote the local ticket and tag files
  # and finally tell the camera we are "DONE"
  #
  my $rval = 0;

if ($compartments_fetched == ($#$compartment_list_ref + 1))
  {
      $rval = &CamspoolFetchAnc($uichan, $guid_ref->{id}, $ticket,
$info_ref);
  } return($rval);
}

#  CamspoolFetchAnc
```

```perl

#   This function will fetch an ancillary file from the camera
#   and store it locally and create the necessary job.
#   This function will also delete the picture or set the
#   state to "DONE" since the Anc file is the last thing
#   we deal with for a picture.

sub CamspoolFetchAnc
{
    my ($uichan, $guid, $ticket, $info_ref) = @_;

my $saved_filename = &CamspoolComputeUniqueFileName($info_ref, $guid,
".anc");

LS_LogPrint "    Fetching $guid.anc\n";

my $rval = 0;

my ($bytes_read, $bytes_2_read) = $uichan->GetPic($guid,
                                                      $saved_filename,
                                                      "anc");

if (($bytes_read > 0) && ($bytes_read == $bytes_2_read))
    {
        my $job_filename = &CamspoolComputeUniqueFileName($info_ref, $guid,
"");

&CamspoolWriteTagFile($job_filename,
                              guid          => $guid,
                              savedFilename => $saved_filename,
                              ticket        => $ticket,
                              type          => "image/x-lsanc",);

$info_ref->{session_count}++;
        $info_ref->{byte_count} += $bytes_read;

if (exists($info_ref->{del_photo}))
        {
            if (!$uichan->DeletePhoto($guid))
            {
                LS_LogPrint "    failed to delete photo $guid\n";
            }
            else
            {
                LS_LogPrint "    Successfully fetched $guid.anc\n";
                $rval = 1;
            }
        }
        else
        {
            if (!$uichan->SetPhotoState($guid, "DONE", 0))
            {
                LS_LogPrint "    failed to set photo state to DONE for
$guid\n";
            }
            else
            {
                LS_LogPrint "    Successfully fetched $guid.anc\n";
```

```
            $rval = 1;
        }
    }
}
else
{
    LS_LogPrint "    failed to get anc for $guid\n";
} return($rval);
}

#  This function will write a job file ending with ".tag".
#  Since the camspool backend is periodically looking for
#  files ending with ".tag" we write a ".tmp" first and
#  then rename it when it has been completely written.

sub CamspoolWriteTagFile
{
    my($job_filename, %args) = @_;

if (!open(FILE, ">$job_filename.tmp"))
    {
        LS_LogPrint "Failed to write tmp file, $job_filename.tmp: $!\n";
        exit(1);
    } my $key;

foreach $key (keys %args)
    {
        print FILE "$key $args{$key}\n";
    } if (!close(FILE))
    {
        LS_LogPrint "Failed to close tmp file, $job_filename.tmp: $!\n";
        exit(1);
    } if (!rename("$job_filename.tmp", "$job_filename.tag"))
    {
        LS_LogPrint "Failed to rename $job_filename.tmp to $job_filename.tag: $!\n";
        exit(1);
    }

}

#  CamspoolResolveAncFiles

#  This function will fetch any ancillary files that might need to be loaded.
#  The idea is that users can "send" multiple emails of the picture or
#  change "Meta" data anytime.  The database sync, however, tells what
#  data is already uploaded. So given the two references to guid lists.
#  we will fetch ancillary data for any picture in the list fetched from
#  from the camera that was not part of the list fetched from the server.
```

```
#  The function will return 1 only if all ancillary files are
#  successfully fetched; 0 is returned otherwise.

sub CamspoolResolveAncFiles
{
    my ($uichan, $ticket, $info_ref, $full_guid_list_ref,
$synced_guid_list_ref) = @_;

my %sync_guids;
    my $guid_ref;

# make a hash whose keys list the guids of the already synced pictures
    #
    foreach $guid_ref (@$synced_guid_list_ref)
    {
        $sync_guids{$guid_ref->{id}} = 1;
    } my @remaining_guids = ();

# figure out which guids in the full list are not
    # in the synced list
    #
    foreach $guid_ref (@$full_guid_list_ref)
    {
        if (!exists($sync_guids{$guid_ref->{id}}))
        {
            if (!&CamspoolFetchAnc($uichan, $guid_ref->{id}, $ticket,
$info_ref))
            {
                return(0);
            }
        }
    } return(1);
}

# CamspoolComputeUniqueFileName

# The trick is that we need to create a unique filename for each file written
# by a deamon into its "local_dir".  Since we might be waiting to time out on
# camera's connection, while user "retries" we cannot use just the guid.
# In addition we want the filenames to "sort" alphabetically and represent
# the linear time they came in.

# On any given machine, time() returns a monatonically increasing number, but
# many tcp connections can happen in a single second.  Therefore the Listener
# increments a number for any connection accepted.  Also a counter is kept
# for the number of files in a session.  Lastly, there may be many dameons
dumping
# to the same directory; so we include the port number.  We add the guid
# for good measure.

sub CamspoolComputeUniqueFileName
```

```perl
{
    my ($info_ref, $guid, $ext) = @_;

return sprintf "%s/%08x_%04x_%08x_%08x_%s%s",
                    $info_ref->{local_dir},
                    time,
                    $info_ref->{port},
                    $info_ref->{session_id},
                    $info_ref->{session_count},
                    $guid,
                    $ext;
}

# LS_Uichan.pm
#================================================================================
v

####BSTDHDR####

#================================================================================
=

####DESCRIPTIONBEGIN####
AUTHOR(S):      Matthew H. Gerlach
#   PURPOSE:        A Lightsurf Uichan client object
#   DESCRIPTION:
#       This module implements an object orieted interfact to Uichan
#       client code.

####DESCRIPTIONEND####
#================================================================================
=

####COPYRIGHTBEGIN####

####ESTDHDR####
#================================================================================
^ package LS_Uichan;

use IO::Select;
use XML::Simple;
use POSIX;
use MD5;
use Data::Dumper;

my $CamXMLVer = "<Ver>10</Ver>";

my $InterReadTimeout = 120;         # a two minute timeout for between reads
```

```perl
my $WorstCaseByteTransferRate = 100; # figure worst case transfer 100bytes/sec

# This is the constructor for a uichan object.
# It is expecting as input a IO::Handle that is usually
# a connected TCP socket.  Communication between this uichan client
# and a "camera" requires non blocking communication to support
# timing out on responses.  In order to save a system call to flush
# outgoing data on the socket, we set the socket to autoflush.  This
# is fine because we buffer messages in application memory before
# writing them.

sub new
{
    my($type, $sock) = @_;

my $uichan = { "sock" => $sock, };

fcntl($sock, F_SETFL(), O_NONBLOCK());

autoflush $sock 1;

return bless $uichan, $type;
}

# AuthCamera

# This method attempts to authenticate a camera.
# This operation requires performing a "WriteRegistry"
# uichan command to set the challenge and a "ReadRegistry"
# operation to fetch the MD5'd output.  If the registry read
# returns the expected data based on the challenge and the
# presumed shared secret key, we consider the camera authenticated.

sub AuthCamera
{
    my $this = shift;
    my (%RegistryHash) = ();

my ($challeng, $i);
    my $mysecret   = "gerry";

# Make a random challeng
    #
    for ($i = 0; $i < 8; $i++)
    {
        $challeng .= sprintf "%02x", int(rand(256));
    }

$RegistryHash{root}     = "2";
    $RegistryHash{subkey}   = "";
    $RegistryHash{type}     = "UTF-8";
    $RegistryHash{volatile} = "true";
    $RegistryHash{name}     = "W";
    $RegistryHash{value}    = $challeng;
```

```perl
    #
    # Send challeng as a Write Registry operation
    #
    if (!$this->WriteRegistry(\%RegistryHash))
    {
        main::LS_LogPrint "failed to write registry\n";
        return(0);
    }

$RegistryHash{name}     = "U";

# To get response to challenge involves a registry read
    #
    my $challeng_resp = $this->ReadRegistry(\%RegistryHash);

if (!defined($challeng_resp))
    {
        main::LS_LogPrint "failed to read registry\n";
        return(0);
    } printf "challeng %s challeng_resp %s\n",$challeng, $challeng_resp;

my $md5 = new MD5;

$md5->add($challeng, $mysecret);

my $digest = $md5->digest();

# The challenge response number comes over the wire(less)
    # as hex encoded ascii so we we create such a string for
    # comparison.
    #
    my ($hex_digest, $byte, @bytes);
    @bytes = unpack ("C*", $digest);
    foreach $byte (@bytes)
    {
        $hex_digest .= sprintf("%02X", $byte);
    } if ($hex_digest eq $challeng_resp)
    {
        return(1);
    }
    else
    {
        return(0);
    }
}

# Fetching the ticket involves a single registry read.

sub GetTicket
{
    my($this) = @_;
```

```perl
    my (%RegistryHash) = ();
    $RegistryHash{root}     = "2";
    $RegistryHash{subkey}   = "";
    $RegistryHash{type}     = "UTF-8";
    $RegistryHash{volatile} = "true";
    $RegistryHash{name}     = "F";

return $this->ReadRegistry(\%RegistryHash) ;
}
sub GetGuids
{
    my($this, $guid_type, $list_ref) = @_;

my $fdir = $this->GetFDir("/photo");

if (!defined($fdir))
    {
        main::LS_LogPrint "GetTaggedGuids: FDir failed\n";
        return 0;
    } my $filetag = $fdir->{file};
print Dumper $filetag;

# start by putting all filenames in @guids
    my @guids = keys %$filetag;

# now look for any files ending in .tag or .snt, since
    # a .snt isn't really "done".
    #
    if ($guid_type eq "tagged")
    {
        @guids = grep {s/\.tag$|\.snt$//} @guids;
    }
    elsif ($guid_type eq "all")
    {
        @guids = grep {s/\.tag$|\.snt$|\.loc$|\.don$//} @guids;
    }
    else
    {
        die "Invalid guid_type passed to GetGuids: $guid_type\n";
    } print "GetTaggedGuids $#guids\n";

my($guid, $file_name, $ext, $guid_ref, $compartment_array_ref);

foreach $guid (sort @guids)
    {
#       print "   $guid\n";

$compartment_array_ref = [];

$guid_ref = { "id" => $guid };
```

```perl
        $guid_ref->{part} = $compartment_array_ref;

foreach $ext (".pp1", ".pp2", ".pp3")
        {
            $file_name = "$guid$ext";

if (exists($filetag->{$file_name}))
            {
                if ($filetag->{$file_name}{fsize} > 0)
                {
                    $compartment_ref = {
                                "id"       => substr($ext, -1, 1),
                                "frombyte" => 0,
                                "tobyte"   => $filetag->{$file_name}{fsize}
                            };
                    push @$compartment_array_ref, $compartment_ref;
                }
                else
                {
                    main::LS_LogPrint "WARNING: zero length compartment $file_name\n";
                }
            }
        } push @$list_ref, $guid_ref;
    } return 1;
} sub GetFDir
{
    my($this, $dir) = @_;

my $req = $CamXMLVer .
              "\n<CamFDir><dir>$dir</dir></CamFDir>\n";

$this->{sock}->print($req);

return $this->GetXmlResponse("</CamFDirR>");
}

# This function handles the response from a uichan client request
# that results in a file transfer of data.  Basically, the data
# is surrounded by the XML response.  The last tag before the
# the data is <size>.  The data begins immediately afer the
# </size>.  After the data comes the </bin>, and then the actual
# response end tag.

sub GetFileResponse
{
    my($this, $local_filename, $reply_end_tag) = @_;

my $resp = $this->Expect($InterReadTimeout, $InterReadTimeout, "<\/size>", $reply_end_tag);
```

```perl
    if (!defined($resp))
    {
        main::LS_LogPrint "GetFileResponse: failed to get file size info\n";
        close(FILE);
        unlink($local_filename);
        return(-1, -1);
    } if ($resp =~ /$reply_end_tag$/)
    {
        main::LS_LogPrint "GetFileResponse: bad response $resp\n";
        close(FILE);
        unlink($local_filename);
        return(-1, -1);
    } now we try to pull out just the decimal representation of the number of
bytes
    # in the file $resp =~ s/.*<size>//; # strip out everything in front of number of bytes;
    $resp =~ s/<\/size>//; # strip out everything after the number of bytes;

my $bytes_2_read = $resp;

my ($bytes_read, $buf);

$bytes_read = $this->ReadBytes(\$buf, $bytes_2_read,
                                    ($bytes_2_read/$WorstCaseByteTransferRate),
$InterReadTimeout);

if ($bytes_read != $bytes_2_read)
    {
        main::LS_LogPrint sprintf "GetFileResponse: got wrong number of bytes: %d != %d\n",
                                    $bytes_read, $bytes_2_read;
        close(FILE);
        unlink($local_filename);
        return(0, $bytes_2_read);
    } if (!open(FILE, ">$local_filename"))
    {
        main::LS_LogPrint "GetFileResponse: failed to open local file,
$local_filename: $!\n";
        return(0, $bytes_2_read);
    } binmode(FILE);

my $bytes_written = syswrite(FILE, $buf, $bytes_read);

if ($bytes_written < $bytes_read)
    {
        main::LS_LogPrint "GetFileResponse: failed write data all data
$bytes_written < $bytes_read: $!\n";
        close(FILE);
        unlink($local_filename);
```

```perl
            return(0, $bytes_2_read);
    } if (!close FILE)
    {
        main::LS_LogPrint "GetFileResponse: failed to close file,
$local_filename: $!\n";
        return(-1, -1);
    }

$resp = $this->Expect($InterReadTimeout, $InterReadTimeout,
$reply_end_tag);

if (!defined($resp))
    {
        main::LS_LogPrint "GetFileResponse: failed to get ending xml\n";
        return(0, $bytes_2_read);
    } return($bytes_written, $bytes_2_read);
} sub GetFile
{
    my($this, $remote_filename, $local_filename) = @_;

my $req =
"$CamXMLVer\n<CamGetFile>\n<name>$remote_filename</name></CamGetFile>\n";

$this->{sock}->print($req);

return ($this->GetFileResponse($local_filename,"</CamGetFileR>"));
} sub TakePic
{
    my($this) = @_;

my $req = "$CamXMLVer\n" .
              "<CamTakePicture>\n" .
              "</CamTakePicture>\n";

$this->{sock}->print($req);

my $xml = $this->GetXmlResponse("</CamTakePictureR>");

if (defined($xml))
    {
        return(1);
    }
    else
    {
        return(0);
    }
} sub HangupServer
{
```

```perl
        my($this) = @_;

my $req = "$CamXMLVer\n" .
                  "<CamHangupServer>\n" .
                  "</CamHangupServer>\n";

$this->{sock}->print($req);

my $xml = $this->GetXmlResponse("</CamHangupServerR>");

if (defined($xml))
        {
            return(1);
        }
        else
        {
            return(0);
        }
    }
    sub CallServer
    {
        my($this) = @_;

my $req = "$CamXMLVer\n" .
                  "<CamCallServer>\n" .
                  "</CamCallServer>\n";

$this->{sock}->print($req);

my $xml = $this->GetXmlResponse("</CamCallServerR>");

if (defined($xml))
        {
            return(1);
        }
        else
        {
            return(0);
        }
    } sub SetSoundState
    {
        my($this, $state) = @_;

my $req = "$CamXMLVer<CamSetSoundState>$state</CamSetSoundState>";

$this->{sock}->print($req);

my $xml = $this->GetXmlResponse("</CamSetSoundStateR>");

if (defined($xml))
        {
            return(1);
        }
        else
        {
            return(0);
```

```perl
        }
    } sub GetPic
    {
        my($this, $guid, $local_filename, $type, %args) = @_;
#       main::LS_LogPrint "GetPic($guid, $local_filename)\n";

my $key;

my $req = "$CamXMLVer\n" .
                  "<CamGetPicture>\n" .
                      "<name>$guid</name>" .
                      "<type>$type</type>";

if (defined($args{width}))
        {
            $req .=   "<width>$args{width}</width>";
        }
        else
        {
            $req .=   "<width></width>";
        } if (defined($args{height}))
        {
            $req .=   "<height>$args{height}</height>";
        }
        else
        {
            $req .=   "<height></height>";
        } if (defined($args{depth}))
        {
            $req .=   "<depth>$args{depth}</depth>";
        }
        else
        {
            $req .=   "<depth></depth>";
        }
        if (defined($args{color}))
        {
            $req .=   "<color>$args{color}</color>";
        }
        else
        {
            $req .=   "<color></color>";
        } if (defined($args{startPercent}))
        {
            $req .=   "<startPercent>$args{startPercent}</startPercent>";
        }
```

```perl
        if (defined($args{endPercent}))
        {
            $req .=    "<endPercent>$args{endPercent}</endPercent>";
        }

$req .= "</CamGetPicture>\n";

$this->{sock}->print($req);

return ($this->GetFileResponse($local_filename,"<\/CamGetPictureR>"));

} sub WriteRegistry
    {
        my($this, @reg_hashes) = @_;

my $req = "$CamXMLVer\n<CamWriteRegistryValue>\n";

my $reg_hash;

foreach $reg_hash (@reg_hashes)
        {
            $req .= "<registry>\n" .
                    "<name>$reg_hash->{name}</name>\n" .
                    "<registryType>$reg_hash->{type}</registryType>\n" .
                    "<root>$reg_hash->{root}</root>\n" .
                    "<subkey>$reg_hash->{subkey}</subkey>\n" .
                    "<value>$reg_hash->{value}</value>\n" .
                    "<volatile>$reg_hash->{volatile}</volatile>\n" .
                    "</registry>\n";
        }

$req .= "</CamWriteRegistryValue>\n";

$this->{sock}->print($req);

my $xml = $this->GetXmlResponse("</CamWriteRegistryValueR>");

if (defined($xml))
        {
            return(1);
        }
        else
        {
            return(0);
        }

} sub ReadRegistry
    {
        my($this, $reg_hash) = @_;

my $req = "$CamXMLVer\n<CamReadRegistryValue>\n";

$req .= "<registry>\n" .
                "<name>$reg_hash->{name}</name>\n" .
```

```perl
                "<registryType>$reg_hash->{type}</registryType>\n" .
                "<root>$reg_hash->{root}</root>\n" .
                "<subkey>$reg_hash->{subkey}</subkey>\n" .
                "<volatile>$reg_hash->{volatile}</volatile>\n" .
            "</registry>\n";

$req .= "</CamReadRegistryValue>\n";

$this->{sock}->print($req);

my $xml = $this->GetXmlResponse("</CamReadRegistryValueR>");

if (defined($xml))
    {
        #print Dumper($xml->{registry});

return($xml->{registry}{value});
    }
    else
    {
        return(undef);
    }
} sub SetPhotoState
{
    my( $this, $guid, $state, $stateDetailed ) = @_;

my $req = "$CamXMLVer\n" .
            "<CamSetPhotoState>\n" .
                "<name>$guid</name>\n" .
                "<stateType>1</stateType>\n" .
                "<photoState>$state</photoState>\n" .
                "<photoStateDetail>$stateDetailed</photoStateDetail>\n" .
            "</CamSetPhotoState>\n";

$this->{sock}->print($req);

my $xml = $this->GetXmlResponse("</CamSetPhotoStateR>");
    if (defined($xml))
    {
        #print Dumper($xml->{registry});

return(1);
    }
    else
    {
        return(0);
    }

} sub DeletePhoto
{
    my ($this, $guid) = @_;

my $req = "$CamXMLVer<CamPDel><name>$guid</name></CamPDel>\n";
```

```perl
        $this->{sock}->print($req);

my $xml = $this->GetXmlResponse("</CamPDelR>");
    if (defined($xml))
    {
        #print Dumper($xml->{registry});

return(1);
    }
    else
    {
        return(0);
    }
}

# ReadBytes

# This is a bit of a hairy method that perfoms the actual reading of
# bytes off of the wire.  This function gets passed two time outs.
# One time out for the over all number of bytes to be read, and another
# "inter read" timeout.  By having two timeouts this function can be used
# to effecently read large buffers, but timeout appripriately if line
# appears dead because no bytes are trickling in.

# This function makes the assumption that the IO::Handle has be set
# to non-blocking by the constructor.  In addition this function uses
# the "read" method on the IO::Handle instead of the "sysread" method.
# By using "read", we are taking advantage of perl's buffered io streams.
# Doing so dramatically limits the number of times this application traps
# to the Unix Kernel.  As it turns out due to Uichan's message usage
# of the IO stream, we essentially have only two system calls for
# each message, the select checking for available bytes, and the buffered
# "read" which grabs whatever bytes are availble from the kernel,
# but delivers what we ask for.

sub ReadBytes
{
    my($this, $buf_ref, $bytes_to_read, $total_timeout, $inter_read_timeout) =
@_;
    my($sock, $rval, $buf, $time_left, $timeout, @ready);

$sock = $this->{sock};
    my $bytes_read = 0;

my $start_time = time;

while ($bytes_read < $bytes_to_read)
    {
        $rval = $sock->read($$buf_ref,
                            ($bytes_to_read - $bytes_read), $bytes_read);

if (!defined($rval))
        {
            if ($! == EAGAIN())
            {
                $time_left = $total_timeout - (time - $start_time);

if ($time_left <= 0)
```

```perl
            {
                main::LS_LogPrint "ReadBytes: Total timeout\n";
                last;
            } my $selObj = IO::Select->new();
            $selObj->add($sock);

if ($time_left < $inter_read_timeout)
            {
                @ready =  $selObj->can_read($time_left);
            }
            else
            {
                @ready =  $selObj->can_read($inter_read_timeout);
            }
            if ($#ready < 0)
            {
                main::LS_LogPrint "ReadBytes: select timed out\n";
                last;
            }
        }
        else
        {
            main::LS_LogPrint sprintf "ReadBytes bad socket read: %d: $!\n", $!;
            last;
        }
    }
    elsif ($rval > 0)
    {
        $bytes_read += $rval;
    }
    elsif ($rval == 0)
    {
        main::LS_LogPrint "socket closed\n";
        last;
    }
    else
    {
        main::LS_LogPrint "weird socket rval $rval\n";
        last;
    }
    } return($bytes_read);
} sub Empty
{
    my($this) = @_;

my $rval;
    my $buf;

my $sock = $this->{sock};

while (1)
```

```perl
        {
            $rval = $sock->read($buf, 1024);

last if ((!defined($rval)) || ($rval <= 0));
        }
    }

# Expect
    #
    # This method is based on the Tcl extension, "Expect" by
    # Don Libes.  The idea is that this function reads the stream
    # looking for the "Expected" patterns to match the end of the
    # stream.  If one of the "Expected" matches occurs, the entire
    # buffer is return.  undef is returned on timeout.
    #
    sub Expect
    {
        my($this, $total_timeout, $inter_read_time, @matches) = @_;

my($buf, $byte, $time_left, $match);

my $start_time = time;

while (1)
        {
            $time_left = $total_timeout - (time - $start_time);

if ($time_left <= 0)
            {
                main::LS_LogPrint "Expect: ran out of time\n";
                return(undef);
            } if ($this->ReadBytes(\$byte, 1, $time_left, $inter_read_time) != 1)
            {
                main::LS_LogPrint "Expect: read timed out\n";
                return(undef);
            }

$buf .= $byte;

foreach $match (@matches)
            {
                if ($buf =~ /$match$/)
                {
                    return($buf);
                }
            }
        }
    }

# GetXmlResponse
    #
    # This routine tries to fetch an Uichan Xml Response
    # from the other end.  If successful, this function will
```

```perl
# return a hash produced by XML::Simple of the XmlDocument.

sub GetXmlResponse
{
    my ($this, $docEndTag) = @_;
    my $resp = "";;

$resp = $this->Expect($InterReadTimeout, $InterReadTimeout, $docEndTag);

print "GetXmlReponse: response\n$resp\n--\n";

if (!defined($resp))
    {
        main::LS_LogPrint "GetXmlResponse: Expect failed\n";
        return(undef);
    } if (!($resp =~ s/$CamXMLVer//))
    {
        main::LS_LogPrint "GetXmlResponse: failed to see xml version header:\n$resp\n";
        return(undef);
    } my $xml = XMLin($resp);

if (!defined($xml->{status}))
    {
        main::LS_LogPrint "GetXmlResonse: no status in resp\n";
        return(undef);
    }
    elsif ($xml->{status} ne "0")
    {
        main::LS_LogPrint "GetXmlResonse: bad status in response: $xml->{status}\n";
        return(undef);
    }
    return $xml;

}
1;

__END__

=head1 NAME

Uichan - an object that implements Uichan Client functionality

=head1 SYNOPSIS use LS_Uichan;

my $uichan = new Uichan($io_handle); # $io_handle is an open/connected IO::Handle,
                                         # usually IO::Socket::INET
```

```
        if (!$uichan->AuthCamera())
        {
            die "Could not Auth Camera\n";
        } print "Successfully Authenticated Camera\n";

my $ticket = $uichan->GetTicket();

if (!defined($ticket))
        {
            die "Could not get Ticket\n";

} print "ticket = $ticket\n";

my $fdir = $uichan->GetFDir("/photo");

if (!defined($fdir))
        {
            die "Could not read dir /photo\n";
        } if
(!$uichan->GetFile("/photo/ls_00200020_00000016_00780005apd_00000005.ppf",
                        "./ls_00200020_00000016_00780005apd_00000005.ppf"))
        {
            die "failed to get file\n";
        } print "successfully got file\n";

=head1 DESCRIPTION

This module implements an object oriented interface to client functionality
of a Lightsurf Uichan client.

=head1 CONSTRUCTOR

=over 4

=item new ( io_handle )

Creates an C<LS_Uichan> object.  The constructor takes one option,
a referernce to an opened IO::Handle.  The constructor will the handle to
non-blocking mode to allow timing out on responses.

At the moment only an IO::Socket::INET has actually been used with this
object.

=back

=head2 METHODS

=item AuthCamera()
```

Attempts to authenticate the camera. Returns 1 on success, 0 otherwise.

=item GetTicket()

Returns a scalar representing the ticket number, undef on failure.

=item GetGuids(guid_type, list_ref)

This function attempts asks the uichan server for a list of guids.
The guid_type should be "tagged" or "all" for the guids that have been
tagged for tranmission or all guids, respectively. If the request is
successful 1 is returned, 0 otherwise. The actual data from
the response gets shifted into the passed reference to a list. The elements
shifted in are hash references which have two keys: id and part. The value
of id is the guid of the photo, and the key, part, is a reference to a list
of hashes describing compartments. Each comparment hash has three keys:
id, frombyte and tobyte. The id is the compartment id (e.g. 1, 2, 3),
and the frombyte will always be 0, and the tobyte is the length of the
compartment. The decision for the wierd structure is that it matches
the structure of LS_UploadClient::PerformSyncRequest().

=item GetFDir(remote_dir)

This function requests a listing of the passed in directory. If the
request fails, undef is returned. If successful, the parsed xml response
is returned.

=item GetFile(remote_filename, local_filename)

This function attempts to fetch the remote_filename and write to the
local_filename. Returns array ($bytes_written, $total_in_file). When
completely successful $bytes_written will be equal to $total_in_file, and both
will be greater than failure. When a catastrophic failure occurs,
$bytes_written will be -1. If a subset of the file was fetched, $bytes_written
will be greater than 0 and less than $total_in_file.

=item GetPic($guid, $local_filename, $type, %args)

This function attempts to fetch the picture, guid, and write it to
local_filename. $type should be either the comparment number (e.g. 1, 2, 3
...),
"full", "anc", "alien_preview", "generic", or "png_preview".

%args is a hash of openional named arguments. The supported named arguments
are width, height, depth, color, startPercent, and endPercent.

This method returns an array as described for the GetFile() method.

=item SetPhotoState($guid, $state, $stateDetailed)

This method attempts to set the state and detailed stated of the given
guid. 1 is returned on success, 0 othersize.

=item DeletePhotot($guid)

This method is delete the requested guid. 1 is returned on success, 0
otherwise.

```
=item TakePic()

This function will request the camera to take a picture.  1 is returned
if the request was successful, 0 otherwise.  The picture taken will not
actually show up in the filesystem until some time after the response.

=item SetSoundState(state)

This function will set of sound generation.  State is "1" to enable sounds,
and state is 0 to disable sounds.

=item CallServer

This function will request the camera to make a connection to a server.
It returns 1 if the command was accepted, 0 otherwise.  A successful
return does not imply a successful connection to the server, just
that the camera will try.  When the camera successfully connects,
an appropriate event will be sent on the event channnel.  Subsequent
CallServer commands should not be sent unless a "Server Done"
event has been received.

=item HangupServer

This function will ask the camera to hangup its connection to
a server.  1 is returned if the command was accepted, 0 otherwise.
The actual connection should not be considered down until a
"Server Done" event arrives on the event channel =item Empty()

This function "empties" any data in the  receive buffer of the socket and
throws the
data away.  It is usually a good idea to call this function to promote a
"clean"
closing of the socket.

=back

=head1 SEE ALSO

L<Socket>, L<IO::Socket>

=head1 AUTHOR

Matthew H. Gerlach
mgerlach@lightsurf.com

=head1 COPYRIGHT

####COPYRIGHTBEGIN####

(c) Copyright 1999, 2000 Lightsurf Technologies, Inc.  ALL RIGHTS RESERVED.

=cut
```

```perl
#LS_UploadClient.pm
#==============================================================================
v

####BSTDHDR####

#==============================================================================
=

####DESCRIPTIONBEGIN####
#   AUTHOR(S):
#   PURPOSE:
DESCRIPTION:

####DESCRIPTIONEND####
#==============================================================================
=

####COPYRIGHTBEGIN####

(c) Copyright 1999, 2000 Lightsurf Technologies, Inc.   ALL RIGHTS RESERVED.

####COPYRIGHTEND####
#==============================================================================
=

####ESTDHDR####
#==============================================================================
^ package LS_UploadClient;

use strict;
#use LWP::Debug qw(+);
use LWP::UserAgent;
use XML::Simple;
use Data::Dumper;
use LS_UnixDaemonUtils;

sub new
{
    my ($type, $url_start, $ticket, %args) = @_;

my $upload_client =
    {
        url_start => $url_start,
        ticket    => $ticket,
    };

if (defined($args{login}))
    {
        $upload_client->{login} = $args{login};
    }
```

```perl
    if (defined($args{passwd}))
    {
        $upload_client->{passwd} = $args{passwd};
    } if (defined($args{imsi}))
    {
        $upload_client->{imsi} = $args{imsi};
    }
    else
    {
        $upload_client->{imsi} = "123";
    } if (defined($args{imei}))
    {
        $upload_client->{imei} = $args{imei};
    }
    else
    {
        $upload_client->{imei} = "123";
    } if (defined($args{pstn}))
    {
        $upload_client->{pstn} = $args{pstn};
    }
    else
    {
        $upload_client->{pstn} = "123";
    } my($get_url) =
        $upload_client->{url_start} .
        "/authenticate?handler=device&devicelogin=$upload_client->{ticket}" .
        "&camera_id=123&imsi=$upload_client->{imsi}" .
        "&imei=$upload_client->{imei}&pstn=$upload_client->{pstn}" .
        "&resource=/asst/resource_index.jsp";

my $get_agent = new LWP::UserAgent;

my $get_req = new HTTP::Request('GET', $get_url);

if (defined($upload_client->{login}) && defined($upload_client->{passwd}))
    {
        $get_req->authorization_basic($upload_client->{login},
$upload_client->{passwd});
    } my $res = $get_agent->request($get_req);

if (!$res->is_success)
    {
        LS_LogPrint "failed to get session id\n";
        LS_LogPrint Dumper($res);
        return(undef);
    }
```

```perl
    my $hdrs = $res->headers;

my ($session_id) = ($hdrs->as_string(" ") =~ /JSESSIONID=(.*?);/);
    my ($machine_id) = ($hdrs->as_string(" ") =~ /machineid=(.*?);/);

# FIXME
    # I should check for session_id and machine_id
    #
    $upload_client->{session_id} = $session_id;
    $upload_client->{machine_id} = $machine_id;

return bless $upload_client, $type;
} sub PerformSyncRequest
{
    my ($this, $in_list_ref, $out_list_ref) = @_;

my $post_url = "$this->{url_start}/asst/sync_asst.jsp";

my $post_agent = new LWP::UserAgent;
    my $post_req   = new HTTP::Request('POST', $post_url);

if (defined($this->{login}) && defined($this->{passwd}))
    {
        $post_req->authorization_basic($this->{login}, $this->{passwd});
    }

$post_req->header("Cookie" => "JSESSIONID=$this->{session_id}");
    $post_req->push_header(Cookie => "machineid=$this->{machine_id}");

my ($part_info, $i);

my $xml_req = "<?xml version=\"1.0\" ?>\n<photos>\n";

my ($guid_ref, $compartment_array_ref, $compartment_ref);
    foreach $guid_ref (@$in_list_ref)
    {
        $part_info = "";
        $compartment_array_ref = $guid_ref->{part};
        foreach $compartment_ref (@$compartment_array_ref)
        {
            $part_info .= sprintf "    <part id=\"%d\"><offset>0</offset><length>%d</length></part>\n",
                                        $compartment_ref->{id},
$compartment_ref->{tobyte};
        } if (length($part_info) > 0)
        {
            $xml_req .= "<photo id=\"$guid_ref->{id}\">\n" . $part_info .
"</photo>\n";
        }
    }

$xml_req .= "</photos>\n";
```

```perl
    $post_req->content($xml_req);

my $res = $post_agent->request($post_req);

if (!$res->is_success)
    {
        LS_LogPrint "PerformSyncRequest post failed\n";
        LS_LogPrint Dumper($res);
        return(0);
    }

LS_LogPrint "PerformSyncRequest post succeeded\n";
#   LS_LogPrint Dumper($res);
#   LS_LogPrint sprintf "Content = %s\n", $res->content;
    my $xml_resp = XMLin($res->content, keyattr => 'sendphoto',
                                        forcearray => ['sendphoto', 'part']);

my $photo_list_ref = $xml_resp->{sendphoto};

if (defined($photo_list_ref))
    {
        @$out_list_ref = @$photo_list_ref;
    }
    else
    {
        @$out_list_ref = ();
    }

#   LS_LogPrint Dumper($xml_resp);
    return(1);
}
sub UploadImageCompartment
{
    my ($this, $guid, $type, $picture_file_name, $part, $offset, $length) =
@_;

if (!open(PICFILE, $picture_file_name))
    {
        LS_LogPrint "failed to open picture file, $picture_file_name: $!\n";
        return undef;
    }
    binmode(PICFILE);
    my @file_stat = stat(PICFILE);
    my $len       = $file_stat[7];
    my $image_data;
    sysread(PICFILE, $image_data, $len);
    close(PICFILE);

my $post_url = "$this->{url_start}/asst/upload_asst.jsp";

my $post_agent = new LWP::UserAgent;
    my $post_req   = new HTTP::Request('POST', $post_url);

if (defined($this->{login}) && defined($this->{passwd}))
    {
        $post_req->authorization_basic($this->{login}, $this->{passwd});
    }
```

```perl
my $uniq_id = "529021".time;

my $boundary = "---------------------------$uniq_id";

$post_req->header("Cookie" => "JSESSIONID=$this->{session_id}");
$post_req->push_header(Cookie => "machineid=$this->{machine_id}");

$post_req->content_type("multipart/form-data; " .
                "boundary=$boundary\r\n");

$boundary = "--$boundary";
Build the data sent before the image...
my($before, $end);

$before  = "$boundary\r\n";
$before .= "Content-Disposition: form-data; name=\"Image1\"; filename=\"";
$before .= "untitled" . "\"\r\n";
$before .= "Content-Type: $type\r\n";
$before .= "\r\n";

$end =  "$boundary\r\n";
$end .= "Content-Disposition: form-data; name=\"Image1guid\"";
$end .= "\r\n";
$end .= "\r\n";
$end .= "$guid";
$end .= "\r\n$boundary\r\n";

$end .= "Content-Disposition: form-data; name=\"Image1partid\"";
$end .= "\r\n";
$end .= "\r\n";
$end .= "$part";
$end .= "\r\n$boundary\r\n";

$end .= "Content-Disposition: form-data; name=\"Image1offset\"";
$end .= "\r\n";
$end .= "\r\n";
$end .= "0";
$end .= "\r\n$boundary\r\n";

$end .= "Content-Disposition: form-data; name=\"Image1length\"";
$end .= "\r\n";
$end .= "\r\n";
$end .= "$len";
$end .= "\r\n$boundary--\r\n";
last boundary needs ending -- my $content = $before.$image_data."\r\n".$end;

$post_req->content( $content);

LS_LogPrint "posting $guid part $part\n";
my $res = $post_agent->request($post_req);

if (!$res->is_success)
{
    LS_LogPrint "HTTP upload post failed for $guid\n";
    LS_LogPrint sprintf "%s\n", $res->content;
```

```perl
        return(0);
    } my $xml_ref = XMLin($res->content);
LS_LogPrint sprintf "xml response\n%s\n", Dumper $xml_ref;

if (defined($xml_ref->{photo}) && defined($xml_ref->{photo}->{id}))
    {
        if (defined($xml_ref->{partalreadyreceived}))
        {
            LS_LogPrint "post succeeded for $guid part $part id
$xml_ref->{photo}->{id} already in db\n";
        }
        else
        {
            LS_LogPrint "post succeeded for $guid part $part id
$xml_ref->{photo}->{id}\n";
        } return($xml_ref->{photo}->{id});
    }
    elsif (defined($xml_ref->{error}))
    {
        LS_LogPrint "unrecoverable error from server: $xml_ref->{error}\n";
        return(0);
    }

# If we fall through here, there was some error in the response.
    LS_LogPrint "failed response to upload post for $guid part $part\n";
    LS_LogPrint sprintf "%s\n", $res->content;
    return(0);
} sub SetMetaData
{
    my ($this, $idtype, $id, %args) = @_;

my($get_url) = "$this->{url_start}/asst/update_photo_asst.jsp?";

if ($idtype eq "guid")
    {
        $get_url .= "guid=$id&";
    }
    elsif ($idtype eq "elementID")
    {
        $get_url .= "elementID=$id&";
    }
    else
    {
        LS_LogPrint "SetComments got a bad 'type' parameter: $args{type}\n";
        exit(1);
    } if (defined($args{title}))
    {
        $get_url .= "&name=$args{title}";
    }
```

```perl
        if (defined($args{comments}))
        {
            $get_url .= "&description=$args{comments}";
        } if (defined($args{location}))
        {
            $get_url .= "&location=$args{location}";
        }

#       LS_LogPrint "SetComments url $get_url\n";
        my $get_agent = new LWP::UserAgent;
        my $get_req   = new HTTP::Request('GET', $get_url);

if (defined($this->{login}) && defined($this->{passwd}))
        {
            $get_req->authorization_basic($this->{login}, $this->{passwd});
        }

$get_req->header("Cookie" => "JSESSIONID=$this->{session_id}");
        $get_req->push_header(Cookie => "machineid=$this->{machine_id}");

my $res = $get_agent->request($get_req);

if (!$res->is_success)
        {
            LS_LogPrint "HTTP request failed to set comments for $idtype $id\n";
            LS_LogPrint Dumper($res);
            return(0);
        }
        elsif ( $res->content !~ /<success\/>/)
        {
            LS_LogPrint "XML response failed to set comments for $idtype $id\n";
            LS_LogPrint Dumper($res);
            return(0);
        }
        else
        {
            LS_LogPrint "Sucessfully set comments for $idtype $id\n";
            return(1);
        }
} sub ShipEmailAddrs
{
        my ($this, $idtype, $id, $email_list_ref) = @_;

my($get_url) = "$this->{url_start}/asst/send_greeting.jsp?";

if ($idtype eq "guid")
        {
            $get_url .= "guid=$id&";
        }
        elsif ($idtype eq "elementID")
        {
            $get_url .= "elementID=$id&";
        }
```

```perl
        else
        {
            LS_LogPrint "ShipEmailAddrs bad idtype $idtype\n";
            exit(1);
        }

$get_url .= "toAddress=$email_list_ref->[0]";

my($i);

for ($i = 1; $i <= $#$email_list_ref; $i++)
        {
            $get_url = $get_url . ",$email_list_ref->[$i]"
        }

LS_LogPrint "Email list url:\n    $get_url\n";

my $get_agent = new LWP::UserAgent;
        my $get_req   = new HTTP::Request('GET', $get_url);

if (defined($this->{login}) && defined($this->{passwd}))
        {
            $get_req->authorization_basic($this->{login}, $this->{passwd});
        }

$get_req->header("Cookie" => "JSESSIONID=$this->{session_id}");
        $get_req->push_header(Cookie => "machineid=$this->{machine_id}");

my $res = $get_agent->request($get_req);

if (!$res->is_success)
        {
            LS_LogPrint "HTTP request failed for email post of $idtype $id\n";
            LS_LogPrint Dumper($res);
            return(0);
        }
        elsif ($res->content =~ /<success\/>/)
        {
            LS_LogPrint "Sucessfully sent shipped email addrs for $idtype $id\n";
            return 1;
        }
        else
        {
            LS_LogPrint "Unknown XML response\n" . $res->content . "\n";
            return 0;
        }
}
sub GetEmailUrl
{
        my ($this, $idtype, $id, $email_list_ref) = @_;

my($get_url) = "$this->{url_start}/asst/get_greeting.jsp?";

if ($idtype eq "guid")
        {
            $get_url .= "guid=$id&";
        }
        elsif ($idtype eq "elementID")
```

```perl
        {
            $get_url .= "elementID=$id&";
        }
        else
        {
            LS_LogPrint "GetEmailUrl bad idtype $idtype\n";
            exit(1);
        }

$get_url .= "toAddress=$email_list_ref->[0]";

my($i);

for ($i = 1; $i <= $#$email_list_ref; $i++)
        {
            $get_url = $get_url . ",$email_list_ref->[$i]"
        }

LS_LogPrint "Email list url:\n     $get_url\n";

my $get_agent = new LWP::UserAgent;
        my $get_req   = new HTTP::Request('GET', $get_url);

if (defined($this->{login}) && defined($this->{passwd}))
        {
            $get_req->authorization_basic($this->{login}, $this->{passwd});
        }

$get_req->header("Cookie" => "JSESSIONID=$this->{session_id}");
        $get_req->push_header(Cookie => "machineid=$this->{machine_id}");

my $res = $get_agent->request($get_req);

if (!$res->is_success)
        {
            LS_LogPrint "HTTP request failed for /asst/get_greeting.jsp post of $idtype $id\n";
            LS_LogPrint Dumper($res);
            return(undef);
        } my $xml_ref = XMLin($res->content);

if (!exists($xml_ref->{shareurl}))
        {
            LS_LogPrint "GetEmailUrl got bad XML response\n$res->content\n";
            return(undef);
        } return($xml_ref->{shareurl});
}
1;

__END__

=head1 NAME
```

LS_UploadClient - an object for uploading pictures to the LightSurf Server.

=head1 SYNOPSIS use LS_UploadClient;

$upload_client = new LS_UploadClient("http://www.photosurf.com", $device_login);

$upload_client->UploadImageCompartment($guid, $filename, $part, $offset, $length);

$upload_client->SetComments($guid, "My Title", "My Location", "Some Comments");

$upload_client->ShipEmailAddrs($guid, "foo@bar.com", "bar@foo.com");

=head1 DESCRIPTION

LS_UploadClient provides an object oriented interface to uploading/syncing picutures with a LightSurf Server.  An instance of the object can be used to make uploads to a particular user's account.  When a new account is uploaded to, a new object must be created.

=head1 CONSTRUCTOR

=item new (url, device_login, %args)

The constructor creates an instance for an upload session to a particular user's account.  The parameters are the base url to LightSurf server and a device login that is fetched from a camera.  This device login associates to a particular user's account.  Once constructed, the object can be used to upload many pictures into the account and/or set properities of pictures. The constructor actually communicates to the server to fetch a session id; so it can fail.  On failure undef is returned.  The constructor has optional parameters, %args, that are passed as name => value pairs.  For server authentication, login and passwd name/values can be passed.  In addition imsi, imei, and pstn named parameters are supported.

=head1 METHODS

=item UploadImageCompartment(guid, type, filename, compartment_num, offset, length)

This method uploads a compartment to an account on the server.  It needs the picture's globally unique id (guid), the type of comparment (i.e. "image/jpeg" or "image/x-lspp"), the filename of the compartment, the compartment number (e.g. "1", "2", ...).  In addition the offset into the file and length of the bytes is given.  Usually the offset is 0 and the length is the size of the file, but it could be smaller.  On success the resulting positive photo_id from the database is returned.  undef is returned if the upload failed, and should be retried. 0 is returned if the failure case should not be retried.

=item SetMetaData(idtype, id, [ optional named arguments ])

This method will set any meta data associated with a picture. The idtype
should be "guid" or "elementID" if a picture guid or its upload elementID
is the id. The opional named arguments are title, comments, and location.
1 is returned on success, 0 on failure.

=item ShipEmailAddrs(idtype, id, list of email addresses)

This method will ask the LightSurf server to share the identified picture with
the passed reference to a list of email addresses. Like SetMetaData, the
idtype
should be "guid" or "elementID". 1 will be returned on success, 0 on failure.

=item GetEmailUrl(idtype, id, list of email addresses)

This method will ask the LightSurf to setup a picture to be shared. It
has the same parameters as ShipEmailAddrs, but its return value is different.
On success the method will return a URL that represents the shared picture.
undef is return on failure.

=cut

What is claimed is:

1. In a wireless environment, a method for efficiently transmitting digital images from a wireless device, the method comprising:
    establishing a data call from the wireless device to a wireless carrier for uploading digital images;
    transmitting information pertaining to a digital image to be uploaded from the wireless device to the wireless carrier, said digital image being arranged into individual compartments capable of separate transmission;
    collecting, at a spooler, the information being transmitted for said digital image;
    once the spooler has collected sufficient information to define at least one individual compartment of said digital image, transmitting said at least one compartment from the spooler to a target computer; and
    determining at the spooler which digital images are required to be uploaded, based, at least in part, by querying the wireless device for a list of digital images that are desired to be uploaded.

2. The method of claim 1, wherein said step of establishing a data call from the wireless device to a wireless carrier for uploading digital images includes:
    connecting a digital camera with wireless connectivity to a cellular phone device; and
    placing a data call through the cellular phone device.

3. The method of claim 1, wherein said step of transmitting information includes:
    transmitting an individual compartment of the digital image.

4. The method of claim 1, wherein said step of transmitting said at least one compartment from the spooler to a target computer includes:
    transmitting said at least one compartment to a server infrastructure that includes at least one Web server.

5. The method of claim 1, wherein information is transmitted using TCP/IP protocol.

6. The method of claim 1, wherein said step of establishing a data call from the wireless device to a wireless carrier includes:
    establishing a data call to a modem pool present at the wireless carrier, wherein said spooler is located in proximity to said modem pool.

7. The method of claim 6, wherein said spooler is connected to said modem pool via a high-speed data network.

8. The method of claim 1, wherein said spooler is connected to said target computer via a high-speed data network.

9. The method of claim 1, further comprising:
    determining at the spooler which digital images are required to be uploaded, based, at least in part, on digital images already successfully uploaded.

10. The method of claim 1, further comprising:
    receiving concurrent data calls from a plurality of client devices, such that a multitude of connections exist with a multitude of digital images being simultaneously transmitted.

11. The method of claim 1, wherein each digital image is identified by a globally-unique identifier.

12. The method of claim 11, wherein the globally-unique identifier of each digital image is based, at least in part, on a device ID of the wireless device where the image originated.

13. The method of claim 1, wherein image information is transmitted from the spooler to the target computer using XML protocol.

14. The method of claim 1, further comprising:
    determining at the spooler which digital images are required to be uploaded, based, at least in part, by querying the target computer for a list of digital images already successfully uploaded.

15. The method of claim 1, wherein the spooler is deployed at a location remote from the wireless carrier.

16. The method of claim 1, wherein the spooler is deployed at a location proximate to the target computer.

17. The method of claim 1, wherein said information pertaining to the said digital image includes meta data.

18. The method of claim 17, wherein said meta data includes one or more e-mail addresses relevant to said digital image.

19. A system for efficiently transmitting digital images from a wireless device comprising:
    a wireless device capable of establishing a data call to a wireless carrier for uploading digital images;
    a module directing transmission of information pertaining to a digital image to be uploaded from the wireless device to the wireless carrier, said digital image being arranged into individual compartments capable of separate transmission;
    a spooler for collecting the information being transmitted for said digital image, wherein once the spooler has collected sufficient information to define at least one individual compartment of said digital image, said spooler transmits said at least one compartment from the spooler to a target; and
    a module for determining at the spooler which digital images are required to be uploaded, based, at least in part, by querying the target computer for a list of digital images already successfully uploaded.

20. The system of claim 19, wherein said wireless device includes a digital camera with wireless connectivity to a cellular phone device.

21. The system of claim 19, wherein transmission occurs by transmitting individual compartments of the digital image.

22. The system of claim 19, wherein said target computer includes a server infrastructure that includes at least one Web server.

23. The system of claim 19, wherein information is transmitted using TCP/IP protocol.

24. The system of claim 19, wherein said wireless carrier includes modem pool, and wherein said spooler is located in proximity to said modem pool.

25. The system of claim 24, wherein said spooler is connected to said modem pool via a high-speed data network.

26. The system of claim 19, wherein said spooler is connected to said target computer via a high-speed data network.

27. The system of claim 19, further comprising:
    a module for determining which digital images are required to be uploaded, based, at least in part, on digital images already successfully uploaded.

28. The system of claim 19, wherein said spooler services multiple concurrent data calls from a plurality of client devices, such that a multitude of connections exist with a multitude of digital images being simultaneously transmitted.

29. The system of claim 19, wherein each digital image is identified by a globally-unique identifier.

30. The system of claim 29, wherein the globally-unique identifier of each digital image is based, at least in part, on a device ID of the wireless device where the image originated.

31. The system of claim 19, wherein image information is transmitted from the spooler to the target computer using XML protocol.

32. The system of claim 19, further comprising:
a module for determining at the spooler which digital images are required to be uploaded, based, at least in part, by querying the wireless device for a list of digital images that are desired to be uploaded.

33. The system of claim 19, wherein the spooler is deployed at a location remote from the wireless carrier.

34. The system of claim 19, wherein the spooler is deployed at a location proximate to the target computer.

35. The system of claim 19, wherein said information pertaining to the said digital image includes meta data.

36. The system of claim 35, wherein said meta data includes one or more e-mail addresses relevant to said digital image.

37. In a wireless environment, a method for efficiently transmitting media content from a wireless device, the method comprising:
establishing a data call from the wireless device to a wireless carrier for uploading selected media content;
transmitting information pertaining to the selected media content to be uploaded from the wireless device to the wireless carrier, said selected media content being arranged into individual compartments capable of separate transmission;
collecting, at a spooler, the information being transmitted for said selected media content;
once the spooler has collected sufficient information to define at least one individual compartment of said selected media content, transmitting said at least one compartment from the spooler to a target computer; and
determining at the spooler which portions of said selected media content are required to be uploaded, based, at least in part, by querying the target computer for a list of all portions, if any, already successfully uploaded.

38. The method of claim 37, wherein said selected media content includes digital images.

39. The method of claim 37, wherein said selected media content includes digital audio.

40. The method of claim 37, wherein said selected media content includes digital video.

41. The method of claim 37, wherein said step of establishing a data call from the wireless device to a wireless carrier for uploading selected media content includes:
connecting a digital media capturing device with wireless connectivity to a cellular phone device; and
placing a data call through the cellular phone device.

42. The method of claim 37, further comprising:
determining at the spooler which portions of said selected media content are required to be uploaded, based, at least in part, on those portions, if any, that have already been successfully uploaded.

43. The method of claim 37, further comprising:
receiving concurrent data calls from a plurality of client devices, such that a multitude of connections exist with a multitude of different media content being simultaneously transmitted.

44. The method of claim 37, wherein each object of said selected media content is identified by a globally-unique identifier.

45. The method of claim 44, wherein the globally-unique identifier of each object of said selected media content is based, at least in part, on a device ID of the wireless device where the image originated.

46. The method of claim 37, wherein said step of transmitting information includes:
transmitting an individual compartment of said selected media content.

* * * * *